US011140099B2

(12) United States Patent
Jina et al.

(10) Patent No.: US 11,140,099 B2
(45) Date of Patent: Oct. 5, 2021

(54) PROVIDING MESSAGE RESPONSE SUGGESTIONS

(71) Applicant: Apple Inc., Cupertino, CA (US)

(72) Inventors: Vojtech Jina, Santa Clara, CA (US); Seth J. Hildick-Smith, Pacifica, CA (US); Peter M. Kirby, Santa Clara, CA (US); Vivek Kumar Rangarajan Sridhar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/546,851

(22) Filed: Aug. 21, 2019

(65) Prior Publication Data

US 2020/0374243 A1 Nov. 26, 2020

Related U.S. Application Data

(60) Provisional application No. 62/850,771, filed on May 21, 2019.

(51) Int. Cl.
*H04L 12/58* (2006.01)
*H04L 29/08* (2006.01)

(52) U.S. Cl.
CPC ............ *H04L 51/02* (2013.01); *H04L 67/306* (2013.01)

(58) Field of Classification Search
CPC .............................. H04L 51/02; H04L 67/306
See application file for complete search history.

(56) References Cited

U.S. PATENT DOCUMENTS

| | | | |
|---|---|---|---|
| 7,475,010 B2 | 1/2009 | Chao |
| 7,475,015 B2 | 1/2009 | Epstein et al. |
| 7,475,063 B2 | 1/2009 | Datta et al. |
| 7,477,238 B2 | 1/2009 | Fux et al. |
| 7,477,240 B2 | 1/2009 | Yanagisawa |
| 7,478,037 B2 | 1/2009 | Strong |

(Continued)

FOREIGN PATENT DOCUMENTS

| | | |
|---|---|---|
| AU | 2014100581 B4 | 9/2014 |
| AU | 2015203483 A1 | 7/2015 |

(Continued)

OTHER PUBLICATIONS

Adium, "AboutAdium—Adium X-Trac", available at <http://web.archive.org/web/20070819113247/http://trac.adiumx.com/wiki/AboutAdium>, retrieved on Nov. 25, 2011, 2 pages.

(Continued)

*Primary Examiner* — Philip J Chea
*Assistant Examiner* — Hassan A Khan
(74) *Attorney, Agent, or Firm* — Dentons US LLP

(57) ABSTRACT

Systems and processes for providing response suggestions are provided. In one example process, a textual representation of a message is received. Based on the textual representation of the message, one or more response categories and a predetermined number of suggested inputs corresponding to each of the one of more response categories are obtained. Based on the predetermined number of suggested inputs corresponding to each of the one of more response categories, one or more suggested inputs for each of the one or more response categories are determined. The one or more suggested inputs are provided as response suggestions to the message.

42 Claims, 19 Drawing Sheets

(56) References Cited

U.S. PATENT DOCUMENTS

| | | | |
|---|---|---|---|
| 7,478,091 | B2 | 1/2009 | Mojsilovic et al. |
| 7,478,129 | B1 | 1/2009 | Chemtob |
| 7,479,948 | B2 | 1/2009 | Kim et al. |
| 7,479,949 | B2 | 1/2009 | Jobs et al. |
| 7,483,832 | B2 | 1/2009 | Tischer |
| 7,483,894 | B2 | 1/2009 | Cao |
| 7,487,089 | B2 | 2/2009 | Mozer |
| 7,487,093 | B2 | 2/2009 | Mutsuno et al. |
| 7,490,034 | B2 | 2/2009 | Finnigan et al. |
| 7,490,039 | B1 | 2/2009 | Shaffer et al. |
| 7,493,251 | B2 | 2/2009 | Gao et al. |
| 7,493,560 | B1 | 2/2009 | Kipnes et al. |
| 7,496,498 | B2 | 2/2009 | Chu et al. |
| 7,496,512 | B2 | 2/2009 | Zhao et al. |
| 7,499,923 | B2 | 3/2009 | Kawatani |
| 7,502,738 | B2 | 3/2009 | Kennewick et al. |
| 7,505,795 | B1 | 3/2009 | Lim et al. |
| 7,508,324 | B2 | 3/2009 | Suraqui |
| 7,508,373 | B2 | 3/2009 | Lin et al. |
| 7,516,123 | B2 | 4/2009 | Betz et al. |
| 7,519,327 | B2 | 4/2009 | White |
| 7,519,398 | B2 | 4/2009 | Hirose |
| 7,522,927 | B2 | 4/2009 | Fitch et al. |
| 7,523,036 | B2 | 4/2009 | Akabane et al. |
| 7,523,108 | B2 | 4/2009 | Cao |
| 7,526,466 | B2 | 4/2009 | Au |
| 7,526,738 | B2 | 4/2009 | Ording et al. |
| 7,528,713 | B2 | 5/2009 | Singh et al. |
| 7,529,671 | B2 | 5/2009 | Rockenbeck et al. |
| 7,529,676 | B2 | 5/2009 | Koyama |
| 7,529,677 | B1 | 5/2009 | Wittenber |
| 7,535,997 | B1 | 5/2009 | McQuaide, Jr. et al. |
| 7,536,029 | B2 | 5/2009 | Choi et al. |
| 7,536,565 | B2 | 5/2009 | Girish et al. |
| 7,538,685 | B1 | 5/2009 | Cooper et al. |
| 7,539,619 | B1 | 5/2009 | Seligman et al. |
| 7,539,656 | B2 | 5/2009 | Fratkina et al. |
| 7,541,940 | B2 | 6/2009 | Upton |
| 7,542,967 | B2 | 6/2009 | Hurst-Hiller et al. |
| 7,542,971 | B2 | 6/2009 | Thione et al. |
| 7,543,232 | B2 | 6/2009 | Easton, Jr. et al. |
| 7,546,382 | B2 | 6/2009 | Healey et al. |
| 7,546,529 | B2 | 6/2009 | Reynar et al. |
| 7,548,895 | B2 | 6/2009 | Pulsipher |
| 7,552,045 | B2 | 6/2009 | Barliga et al. |
| 7,552,055 | B2 | 6/2009 | Lecoeuche |
| 7,555,431 | B2 | 6/2009 | Bennett |
| 7,555,496 | B1 | 6/2009 | Lantrip et al. |
| 7,558,381 | B1 | 7/2009 | Ali et al. |
| 7,558,730 | B2 | 7/2009 | Davis et al. |
| 7,559,026 | B2 | 7/2009 | Girish et al. |
| 7,561,069 | B2 | 7/2009 | Horstemeyer |
| 7,562,007 | B2 | 7/2009 | Hwang |
| 7,562,032 | B2 | 7/2009 | Abbosh et al. |
| 7,565,104 | B1 | 7/2009 | Brown et al. |
| 7,565,380 | B1 | 7/2009 | Venkatachary |
| 7,567,861 | B2 | 7/2009 | Inagaki |
| 7,568,151 | B2 | 7/2009 | Bargeron et al. |
| 7,571,092 | B1 | 8/2009 | Nieh |
| 7,571,106 | B2 | 8/2009 | Cao et al. |
| 7,577,522 | B2 | 8/2009 | Rosenberg |
| 7,580,551 | B1 | 8/2009 | Srihari et al. |
| 7,580,576 | B2 | 8/2009 | Wang et al. |
| 7,580,839 | B2 | 8/2009 | Tamura et al. |
| 7,584,092 | B2 | 9/2009 | Brockett et al. |
| 7,584,093 | B2 | 9/2009 | Potter et al. |
| 7,584,278 | B2 | 9/2009 | Rajarajan et al. |
| 7,584,429 | B2 | 9/2009 | Fabritius |
| 7,593,868 | B2 | 9/2009 | Margiloff et al. |
| 7,596,269 | B2 | 9/2009 | King et al. |
| 7,596,499 | B2 | 9/2009 | Anguera et al. |
| 7,596,606 | B2 | 9/2009 | Codignotto |
| 7,596,765 | B2 | 9/2009 | Almas |
| 7,599,918 | B2 | 10/2009 | Shen et al. |
| 7,603,349 | B1 | 10/2009 | Kraft et al. |
| 7,603,381 | B2 | 10/2009 | Burke et al. |
| 7,603,684 | B1 | 10/2009 | Ellis |
| 7,606,444 | B1 | 10/2009 | Erol et al. |
| 7,606,712 | B1 | 10/2009 | Smith et al. |
| 7,607,083 | B2 | 10/2009 | Gong et al. |
| 7,609,179 | B2 | 10/2009 | Diaz-Gutierrez et al. |
| 7,610,258 | B2 | 10/2009 | Yuknewicz et al. |
| 7,613,264 | B2 | 11/2009 | Wells et al. |
| 7,614,008 | B2 | 11/2009 | Ording |
| 7,617,094 | B2 | 11/2009 | Aoki et al. |
| 7,620,407 | B1 | 11/2009 | Donald et al. |
| 7,620,549 | B2 | 11/2009 | Di Cristo et al. |
| 7,620,894 | B1 | 11/2009 | Kahn |
| 7,623,119 | B2 | 11/2009 | Autio et al. |
| 7,624,007 | B2 | 11/2009 | Bennett |
| 7,627,481 | B1 | 12/2009 | Kuo et al. |
| 7,630,900 | B1 | 12/2009 | Strom |
| 7,630,901 | B2 | 12/2009 | Omi |
| 7,633,076 | B2 | 12/2009 | Huppi et al. |
| 7,634,409 | B2 | 12/2009 | Kennewick et al. |
| 7,634,413 | B1 | 12/2009 | Kuo et al. |
| 7,634,718 | B2 | 12/2009 | Nakajima |
| 7,634,732 | B1 | 12/2009 | Blagsvedt et al. |
| 7,636,657 | B2 | 12/2009 | Ju et al. |
| 7,640,158 | B2 | 12/2009 | Detlef et al. |
| 7,640,160 | B2 | 12/2009 | Di Cristo et al. |
| 7,643,990 | B1 | 1/2010 | Bellegarda |
| 7,647,225 | B2 | 1/2010 | Bennett et al. |
| 7,649,454 | B2 | 1/2010 | Singh et al. |
| 7,649,877 | B2 | 1/2010 | Vieri et al. |
| 7,653,883 | B2 | 1/2010 | Hotelling et al. |
| 7,656,393 | B2 | 2/2010 | King et al. |
| 7,657,424 | B2 | 2/2010 | Bennett |
| 7,657,430 | B2 | 2/2010 | Ogawa |
| 7,657,828 | B2 | 2/2010 | Lucas et al. |
| 7,657,844 | B2 | 2/2010 | Gibson et al. |
| 7,657,849 | B2 | 2/2010 | Chaudhri et al. |
| 7,660,715 | B1 | 2/2010 | Thambiratnam |
| 7,663,607 | B2 | 2/2010 | Hotelling et al. |
| 7,664,558 | B2 | 2/2010 | Lindahl et al. |
| 7,664,638 | B2 | 2/2010 | Cooper et al. |
| 7,668,710 | B2 | 2/2010 | Doyle |
| 7,669,134 | B1 | 2/2010 | Christie et al. |
| 7,672,841 | B2 | 3/2010 | Bennett |
| 7,672,952 | B2 | 3/2010 | Isaacson et al. |
| 7,673,238 | B2 | 3/2010 | Girish et al. |
| 7,673,251 | B1 | 3/2010 | Wibisono |
| 7,673,340 | B1 | 3/2010 | Cohen et al. |
| 7,676,026 | B1 | 3/2010 | Baxter, Jr. |
| 7,676,365 | B2 | 3/2010 | Hwang et al. |
| 7,676,463 | B2 | 3/2010 | Thompson et al. |
| 7,679,534 | B2 | 3/2010 | Kay et al. |
| 7,680,649 | B2 | 3/2010 | Park |
| 7,681,126 | B2 | 3/2010 | Roose |
| 7,683,886 | B2 | 3/2010 | Willey |
| 7,683,893 | B2 | 3/2010 | Kim |
| 7,684,985 | B2 | 3/2010 | Dominach et al. |
| 7,684,990 | B2 | 3/2010 | Caskey et al. |
| 7,684,991 | B2 | 3/2010 | Stohr et al. |
| 7,689,245 | B2 | 3/2010 | Cox et al. |
| 7,689,408 | B2 | 3/2010 | Chen et al. |
| 7,689,409 | B2 | 3/2010 | Heinecke |
| 7,689,412 | B2 | 3/2010 | Wu et al. |
| 7,689,421 | B2 | 3/2010 | Li et al. |
| 7,693,715 | B2 | 4/2010 | Hwang et al. |
| 7,693,717 | B2 | 4/2010 | Kahn et al. |
| 7,693,719 | B2 | 4/2010 | Chu et al. |
| 7,693,720 | B2 | 4/2010 | Kennewick et al. |
| 7,698,131 | B2 | 4/2010 | Bennett |
| 7,702,500 | B2 | 4/2010 | Blaedow |
| 7,702,508 | B2 | 4/2010 | Bennett |
| 7,703,091 | B1 | 4/2010 | Martin et al. |
| 7,706,510 | B2 | 4/2010 | Ng |
| 7,707,026 | B2 | 4/2010 | Liu |
| 7,707,027 | B2 | 4/2010 | Balchandran et al. |
| 7,707,032 | B2 | 4/2010 | Wang |
| 7,707,221 | B1 | 4/2010 | Dunning et al. |
| 7,707,226 | B1 | 4/2010 | Tonse |
| 7,707,267 | B2 | 4/2010 | Lisitsa et al. |

(56) References Cited

U.S. PATENT DOCUMENTS

| | | | |
|---|---|---|---|
| 7,710,262 | B2 | 5/2010 | Ruha |
| 7,711,129 | B2 | 5/2010 | Lindahl et al. |
| 7,711,550 | B1 | 5/2010 | Feinberg et al. |
| 7,711,565 | B1 | 5/2010 | Gazdzinski |
| 7,711,672 | B2 | 5/2010 | Au |
| 7,712,053 | B2 | 5/2010 | Bradford et al. |
| 7,716,056 | B2 | 5/2010 | Weng et al. |
| 7,716,216 | B1 | 5/2010 | Harik et al. |
| 7,720,674 | B2 | 5/2010 | Kaiser et al. |
| 7,720,683 | B1 | 5/2010 | Vermeulen et al. |
| 7,721,226 | B2 | 5/2010 | Barabe et al. |
| 7,721,301 | B2 | 5/2010 | Wong et al. |
| 7,724,242 | B2 | 5/2010 | Hillis et al. |
| 7,724,696 | B1 | 5/2010 | Parekh |
| 7,725,307 | B2 | 5/2010 | Bennett |
| 7,725,318 | B2 | 5/2010 | Gavalda et al. |
| 7,725,320 | B2 | 5/2010 | Bennett |
| 7,725,321 | B2 | 5/2010 | Bennett |
| 7,725,838 | B2 | 5/2010 | Williams |
| 7,729,904 | B2 | 6/2010 | Bennett |
| 7,729,916 | B2 | 6/2010 | Coffman et al. |
| 7,734,461 | B2 | 6/2010 | Kwak et al. |
| 7,735,012 | B2 | 6/2010 | Naik |
| 7,739,588 | B2 | 6/2010 | Reynar et al. |
| 7,742,953 | B2 | 6/2010 | King et al. |
| 7,743,188 | B2 | 6/2010 | Haitani et al. |
| 7,747,616 | B2 | 6/2010 | Yamada et al. |
| 7,752,152 | B2 | 7/2010 | Paek et al. |
| 7,756,707 | B2 | 7/2010 | Garner et al. |
| 7,756,708 | B2 | 7/2010 | Cohen et al. |
| 7,756,868 | B2 | 7/2010 | Lee |
| 7,756,871 | B2 | 7/2010 | Yacoub et al. |
| 7,757,173 | B2 | 7/2010 | Beaman |
| 7,757,176 | B2 | 7/2010 | Vakil et al. |
| 7,757,182 | B2 | 7/2010 | Elliott et al. |
| 7,761,296 | B1 | 7/2010 | Bakis et al. |
| 7,763,842 | B2 | 7/2010 | Hsu et al. |
| 7,774,202 | B2 | 8/2010 | Spengler et al. |
| 7,774,204 | B2 | 8/2010 | Mozer et al. |
| 7,774,388 | B1 | 8/2010 | Runchey |
| 7,777,717 | B2 | 8/2010 | Fux et al. |
| 7,778,432 | B2 | 8/2010 | Larsen |
| 7,778,595 | B2 | 8/2010 | White et al. |
| 7,778,632 | B2 | 8/2010 | Kurlander et al. |
| 7,778,830 | B2 | 8/2010 | Davis et al. |
| 7,779,069 | B2 | 8/2010 | Frid-nielsen et al. |
| 7,779,353 | B2 | 8/2010 | Grigoriu et al. |
| 7,779,356 | B2 | 8/2010 | Griesmer |
| 7,779,357 | B2 | 8/2010 | Naik |
| 7,783,283 | B2 | 8/2010 | Kuusinen et al. |
| 7,783,486 | B2 | 8/2010 | Rosser et al. |
| 7,788,590 | B2 | 8/2010 | Taboada et al. |
| 7,788,663 | B2 | 8/2010 | Illowsky et al. |
| 7,796,980 | B1 | 9/2010 | McKinney et al. |
| 7,797,265 | B2 | 9/2010 | Brinker et al. |
| 7,797,269 | B2 | 9/2010 | Rieman et al. |
| 7,797,331 | B2 | 9/2010 | Theimer et al. |
| 7,797,629 | B2 | 9/2010 | Fux et al. |
| 7,801,721 | B2 | 9/2010 | Rosart et al. |
| 7,801,728 | B2 | 9/2010 | Ben-David et al. |
| 7,801,729 | B2 | 9/2010 | Mozer |
| 7,805,299 | B2 | 9/2010 | Coifman |
| 7,809,550 | B1 | 10/2010 | Barrows |
| 7,809,565 | B2 | 10/2010 | Coifman |
| 7,809,569 | B2 | 10/2010 | Attwater et al. |
| 7,809,570 | B2 | 10/2010 | Kennewick et al. |
| 7,809,610 | B2 | 10/2010 | Cao |
| 7,809,744 | B2 | 10/2010 | Nevidomski et al. |
| 7,818,165 | B2 | 10/2010 | Carlgren et al. |
| 7,818,176 | B2 | 10/2010 | Freeman et al. |
| 7,818,215 | B2 | 10/2010 | King et al. |
| 7,818,291 | B2 | 10/2010 | Ferguson et al. |
| 7,818,672 | B2 | 10/2010 | Mccormack et al. |
| 7,822,608 | B2 | 10/2010 | Cross, Jr. et al. |
| 7,823,123 | B2 | 10/2010 | Sabbouh |
| 7,826,945 | B2 | 11/2010 | Zhang et al. |
| 7,827,047 | B2 | 11/2010 | Anderson et al. |
| 7,831,246 | B1 | 11/2010 | Smith et al. |
| 7,831,423 | B2 | 11/2010 | Schubert |
| 7,831,426 | B2 | 11/2010 | Bennett |
| 7,831,432 | B2 | 11/2010 | Bodin et al. |
| 7,835,504 | B1 | 11/2010 | Donald et al. |
| 7,836,437 | B2 | 11/2010 | Kacmarcik et al. |
| 7,840,348 | B2 | 11/2010 | Kim et al. |
| 7,840,400 | B2 | 11/2010 | Lavi et al. |
| 7,840,447 | B2 | 11/2010 | Kleinrock et al. |
| 7,840,581 | B2 | 11/2010 | Ross et al. |
| 7,840,912 | B2 | 11/2010 | Elias et al. |
| 7,844,394 | B2 | 11/2010 | Kim |
| 7,848,924 | B2 | 12/2010 | Nurminen et al. |
| 7,848,926 | B2 | 12/2010 | Goto et al. |
| 7,853,444 | B2 | 12/2010 | Wang et al. |
| 7,853,445 | B2 | 12/2010 | Bachenko et al. |
| 7,853,574 | B2 | 12/2010 | Kraenzel et al. |
| 7,853,577 | B2 | 12/2010 | Sundaresan et al. |
| 7,853,664 | B1 | 12/2010 | Wang et al. |
| 7,853,900 | B2 | 12/2010 | Nguyen et al. |
| 7,865,817 | B2 | 1/2011 | Ryan et al. |
| 7,869,998 | B1 | 1/2011 | Di Fabbrizio et al. |
| 7,869,999 | B2 | 1/2011 | Amato et al. |
| 7,870,118 | B2 | 1/2011 | Jiang et al. |
| 7,870,133 | B2 | 1/2011 | Krishnamoorthy et al. |
| 7,873,149 | B2 | 1/2011 | Schultz et al. |
| 7,873,519 | B2 | 1/2011 | Bennett |
| 7,873,523 | B2 | 1/2011 | Potter et al. |
| 7,873,654 | B2 | 1/2011 | Bernard |
| 7,877,705 | B2 | 1/2011 | Chambers et al. |
| 7,880,730 | B2 | 2/2011 | Robinson et al. |
| 7,881,283 | B2 | 2/2011 | Cormier et al. |
| 7,881,936 | B2 | 2/2011 | Longe et al. |
| 7,885,390 | B2 | 2/2011 | Chaudhuri et al. |
| 7,885,844 | B1 | 2/2011 | Cohen et al. |
| 7,886,233 | B2 | 2/2011 | Rainisto et al. |
| 7,889,101 | B2 | 2/2011 | Yokota |
| 7,889,184 | B2 | 2/2011 | Blumenberg et al. |
| 7,889,185 | B2 | 2/2011 | Blumenberg et al. |
| 7,890,329 | B2 | 2/2011 | Wu et al. |
| 7,890,330 | B2 | 2/2011 | Ozkaragoz et al. |
| 7,890,652 | B2 | 2/2011 | Bull et al. |
| 7,895,039 | B2 | 2/2011 | Braho et al. |
| 7,895,531 | B2 | 2/2011 | Radtke et al. |
| 7,899,666 | B2 | 3/2011 | Varone |
| 7,904,297 | B2 | 3/2011 | Mirkovic et al. |
| 7,908,287 | B1 | 3/2011 | Katragadda |
| 7,912,289 | B2 | 3/2011 | Kansal et al. |
| 7,912,699 | B1 | 3/2011 | Saraclar et al. |
| 7,912,702 | B2 | 3/2011 | Bennett |
| 7,912,720 | B1 | 3/2011 | Hakkani-Tur et al. |
| 7,912,828 | B2 | 3/2011 | Bonnet et al. |
| 7,913,185 | B1 | 3/2011 | Benson et al. |
| 7,916,979 | B2 | 3/2011 | Simmons |
| 7,917,367 | B2 | 3/2011 | Di Cristo et al. |
| 7,917,497 | B2 | 3/2011 | Harrison et al. |
| 7,920,678 | B2 | 4/2011 | Cooper et al. |
| 7,920,682 | B2 | 4/2011 | Byrne et al. |
| 7,920,857 | B2 | 4/2011 | Lau et al. |
| 7,925,525 | B2 | 4/2011 | Chin |
| 7,925,610 | B2 | 4/2011 | Elbaz et al. |
| 7,929,805 | B2 | 4/2011 | Wang et al. |
| 7,930,168 | B2 | 4/2011 | Weng et al. |
| 7,930,183 | B2 | 4/2011 | Odell et al. |
| 7,930,197 | B2 | 4/2011 | Ozzie et al. |
| 7,936,339 | B2 | 5/2011 | Marggraff et al. |
| 7,936,861 | B2 | 5/2011 | Martin et al. |
| 7,936,863 | B2 | 5/2011 | John et al. |
| 7,937,075 | B2 | 5/2011 | Zellner |
| 7,941,009 | B2 | 5/2011 | Li et al. |
| 7,945,294 | B2 | 5/2011 | Zhang et al. |
| 7,945,470 | B1 | 5/2011 | Cohen et al. |
| 7,949,529 | B2 | 5/2011 | Weider et al. |
| 7,949,534 | B2 | 5/2011 | Davis et al. |
| 7,949,752 | B2 | 5/2011 | Lange et al. |
| 7,953,679 | B2 | 5/2011 | Chidlovskii et al. |
| 7,957,975 | B2 | 6/2011 | Burns et al. |

(56) References Cited

U.S. PATENT DOCUMENTS 7,958,136 B1 6/2011 Curtis et al.
7,962,179 B2 6/2011 Huang
7,974,835 B2 7/2011 Balchandran et al.
7,974,844 B2 7/2011 Sumita
7,974,972 B2 7/2011 Cao
7,975,216 B2 7/2011 Woolf et al.
7,983,478 B2 7/2011 Liu et al.
7,983,915 B2 7/2011 Knight et al.
7,983,917 B2 7/2011 Kennewick et al.
7,983,919 B2 7/2011 Conkie
7,983,997 B2 7/2011 Allen et al.
7,984,062 B2 7/2011 Dunning et al.
7,986,431 B2 7/2011 Emori et al.
7,987,151 B2 7/2011 Schott et al.
7,987,176 B2 7/2011 Latzina et al.
7,987,244 B1 7/2011 Lewis et al.
7,991,614 B2 8/2011 Washio et al.
7,992,085 B2 8/2011 Wang-Aryattanwanich et al.
7,996,228 B2 8/2011 Miller et al.
7,996,589 B2 8/2011 Schultz et al.
7,996,769 B2 8/2011 Fux et al.
7,996,792 B2 8/2011 Anzures et al.
7,999,669 B2 8/2011 Singh et al.
8,000,453 B2 8/2011 Cooper et al.
8,005,664 B2 8/2011 Hanumanthappa
8,005,679 B2 8/2011 Jordan et al.
8,006,180 B2 8/2011 Tunning et al.
8,010,614 B1 8/2011 Musat et al.
8,014,308 B2 9/2011 Gates et al.
8,015,006 B2 9/2011 Kennewick et al.
8,015,011 B2 9/2011 Nagano et al.
8,015,144 B2 9/2011 Zheng et al.
8,018,431 B1 9/2011 Zehr et al.
8,019,271 B1 9/2011 Izdepski
8,019,604 B2 9/2011 Ma
8,020,104 B2 9/2011 Robarts et al.
8,024,195 B2 9/2011 Mozer et al.
8,024,415 B2 9/2011 Horvitz et al.
8,027,836 B2 9/2011 Baker et al.
8,031,943 B2 10/2011 Chen et al.
8,032,383 B1 10/2011 Bhardwaj et al.
8,036,901 B2 10/2011 Mozer
8,037,034 B2 10/2011 Plachta et al.
8,041,557 B2 10/2011 Liu
8,041,570 B2 10/2011 Mirkovic et al.
8,041,611 B2 10/2011 Kleinrock et al.
8,042,053 B2 10/2011 Darwish et al.
8,046,231 B2 10/2011 Hirota et al.
8,046,363 B2 10/2011 Cha et al.
8,046,374 B1 10/2011 Bromwich et al.
8,050,500 B1 11/2011 Batty et al.
8,054,180 B1 11/2011 Scofield et al.
8,055,296 B1 11/2011 Persson et al.
8,055,502 B2 11/2011 Clark et al.
8,055,708 B2 11/2011 Chitsaz et al.
8,056,070 B2 11/2011 Goller et al.
8,060,824 B2 11/2011 Brownrigg, Jr. et al.
8,064,753 B2 11/2011 Freeman
8,065,143 B2 11/2011 Yanagihara
8,065,155 B1 11/2011 Gazdzinski
8,065,156 B2 11/2011 Gazdzinski
8,068,604 B2 11/2011 Leeds et al.
8,069,046 B2 11/2011 Kennewick et al.
8,069,422 B2 11/2011 Sheshagiri et al.
8,073,681 B2 12/2011 Baldwin et al.
8,073,695 B1 12/2011 Hendricks et al.
8,077,153 B2 12/2011 Benko et al.
8,078,473 B1 12/2011 Gazdzinski
8,082,153 B2 12/2011 Coffman et al.
8,082,498 B2 12/2011 Salamon et al.
8,090,571 B2 1/2012 Elshishiny et al.
8,095,364 B2 1/2012 Longe et al.
8,099,289 B2 1/2012 Mozer et al.
8,099,395 B2 1/2012 Pabla et al.
8,099,418 B2 1/2012 Inoue et al.
8,103,510 B2 1/2012 Sato
8,107,401 B2 1/2012 John et al.
8,112,275 B2 2/2012 Kennewick et al.
8,112,280 B2 2/2012 Lu
8,117,037 B2 2/2012 Gazdzinski
8,117,542 B2 2/2012 Radtke et al.
8,121,413 B2 2/2012 Hwang et al.
8,121,837 B2 2/2012 Agapi et al.
8,122,094 B1 2/2012 Kotab
8,122,353 B2 2/2012 Bouta
8,130,929 B2 3/2012 Wilkes et al.
8,131,557 B2 3/2012 Davis et al.
8,135,115 B1 3/2012 Hogg, Jr. et al.
8,138,912 B2 3/2012 Singh et al.
8,140,330 B2 3/2012 Cevik et al.
8,140,335 B2 3/2012 Kennewick et al.
8,140,368 B2 3/2012 Eggenberger et al.
8,140,567 B2 3/2012 Padovitz et al.
8,145,489 B2 3/2012 Freeman et al.
8,150,694 B2 4/2012 Kennewick et al.
8,150,700 B2 4/2012 Shin et al.
8,155,956 B2 4/2012 Cho et al.
8,156,005 B2 4/2012 Vieri
8,160,877 B1 4/2012 Nucci et al.
8,160,883 B2 4/2012 Lecoeuche
8,165,321 B2 4/2012 Paquier et al.
8,165,886 B1 4/2012 Gagnon et al.
8,166,019 B1 4/2012 Lee et al.
8,166,032 B2 4/2012 Sommer et al.
8,170,790 B2 5/2012 Lee et al.
8,170,966 B1 5/2012 Musat et al.
8,175,872 B2 5/2012 Kristjansson et al.
8,175,876 B2 5/2012 Bou-Ghazale et al.
8,179,370 B1 5/2012 Yamasani et al.
8,188,856 B2 5/2012 Singh et al.
8,190,359 B2 5/2012 Bourne
8,190,596 B2 5/2012 Nambiar et al.
8,194,827 B2 6/2012 Jaiswal et al.
8,195,467 B2 6/2012 Mozer et al.
8,195,468 B2 6/2012 Kennewick et al.
8,200,489 B1 6/2012 Baggenstoss
8,200,495 B2 6/2012 Braho et al.
8,201,109 B2 6/2012 Van Os et al.
8,204,238 B2 6/2012 Mozer
8,205,788 B1 6/2012 Gazdzinski et al.
8,209,183 B1 6/2012 Patel et al.
8,213,911 B2 7/2012 Williams et al.
8,219,115 B1 7/2012 Nelissen
8,219,406 B2 7/2012 Yu et al.
8,219,407 B1 7/2012 Roy et al.
8,219,608 B2 7/2012 alSafadi et al.
8,224,649 B2 7/2012 Chaudhari et al.
8,224,757 B2 7/2012 Bohle
8,228,299 B1 7/2012 Maloney et al.
8,233,919 B2 7/2012 Haag et al.
8,234,111 B2 7/2012 Lloyd et al.
8,239,206 B1 8/2012 LeBeau et al.
8,239,207 B2 8/2012 Seligman et al.
8,244,712 B2 8/2012 Serlet et al.
8,250,071 B1 8/2012 Killalea et al.
8,254,829 B1 8/2012 Kindred et al.
8,255,216 B2 8/2012 White
8,255,217 B2 8/2012 Stent et al.
8,260,247 B2 9/2012 Lazaridis et al.
8,260,617 B2 9/2012 Dhanakshirur et al.
8,260,619 B1 9/2012 Bansal et al.
8,270,933 B2 9/2012 Riemer et al.
8,271,287 B1 9/2012 Kermani
8,275,621 B2 9/2012 Alewine et al.
8,279,171 B2 10/2012 Hirai et al.
8,280,438 B2 10/2012 Barbera
8,285,546 B2 10/2012 Reich
8,285,551 B2 10/2012 Gazdzinski
8,285,553 B2 10/2012 Gazdzinski
8,285,737 B1 10/2012 Lynn et al.
8,290,777 B1 10/2012 Nguyen et al.
8,290,778 B2 10/2012 Gazdzinski
8,290,781 B2 10/2012 Gazdzinski
8,296,124 B1 10/2012 Holsztynska et al.

(56) References Cited

U.S. PATENT DOCUMENTS 8,296,145 B2 10/2012 Clark et al.
8,296,146 B2 10/2012 Gazdzinski
8,296,153 B2 10/2012 Gazdzinski
8,296,380 B1 10/2012 Kelly et al.
8,296,383 B2 10/2012 Lindahl
8,300,776 B2 10/2012 Davies et al.
8,300,801 B2 10/2012 Sweeney et al.
8,301,456 B2 10/2012 Gazdzinski
8,311,189 B2 11/2012 Champlin et al.
8,311,834 B1 11/2012 Gazdzinski
8,311,835 B2 11/2012 Lecoeuche
8,311,838 B2 11/2012 Lindahl et al.
8,312,017 B2 11/2012 Martin et al.
8,321,786 B2 11/2012 Lunati et al.
8,326,627 B2 12/2012 Kennewick et al.
8,332,205 B2 12/2012 Krishnan et al.
8,332,218 B2 12/2012 Cross et al.
8,332,224 B2 12/2012 Di Cristo et al.
8,332,748 B1 12/2012 Karam
8,335,689 B2 12/2012 Wittenstein et al.
8,340,975 B1 12/2012 Rosenberger
8,345,665 B2 1/2013 Vieri et al.
8,346,563 B1 1/2013 Hjelm et al.
8,346,757 B1 1/2013 Lamping et al.
8,352,183 B2 1/2013 Thota et al.
8,352,268 B2 1/2013 Naik et al.
8,352,272 B2 1/2013 Rogers et al.
8,355,919 B2 1/2013 Silverman et al.
8,359,234 B2 1/2013 Vieri
8,370,145 B2 2/2013 Endo et al.
8,370,158 B2 2/2013 Gazdzinski
8,371,503 B2 2/2013 Gazdzinski
8,374,871 B2 2/2013 Ehsani et al.
8,375,320 B2 2/2013 Kotler et al.
8,380,504 B1 2/2013 Peden et al.
8,380,507 B2 2/2013 Herman et al.
8,381,107 B2 2/2013 Rottler et al.
8,381,135 B2 2/2013 Hotelling et al.
8,386,485 B2 2/2013 Kerschberg et al.
8,386,926 B1 2/2013 Matsuoka
8,391,844 B2 3/2013 Lamiraux et al.
8,396,714 B2 3/2013 Rogers et al.
8,396,715 B2 3/2013 Odell et al.
8,401,163 B1 3/2013 Kirchhoff et al.
8,406,745 B1 3/2013 Upadhyay et al.
8,407,239 B2 3/2013 Dean et al.
8,423,288 B2 4/2013 Stahl et al.
8,428,758 B2 4/2013 Naik et al.
8,433,572 B2 4/2013 Caskey et al.
8,433,778 B1 4/2013 Shreesha et al.
8,442,821 B1 5/2013 Vanhoucke
8,447,612 B2 5/2013 Gazdzinski
8,452,597 B2 5/2013 Bringert et al.
8,452,602 B1 5/2013 Bringert et al.
8,457,959 B2 6/2013 Kaiser
8,458,115 B2 6/2013 Cai et al.
8,458,278 B2 6/2013 Christie et al.
8,464,150 B2 6/2013 Davidson et al.
8,473,289 B2 6/2013 Jitkoff et al.
8,479,122 B2 7/2013 Hotelling et al.
8,484,027 B1 7/2013 Murphy
8,489,599 B2 7/2013 Bellotti
8,498,857 B2 7/2013 Kopparapu et al.
8,514,197 B2 8/2013 Shahraray et al.
8,515,736 B1 8/2013 Duta
8,515,750 B1 8/2013 Lei et al.
8,521,513 B2 8/2013 Millett et al.
8,521,531 B1 8/2013 Kim
8,527,276 B1 9/2013 Senior et al.
8,537,033 B2 9/2013 Gueziec
8,539,342 B1 9/2013 Lewis
8,543,375 B2 9/2013 Hong
8,543,397 B1 9/2013 Nguyen
8,543,398 B1 9/2013 Strope et al.
8,560,229 B1 10/2013 Park et al.
8,571,851 B1 10/2013 Tickner et al.
8,577,683 B2 11/2013 DeWitt
8,583,416 B2 11/2013 Huang et al.
8,583,511 B2 11/2013 Hendrickson
8,589,156 B2 11/2013 Burke et al.
8,589,869 B2 11/2013 Wolfram
8,589,911 B1 11/2013 Sharkey et al.
8,595,004 B2 11/2013 Koshinaka
8,595,642 B1 11/2013 Lagassey
8,600,743 B2 12/2013 Lindahl et al.
8,600,746 B1 12/2013 Lei et al.
8,600,930 B2 12/2013 Sata et al.
8,606,090 B2 12/2013 Eyer
8,606,568 B1 12/2013 Tickner et al.
8,606,576 B1 12/2013 Barr et al.
8,606,577 B1 12/2013 Stewart et al.
8,620,659 B2 12/2013 Di Cristo et al.
8,620,662 B2 12/2013 Bellegarda
8,626,681 B1 1/2014 Jurca et al.
8,638,363 B2 1/2014 King
8,639,516 B2 1/2014 Lindahl et al.
8,645,137 B2 2/2014 Bellegarda et al.
8,645,138 B1 2/2014 Weinstein et al.
8,654,936 B1 2/2014 Tofighbakhsh et al.
8,655,646 B2 2/2014 Lee et al.
8,655,901 B1 2/2014 Li et al.
8,660,843 B2 2/2014 Falcon et al.
8,660,849 B2 2/2014 Gruber et al.
8,660,970 B1 2/2014 Fiedorowicz
8,661,112 B2 2/2014 Creamer et al.
8,661,340 B2 2/2014 Goldsmith et al.
8,670,979 B2 3/2014 Gruber et al.
8,675,084 B2 3/2014 Bolton
8,676,904 B2 3/2014 Lindahl
8,677,377 B2 3/2014 Cheyer et al.
8,681,950 B2 3/2014 Vlack et al.
8,682,667 B2 3/2014 Haughay
8,687,777 B1 4/2014 Lavian et al.
8,688,446 B2 4/2014 Yanagihara et al.
8,688,453 B1 4/2014 Joshi et al.
8,689,135 B2 4/2014 Portele et al.
8,694,322 B2 4/2014 Snitkovskiy et al.
8,695,074 B2 4/2014 Saraf et al.
8,696,364 B2 4/2014 Cohen
8,706,472 B2 4/2014 Ramerth et al.
8,706,474 B2 4/2014 Blume et al.
8,706,503 B2 4/2014 Cheyer et al.
8,707,195 B2 4/2014 Fleizach et al.
8,713,119 B2 4/2014 Lindahl et al.
8,713,418 B2 4/2014 King et al.
8,719,006 B2 5/2014 Bellegarda
8,719,014 B2 5/2014 Wagner et al.
8,719,039 B1 5/2014 Sharifi
8,731,610 B2 5/2014 Appaji
8,731,912 B1 5/2014 Tickner et al.
8,731,942 B2 5/2014 Cheyer et al.
8,739,208 B2 5/2014 Rodriguez et al.
8,744,852 B1 6/2014 Seymour et al.
8,751,971 B2 6/2014 Fleizach
8,760,537 B2 6/2014 Johnson et al.
8,762,145 B2 6/2014 Ouchi et al.
8,762,156 B2 6/2014 Chen et al.
8,762,469 B2 6/2014 Lindahl et al.
8,768,693 B2 7/2014 Lempel et al.
8,768,702 B2 7/2014 Boettcher et al.
8,775,154 B2 7/2014 Clinchant et al.
8,775,177 B1 7/2014 Heigold et al.
8,775,931 B2 7/2014 Fux et al.
8,781,456 B2 7/2014 Prociw
8,781,841 B1 7/2014 Wang
8,793,301 B2 7/2014 Wegenkittl et al.
8,798,255 B2 8/2014 Lubowich et al.
8,798,995 B1 8/2014 Edara et al.
8,799,000 B2 8/2014 Guzzoni et al.
8,805,690 B1 8/2014 LeBeau et al.
8,812,302 B2 8/2014 Xiao et al.
8,823,507 B1 9/2014 Touloumtzis
8,831,947 B2 9/2014 Wasserblat et al.
8,838,457 B2 9/2014 Cerra et al.

(56) References Cited

U.S. PATENT DOCUMENTS 8,855,915 B2 10/2014 Furuhata et al.
8,861,925 B1 10/2014 Ohme
8,862,252 B2 10/2014 Rottler et al.
8,868,409 B1 10/2014 Mengibar et al.
8,880,405 B2 11/2014 Cerra et al.
8,886,534 B2 11/2014 Nakano et al.
8,886,540 B2 11/2014 Cerra et al.
8,886,541 B2 11/2014 Friedlander
8,892,446 B2 11/2014 Cheyer
8,893,023 B2 11/2014 Perry et al.
8,898,064 B1 11/2014 Thomas et al.
8,898,568 B2 11/2014 Bull et al.
8,903,716 B2 12/2014 Chen et al.
8,909,693 B2 12/2014 Frissora et al.
8,918,321 B2 12/2014 Czahor
8,922,485 B1 12/2014 Lloyd
8,930,176 B2 1/2015 Li et al.
8,930,191 B2 1/2015 Gruber et al.
8,938,394 B1 1/2015 Faaborg et al.
8,938,450 B2 1/2015 Spivack et al.
8,938,688 B2 1/2015 Bradford et al.
8,942,986 B2 1/2015 Cheyer et al.
8,943,423 B2 1/2015 Merrill et al.
8,972,240 B2 3/2015 Brockett et al.
8,972,432 B2 3/2015 Shaw et al.
8,972,878 B2 3/2015 Mohler et al.
8,983,383 B1 3/2015 Haskin
8,989,713 B2 3/2015 Doulton
8,990,235 B2 3/2015 King et al.
8,994,660 B2 3/2015 Neels et al.
8,996,350 B1 3/2015 Dub et al.
8,996,376 B2 3/2015 Fleizach et al.
8,996,381 B2 3/2015 Mozer et al.
8,996,639 B1 * 3/2015 Faaborg .................. H04L 51/02
709/206
9,009,046 B1 4/2015 Stewart
9,020,804 B2 4/2015 Barbaiani et al.
9,026,425 B2 5/2015 Nikoulina et al.
9,031,834 B2 5/2015 Coorman et al.
9,031,970 B1 5/2015 Das et al.
9,037,967 B1 5/2015 Al-Jefri et al.
9,043,208 B2 5/2015 Koch et al.
9,043,211 B2 5/2015 Haiut et al.
9,049,255 B2 6/2015 MacFarlane et al.
9,049,295 B1 6/2015 Cooper et al.
9,053,706 B2 6/2015 Jitkoff et al.
9,058,811 B2 6/2015 Wang et al.
9,063,979 B2 6/2015 Chiu et al.
9,064,495 B1 6/2015 Torok et al.
9,070,366 B1 6/2015 Mathias et al.
9,071,701 B2 6/2015 Donaldson et al.
9,075,435 B1 7/2015 Nobel et al.
9,076,448 B2 7/2015 Bennett et al.
9,076,450 B1 7/2015 Sadek et al.
9,081,411 B2 7/2015 Kalns et al.
9,081,482 B1 7/2015 Zhai et al.
9,082,402 B2 7/2015 Yadgar et al.
9,083,581 B1 7/2015 Addepalli et al.
9,098,467 B1 8/2015 Blanksteen et al.
9,101,279 B2 8/2015 Ritchey et al.
9,112,984 B2 8/2015 Sejnoha et al.
9,117,447 B2 8/2015 Gruber et al.
9,123,338 B1 9/2015 Sanders et al.
9,159,319 B1 10/2015 Hoffmeister
9,164,983 B2 10/2015 Liu et al.
9,171,541 B2 10/2015 Kennewick et al.
9,171,546 B1 10/2015 Pike
9,183,845 B1 11/2015 Gopalakrishnan et al.
9,190,062 B2 11/2015 Haughay
9,208,153 B1 12/2015 Zaveri et al.
9,213,754 B1 12/2015 Zhang et al.
9,218,809 B2 12/2015 Bellegarda
9,218,819 B1 12/2015 Stekkelpak et al.
9,223,537 B2 12/2015 Brown et al.
9,241,073 B1 1/2016 Van Rensburg et al.
9,255,812 B2 2/2016 Maeoka et al.
9,258,604 B1 2/2016 Bilobrov et al.
9,262,612 B2 2/2016 Cheyer
9,280,535 B2 3/2016 Varma et al.
9,286,910 B1 3/2016 Li et al.
9,292,487 B1 3/2016 Weber
9,292,489 B1 3/2016 Sak et al.
9,299,344 B2 3/2016 Braho et al.
9,300,718 B2 3/2016 Khanna
9,305,543 B2 4/2016 Fleizach et al.
9,305,548 B2 4/2016 Kennewick et al.
9,311,912 B1 4/2016 Swietlinski et al.
9,313,317 B1 4/2016 LeBeau et al.
9,318,108 B2 4/2016 Gruber et al.
9,325,809 B1 4/2016 Barros et al.
9,330,659 B2 5/2016 Ju et al.
9,330,668 B2 5/2016 Nanavati et al.
9,330,720 B2 5/2016 Lee
9,338,493 B2 5/2016 Van Os et al.
9,349,368 B1 5/2016 LeBeau et al.
9,355,472 B2 5/2016 Kocienda et al.
9,361,084 B1 6/2016 Costa
9,367,541 B1 6/2016 Servan et al.
9,377,871 B2 6/2016 Waddell et al.
9,378,740 B1 6/2016 Rosen et al.
9,380,155 B1 6/2016 Reding et al.
9,383,827 B1 7/2016 Faaborg et al.
9,390,726 B1 7/2016 Smus et al.
9,396,722 B2 7/2016 Chung et al.
9,401,147 B2 7/2016 Jitkoff et al.
9,406,224 B1 8/2016 Sanders et al.
9,406,299 B2 8/2016 Gollan et al.
9,412,392 B2 8/2016 Lindahl
9,418,650 B2 8/2016 Bharadwaj et al.
9,423,266 B2 8/2016 Clark et al.
9,424,840 B1 8/2016 Hart et al.
9,436,918 B2 9/2016 Pantel et al.
9,437,186 B1 9/2016 Liu et al.
9,437,189 B2 9/2016 Epstein et al.
9,443,527 B1 9/2016 Watanabe et al.
9,454,599 B2 9/2016 Golden et al.
9,454,957 B1 9/2016 Mathias et al.
9,465,833 B2 10/2016 Aravamudan et al.
9,465,864 B2 10/2016 Hu et al.
9,471,566 B1 10/2016 Zhang et al.
9,483,461 B2 11/2016 Fleizach et al.
9,484,021 B1 11/2016 Mairesse et al.
9,495,129 B2 11/2016 Fleizach et al.
9,501,741 B2 11/2016 Cheyer et al.
9,502,025 B2 11/2016 Kennewick et al.
9,508,028 B2 11/2016 Bannister et al.
9,510,044 B1 11/2016 Pereira et al.
9,514,470 B2 12/2016 Topatan et al.
9,519,453 B2 12/2016 Perkuhn et al.
9,524,355 B2 12/2016 Forbes et al.
9,535,906 B2 1/2017 Lee et al.
9,536,527 B1 1/2017 Carlson
9,547,647 B2 1/2017 Badaskar
9,548,050 B2 1/2017 Gruber et al.
9,569,549 B1 2/2017 Jenkins et al.
9,575,964 B2 2/2017 Yadgar et al.
9,578,173 B2 2/2017 Sanghavi et al.
9,607,612 B2 3/2017 Deleeuw
9,620,113 B2 4/2017 Kennewick et al.
9,620,126 B2 4/2017 Chiba
9,626,955 B2 4/2017 Fleizach et al.
9,633,004 B2 4/2017 Giuli et al.
9,633,191 B2 4/2017 Fleizach et al.
9,633,660 B2 4/2017 Haughay
9,652,453 B2 5/2017 Mathur et al.
9,658,746 B2 5/2017 Cohn et al.
9,659,298 B2 5/2017 Lynch et al.
9,665,567 B2 5/2017 Liu et al.
9,668,121 B2 5/2017 Naik et al.
9,672,725 B2 6/2017 Dotan-Cohen et al.
9,691,378 B1 6/2017 Meyers et al.
9,697,827 B1 7/2017 Lilly et al.
9,698,999 B2 7/2017 Mutagi
9,720,907 B2 8/2017 Bangalore et al.

(56) References Cited

U.S. PATENT DOCUMENTS 9,721,566 B2 8/2017 Newendorp et al.
9,734,817 B1 8/2017 Putrycz
9,734,839 B1 8/2017 Adams
9,741,343 B1 8/2017 Miles et al.
9,747,083 B1 8/2017 Roman et al.
9,755,605 B1 9/2017 Li et al.
9,813,882 B1 11/2017 Masterman
9,818,400 B2 11/2017 Paulik et al.
9,823,828 B2 11/2017 Zambetti et al.
9,842,584 B1 12/2017 Hart et al.
9,858,927 B2 1/2018 Williams et al.
9,886,953 B2 2/2018 Lemay et al.
9,887,949 B2 2/2018 Shepherd et al.
9,934,785 B1 4/2018 Hulaud
9,948,728 B2 4/2018 Linn et al.
9,966,065 B2 5/2018 Gruber et al.
9,966,068 B2 5/2018 Cash et al.
9,967,381 B1 5/2018 Kashimba et al.
9,971,495 B2 5/2018 Shetty et al.
9,984,686 B1 5/2018 Mutagi et al.
9,986,419 B2 5/2018 Naik et al.
9,990,176 B1 6/2018 Gray
10,001,817 B2 6/2018 Zambetti et al.
10,032,455 B2 7/2018 Newman et al.
10,037,758 B2 7/2018 Jing et al.
10,049,663 B2 8/2018 Orr et al.
10,049,668 B2 8/2018 Huang et al.
10,055,681 B2 8/2018 Brown et al.
10,074,360 B2 9/2018 Kim
10,074,371 B1 9/2018 Wang et al.
10,096,319 B1 10/2018 Jin et al.
10,101,887 B2 10/2018 Bernstein et al.
10,102,359 B2 10/2018 Cheyer
10,127,901 B2 11/2018 Zhao et al.
10,127,908 B1 11/2018 Deller et al.
10,169,329 B2 1/2019 Futrell et al.
10,170,123 B2 1/2019 Orr et al.
10,175,879 B2 1/2019 Missig et al.
10,186,254 B2 1/2019 Williams et al.
10,191,627 B2 1/2019 Cieplinski et al.
10,191,646 B2 1/2019 Zambetti et al.
10,191,718 B2 1/2019 Rhee et al.
10,192,546 B1 1/2019 Piersol et al.
10,192,557 B2 1/2019 Lee et al.
10,200,824 B2 2/2019 Gross et al.
10,216,351 B2 2/2019 Yang
10,248,308 B2 4/2019 Karunamuni et al.
10,296,160 B2 5/2019 Shah et al.
10,297,253 B2 5/2019 Walker et al.
10,325,598 B2 6/2019 Basye et al.
10,403,283 B1 9/2019 Schramm et al.
2009/0003115 A1 1/2009 Lindahl et al.
2009/0005012 A1 1/2009 Van Heugten
2009/0005891 A1 1/2009 Batson et al.
2009/0006096 A1 1/2009 Li et al.
2009/0006097 A1 1/2009 Etezadi et al.
2009/0006099 A1 1/2009 Sharpe et al.
2009/0006100 A1 1/2009 Badger et al.
2009/0006343 A1 1/2009 Platt et al.
2009/0006345 A1 1/2009 Platt et al.
2009/0006488 A1 1/2009 Lindahl et al.
2009/0007001 A1 1/2009 Batson et al.
2009/0007188 A1 1/2009 Omernick
2009/0011709 A1 1/2009 Akasaka et al.
2009/0012748 A1 1/2009 Beish et al.
2009/0012775 A1 1/2009 El Hady et al.
2009/0018828 A1 1/2009 Nakadai et al.
2009/0018829 A1 1/2009 Kuperstein
2009/0018834 A1 1/2009 Cooper et al.
2009/0018835 A1 1/2009 Cooper et al.
2009/0018839 A1 1/2009 Cooper et al.
2009/0018840 A1 1/2009 Lutz et al.
2009/0022329 A1 1/2009 Mahowald
2009/0024595 A1 1/2009 Chen
2009/0027334 A1 1/2009 Foulk et al.
2009/0028435 A1 1/2009 Wu et al.
2009/0030685 A1 1/2009 Cerra et al.
2009/0030800 A1 1/2009 Grois
2009/0030978 A1 1/2009 Johnson et al.
2009/0031236 A1 1/2009 Robertson et al.
2009/0043502 A1 2/2009 Shaffer et al.
2009/0043580 A1 2/2009 Mozer et al.
2009/0043583 A1 2/2009 Agapi et al.
2009/0043763 A1 2/2009 Peng
2009/0044094 A1 2/2009 Rapp
2009/0048821 A1 2/2009 Yam et al.
2009/0048841 A1 2/2009 Pollet et al.
2009/0048845 A1 2/2009 Burckart et al.
2009/0049067 A1 2/2009 Murray
2009/0051649 A1 2/2009 Rondel et al.
2009/0054046 A1 2/2009 Whittington et al.
2009/0055168 A1 2/2009 Wu
2009/0055175 A1 2/2009 Terrell et al.
2009/0055179 A1 2/2009 Cho et al.
2009/0055186 A1 2/2009 Lance et al.
2009/0055187 A1 2/2009 Leventhal et al.
2009/0055380 A1 2/2009 Peng et al.
2009/0055381 A1 2/2009 Wu et al.
2009/0055648 A1 2/2009 Kim et al.
2009/0058823 A1 3/2009 Kocienda
2009/0058860 A1 3/2009 Fong et al.
2009/0060351 A1 3/2009 Li et al.
2009/0060472 A1 3/2009 Bull et al.
2009/0063974 A1 3/2009 Bull et al.
2009/0064031 A1 3/2009 Bull et al.
2009/0070097 A1 3/2009 Wu et al.
2009/0070102 A1 3/2009 Maegawa
2009/0070109 A1 3/2009 Didcock et al.
2009/0070114 A1 3/2009 Staszak
2009/0074214 A1 3/2009 Bradford et al.
2009/0076792 A1 3/2009 Lawson-Tancred
2009/0076796 A1 3/2009 Daraselia
2009/0076798 A1 3/2009 Oh et al.
2009/0076819 A1 3/2009 Wouters et al.
2009/0076821 A1 3/2009 Brenner et al.
2009/0076825 A1 3/2009 Bradford et al.
2009/0077047 A1 3/2009 Cooper et al.
2009/0077165 A1 3/2009 Rhodes et al.
2009/0077464 A1 3/2009 Goldsmith et al.
2009/0079622 A1 3/2009 Seshadri et al.
2009/0083034 A1 3/2009 Hernandez et al.
2009/0083035 A1 3/2009 Huang et al.
2009/0083036 A1 3/2009 Zhao et al.
2009/0083037 A1 3/2009 Gleason et al.
2009/0083047 A1 3/2009 Lindahl et al.
2009/0083249 A1 3/2009 Basson et al.
2009/0089058 A1 4/2009 Bellegarda
2009/0091537 A1 4/2009 Huang et al.
2009/0092239 A1 4/2009 Macwan
2009/0092260 A1 4/2009 Powers
2009/0092261 A1 4/2009 Bard
2009/0092262 A1 4/2009 Costa et al.
2009/0094029 A1 4/2009 Koch et al.
2009/0094033 A1 4/2009 Mozer et al.
2009/0097634 A1 4/2009 Nambiar et al.
2009/0097637 A1 4/2009 Boscher et al.
2009/0098903 A1 4/2009 Donaldson et al.
2009/0100049 A1 4/2009 Cao
2009/0100454 A1 4/2009 Weber
2009/0104898 A1 4/2009 Harris
2009/0106026 A1 4/2009 Ferrieux
2009/0106376 A1 4/2009 Tom et al.
2009/0106397 A1 4/2009 O'Keefe
2009/0109019 A1 4/2009 Peterson et al.
2009/0112572 A1 4/2009 Thorn
2009/0112576 A1 4/2009 Jackson et al.
2009/0112592 A1 4/2009 Candelore et al.
2009/0112596 A1 4/2009 Syrdal et al.
2009/0112600 A1 4/2009 Gilbert et al.
2009/0112677 A1 4/2009 Rhett
2009/0112892 A1 4/2009 Cardie et al.
2009/0119587 A1 5/2009 Allen et al.
2009/0123021 A1 5/2009 Jung et al.
2009/0123071 A1 5/2009 Iwasaki

(56) References Cited

U.S. PATENT DOCUMENTS

2009/0125299 A1 5/2009 Wang
2009/0125477 A1 5/2009 Lu et al.
2009/0125602 A1 5/2009 Bhatia et al.
2009/0125813 A1 5/2009 Shen et al.
2009/0125947 A1 5/2009 Ibaraki
2009/0128505 A1 5/2009 Partridge et al.
2009/0132253 A1 5/2009 Bellegarda
2009/0132255 A1 5/2009 Lu
2009/0132378 A1 5/2009 Othmer et al.
2009/0137286 A1 5/2009 Luke et al.
2009/0138263 A1 5/2009 Shozakai et al.
2009/0138430 A1 5/2009 Nambiar et al.
2009/0138736 A1 5/2009 Chin
2009/0138828 A1 5/2009 Schultz et al.
2009/0144036 A1 6/2009 Jorgensen et al.
2009/0144049 A1 6/2009 Haddad et al.
2009/0144428 A1 6/2009 Bowater et al.
2009/0144609 A1 6/2009 Liang et al.
2009/0146848 A1 6/2009 Ghassabian
2009/0150147 A1 6/2009 Jacoby et al.
2009/0150156 A1 6/2009 Kennewick et al.
2009/0150553 A1 6/2009 Collart et al.
2009/0152349 A1 6/2009 Bonev et al.
2009/0153288 A1 6/2009 Hope et al.
2009/0154669 A1 6/2009 Wood et al.
2009/0157382 A1 6/2009 Bar
2009/0157384 A1 6/2009 Toutanova et al.
2009/0157401 A1 6/2009 Bennett
2009/0157513 A1 6/2009 Bonev et al.
2009/0158200 A1 6/2009 Palahnuk et al.
2009/0158323 A1 6/2009 Bober et al.
2009/0158423 A1 6/2009 Orlassino et al.
2009/0160761 A1 6/2009 Moosavi et al.
2009/0160803 A1 6/2009 Hashimoto
2009/0163243 A1 6/2009 Barbera
2009/0164301 A1 6/2009 O'Sullivan et al.
2009/0164441 A1 6/2009 Cheyer
2009/0164450 A1 6/2009 Martinez et al.
2009/0164655 A1 6/2009 Pettersson et al.
2009/0164937 A1 6/2009 Alviar et al.
2009/0167508 A1 7/2009 Fadell et al.
2009/0167509 A1 7/2009 Fadell et al.
2009/0171578 A1 7/2009 Kim et al.
2009/0171662 A1 7/2009 Huang et al.
2009/0171664 A1 7/2009 Kennewick et al.
2009/0172108 A1 7/2009 Singh
2009/0172542 A1 7/2009 Girish et al.
2009/0174667 A1 7/2009 Kocienda et al.
2009/0174677 A1 7/2009 Gehani et al.
2009/0177300 A1 7/2009 Lee
2009/0177461 A1 7/2009 Ehsani et al.
2009/0177966 A1 7/2009 Chaudhri
2009/0182445 A1 7/2009 Girish et al.
2009/0182549 A1 7/2009 Anisimovich et al.
2009/0182702 A1 7/2009 Miller
2009/0183070 A1 7/2009 Robbins
2009/0187402 A1 7/2009 Scholl
2009/0187577 A1 7/2009 Reznik et al.
2009/0187950 A1 7/2009 Nicas et al.
2009/0190774 A1 7/2009 Wang et al.
2009/0191895 A1 7/2009 Singh et al.
2009/0192782 A1 7/2009 Drewes
2009/0192787 A1 7/2009 Roon
2009/0192798 A1 7/2009 Basson et al.
2009/0198497 A1 8/2009 Kwon
2009/0204402 A1 8/2009 Marwaha et al.
2009/0204409 A1 8/2009 Mozer et al.
2009/0204478 A1 8/2009 Kaib et al.
2009/0204596 A1 8/2009 Brun et al.
2009/0204601 A1 8/2009 Grasset
2009/0204620 A1 8/2009 Thione et al.
2009/0210230 A1 8/2009 Schwarz et al.
2009/0210232 A1 8/2009 Sanchez et al.
2009/0213134 A1 8/2009 Stephanick et al.
2009/0215466 A1 8/2009 Ahl et al.
2009/0215503 A1 8/2009 Zhang et al.
2009/0216396 A1 8/2009 Yamagata
2009/0216528 A1 8/2009 Gemello et al.
2009/0216540 A1 8/2009 Tessel et al.
2009/0216704 A1 8/2009 Zheng et al.
2009/0219166 A1 9/2009 MacFarlane et al.
2009/0221274 A1 9/2009 Venkatakrishnan et al.
2009/0222257 A1 9/2009 Sumita et al.
2009/0222270 A2 9/2009 Likens et al.
2009/0222488 A1 9/2009 Boerries et al.
2009/0224867 A1 9/2009 O'Shaughnessy et al.
2009/0225041 A1 9/2009 Kida et al.
2009/0228126 A1 9/2009 Spielberg et al.
2009/0228273 A1 9/2009 Wang et al.
2009/0228277 A1 9/2009 Bonforte et al.
2009/0228281 A1 9/2009 Singleton et al.
2009/0228439 A1 9/2009 Manolescu et al.
2009/0228792 A1 9/2009 Van Os et al.
2009/0228842 A1 9/2009 Westerman et al.
2009/0228897 A1 9/2009 Murray et al.
2009/0233264 A1 9/2009 Rogers et al.
2009/0234638 A1 9/2009 Ranjan et al.
2009/0234651 A1 9/2009 Basir et al.
2009/0234655 A1 9/2009 Kwon
2009/0235280 A1 9/2009 Tannier et al.
2009/0239202 A1 9/2009 Stone
2009/0239552 A1 9/2009 Churchill et al.
2009/0240485 A1 9/2009 Dalal et al.
2009/0241054 A1 9/2009 Hendricks
2009/0241760 A1 10/2009 Georges
2009/0247237 A1 10/2009 Mittleman et al.
2009/0248182 A1 10/2009 Logan et al.
2009/0248395 A1 10/2009 Alewine et al.
2009/0248402 A1 10/2009 Ito et al.
2009/0248420 A1 10/2009 Basir et al.
2009/0248422 A1 10/2009 Li et al.
2009/0248456 A1 10/2009 Fahmy et al.
2009/0249198 A1 10/2009 Davis et al.
2009/0249247 A1 10/2009 Tseng et al.
2009/0252350 A1 10/2009 Seguin
2009/0253457 A1 10/2009 Seguin
2009/0253463 A1 10/2009 Shin et al.
2009/0254339 A1 10/2009 Seguin
2009/0254345 A1 10/2009 Fleizach et al.
2009/0254819 A1 10/2009 Song et al.
2009/0254823 A1 10/2009 Barrett
2009/0259472 A1 10/2009 Schroeter
2009/0259475 A1 10/2009 Yamagami et al.
2009/0259969 A1 10/2009 Pallakoff
2009/0265171 A1 10/2009 Davis
2009/0265175 A1 10/2009 Fang
2009/0265368 A1 10/2009 Crider et al.
2009/0271109 A1 10/2009 Lee et al.
2009/0271175 A1 10/2009 Bodin et al.
2009/0271176 A1 10/2009 Bodin et al.
2009/0271178 A1 10/2009 Bodin et al.
2009/0271188 A1 10/2009 Agapi et al.
2009/0271189 A1 10/2009 Agapi et al.
2009/0274315 A1 11/2009 Carnes et al.
2009/0274376 A1 11/2009 Selvaraj et al.
2009/0276215 A1 11/2009 Hager
2009/0278804 A1 11/2009 Rubanovich et al.
2009/0281789 A1 11/2009 Waibel et al.
2009/0284471 A1* 11/2009 Longe .................. G06F 40/232
345/168
2009/0284482 A1 11/2009 Chin
2009/0286514 A1 11/2009 Lichorowic et al.
2009/0287583 A1 11/2009 Holmes
2009/0290718 A1 11/2009 Kahn et al.
2009/0292674 A1 11/2009 Dasdan et al.
2009/0292987 A1 11/2009 Sorenson
2009/0296552 A1 12/2009 Hicks et al.
2009/0298474 A1 12/2009 George
2009/0298529 A1 12/2009 Mahajan
2009/0299730 A1 12/2009 Joh et al.
2009/0299745 A1 12/2009 Kennewick et al.
2009/0299751 A1 12/2009 Jung
2009/0299849 A1 12/2009 Cao et al.
2009/0300391 A1 12/2009 Jessup et al.

(56) References Cited

U.S. PATENT DOCUMENTS

| | | | |
|---|---|---|---|
| 2009/0300488 | A1 | 12/2009 | Salamon et al. |
| 2009/0304198 | A1 | 12/2009 | Herre et al. |
| 2009/0305203 | A1 | 12/2009 | Okumura et al. |
| 2009/0306967 | A1 | 12/2009 | Nicolov et al. |
| 2009/0306969 | A1 | 12/2009 | Goud et al. |
| 2009/0306979 | A1 | 12/2009 | Jaiswal et al. |
| 2009/0306980 | A1 | 12/2009 | Shin |
| 2009/0306981 | A1 | 12/2009 | Cromack et al. |
| 2009/0306985 | A1 | 12/2009 | Roberts et al. |
| 2009/0306988 | A1 | 12/2009 | Chen et al. |
| 2009/0306989 | A1 | 12/2009 | Kaji |
| 2009/0307162 | A1 | 12/2009 | Bui et al. |
| 2009/0307201 | A1 | 12/2009 | Dunning et al. |
| 2009/0307584 | A1 | 12/2009 | Davidson et al. |
| 2009/0307594 | A1 | 12/2009 | Kosonen et al. |
| 2009/0309352 | A1 | 12/2009 | Walker et al. |
| 2009/0313014 | A1 | 12/2009 | Shin et al. |
| 2009/0313020 | A1 | 12/2009 | Koivunen |
| 2009/0313023 | A1 | 12/2009 | Jones |
| 2009/0313026 | A1 | 12/2009 | Coffman et al. |
| 2009/0313544 | A1 | 12/2009 | Wood et al. |
| 2009/0313564 | A1 | 12/2009 | Rottler et al. |
| 2009/0316943 | A1 | 12/2009 | Frigola Munoz et al. |
| 2009/0318119 | A1 | 12/2009 | Basir et al. |
| 2009/0318198 | A1 | 12/2009 | Carroll |
| 2009/0319257 | A1 | 12/2009 | Blume et al. |
| 2009/0319266 | A1 | 12/2009 | Brown et al. |
| 2009/0319342 | A1 | 12/2009 | Shilman et al. |
| 2009/0326923 | A1 | 12/2009 | Yan et al. |
| 2009/0326936 | A1 | 12/2009 | Nagashima |
| 2009/0326938 | A1 | 12/2009 | Marila et al. |
| 2009/0326949 | A1 | 12/2009 | Douthitt et al. |
| 2009/0327977 | A1 | 12/2009 | Bachfischer et al. |
| 2010/0004918 | A1 | 1/2010 | Lee et al. |
| 2010/0004930 | A1 | 1/2010 | Strope et al. |
| 2010/0004931 | A1 | 1/2010 | Ma et al. |
| 2010/0005081 | A1 | 1/2010 | Bennett |
| 2010/0010803 | A1 | 1/2010 | Ishikawa et al. |
| 2010/0010814 | A1 | 1/2010 | Patel |
| 2010/0010948 | A1 | 1/2010 | Ito et al. |
| 2010/0013760 | A1 | 1/2010 | Hirai et al. |
| 2010/0013796 | A1 | 1/2010 | Abileah et al. |
| 2010/0017212 | A1 | 1/2010 | Attwater et al. |
| 2010/0017382 | A1 | 1/2010 | Katragadda et al. |
| 2010/0019834 | A1 | 1/2010 | Zerbe et al. |
| 2010/0020035 | A1 | 1/2010 | Ryu et al. |
| 2010/0023318 | A1 | 1/2010 | Lemoine |
| 2010/0023320 | A1 | 1/2010 | Di Cristo et al. |
| 2010/0023331 | A1 | 1/2010 | Duta et al. |
| 2010/0026526 | A1 | 2/2010 | Yokota |
| 2010/0030549 | A1 | 2/2010 | Lee et al. |
| 2010/0030562 | A1 | 2/2010 | Yoshizawa et al. |
| 2010/0030928 | A1 | 2/2010 | Conroy et al. |
| 2010/0031143 | A1 | 2/2010 | Rao et al. |
| 2010/0031150 | A1 | 2/2010 | Andrew |
| 2010/0036653 | A1 | 2/2010 | Kim et al. |
| 2010/0036655 | A1 | 2/2010 | Cecil et al. |
| 2010/0036660 | A1 | 2/2010 | Bennett |
| 2010/0036829 | A1 | 2/2010 | Leyba |
| 2010/0036928 | A1 | 2/2010 | Granito et al. |
| 2010/0037183 | A1 | 2/2010 | Miyashita et al. |
| 2010/0037187 | A1 | 2/2010 | Kondziela |
| 2010/0042400 | A1 | 2/2010 | Block et al. |
| 2010/0042576 | A1 | 2/2010 | Roettger et al. |
| 2010/0046842 | A1 | 2/2010 | Conwell |
| 2010/0049498 | A1 | 2/2010 | Cao et al. |
| 2010/0049514 | A1 | 2/2010 | Kennewick et al. |
| 2010/0050064 | A1 | 2/2010 | Liu et al. |
| 2010/0054512 | A1 | 3/2010 | Solum |
| 2010/0054601 | A1 | 3/2010 | Anbalagan et al. |
| 2010/0057435 | A1 | 3/2010 | Kent et al. |
| 2010/0057443 | A1 | 3/2010 | Di Cristo et al. |
| 2010/0057457 | A1 | 3/2010 | Ogata et al. |
| 2010/0057461 | A1 | 3/2010 | Neubacher et al. |
| 2010/0057643 | A1 | 3/2010 | Yang |
| 2010/0058200 | A1 | 3/2010 | Jablokov et al. |
| 2010/0060646 | A1 | 3/2010 | Unsal et al. |
| 2010/0063804 | A1 | 3/2010 | Sato et al. |
| 2010/0063825 | A1 | 3/2010 | Williams et al. |
| 2010/0063961 | A1 | 3/2010 | Guiheneuf et al. |
| 2010/0064113 | A1 | 3/2010 | Lindahl et al. |
| 2010/0064218 | A1 | 3/2010 | Bull et al. |
| 2010/0064226 | A1 | 3/2010 | Stefaniak et al. |
| 2010/0066546 | A1 | 3/2010 | Aaron |
| 2010/0066684 | A1 | 3/2010 | Shahraray et al. |
| 2010/0067723 | A1 | 3/2010 | Bergmann et al. |
| 2010/0067867 | A1 | 3/2010 | Lin |
| 2010/0070281 | A1 | 3/2010 | Conkie et al. |
| 2010/0070517 | A1 | 3/2010 | Ghosh et al. |
| 2010/0070521 | A1 | 3/2010 | Clinchant et al. |
| 2010/0070899 | A1 | 3/2010 | Hunt et al. |
| 2010/0071003 | A1 | 3/2010 | Bychkov et al. |
| 2010/0076760 | A1 | 3/2010 | Kraenzel et al. |
| 2010/0076968 | A1 | 3/2010 | Boyns et al. |
| 2010/0076993 | A1 | 3/2010 | Klawitter et al. |
| 2010/0077350 | A1 | 3/2010 | Lim et al. |
| 2010/0079501 | A1 | 4/2010 | Ikeda et al. |
| 2010/0079508 | A1 | 4/2010 | Hodge et al. |
| 2010/0080398 | A1 | 4/2010 | Waldmann |
| 2010/0080470 | A1 | 4/2010 | Deluca et al. |
| 2010/0081456 | A1 | 4/2010 | Singh et al. |
| 2010/0081487 | A1 | 4/2010 | Chen et al. |
| 2010/0082286 | A1 | 4/2010 | Leung |
| 2010/0082327 | A1 | 4/2010 | Rogers et al. |
| 2010/0082328 | A1 | 4/2010 | Rogers et al. |
| 2010/0082329 | A1 | 4/2010 | Silverman et al. |
| 2010/0082333 | A1 | 4/2010 | Al-Shammari |
| 2010/0082343 | A1 | 4/2010 | Levit et al. |
| 2010/0082346 | A1 | 4/2010 | Rogers et al. |
| 2010/0082347 | A1 | 4/2010 | Rogers et al. |
| 2010/0082348 | A1 | 4/2010 | Silverman et al. |
| 2010/0082349 | A1 | 4/2010 | Bellegarda et al. |
| 2010/0082376 | A1 | 4/2010 | Levitt |
| 2010/0082567 | A1 | 4/2010 | Rosenblatt et al. |
| 2010/0082970 | A1 | 4/2010 | Lindahl et al. |
| 2010/0086152 | A1 | 4/2010 | Rank et al. |
| 2010/0086153 | A1 | 4/2010 | Hagen et al. |
| 2010/0086156 | A1 | 4/2010 | Rank et al. |
| 2010/0088020 | A1 | 4/2010 | Sano et al. |
| 2010/0088093 | A1 | 4/2010 | Lee et al. |
| 2010/0088100 | A1 | 4/2010 | Lindahl |
| 2010/0094632 | A1 | 4/2010 | Davis et al. |
| 2010/0100080 | A1 | 4/2010 | Huculak et al. |
| 2010/0100212 | A1 | 4/2010 | Lindahl et al. |
| 2010/0100384 | A1 | 4/2010 | Ju et al. |
| 2010/0100385 | A1 | 4/2010 | Wohlert et al. |
| 2010/0100515 | A1 | 4/2010 | Bangalore et al. |
| 2010/0100816 | A1 | 4/2010 | Mccloskey et al. |
| 2010/0103776 | A1 | 4/2010 | Chan |
| 2010/0106486 | A1 | 4/2010 | Hua et al. |
| 2010/0106498 | A1 | 4/2010 | Morrison et al. |
| 2010/0106500 | A1 | 4/2010 | McKee et al. |
| 2010/0106503 | A1 | 4/2010 | Farrell et al. |
| 2010/0114856 | A1 | 5/2010 | Kuboyama |
| 2010/0114887 | A1 | 5/2010 | Conway et al. |
| 2010/0121637 | A1 | 5/2010 | Roy et al. |
| 2010/0125456 | A1 | 5/2010 | Weng et al. |
| 2010/0125458 | A1 | 5/2010 | Franco et al. |
| 2010/0125460 | A1 | 5/2010 | Mellott et al. |
| 2010/0127854 | A1 | 5/2010 | Moore et al. |
| 2010/0128701 | A1 | 5/2010 | Nagaraja |
| 2010/0131265 | A1 | 5/2010 | Boda et al. |
| 2010/0131269 | A1 | 5/2010 | Park et al. |
| 2010/0131273 | A1 | 5/2010 | Aley-Raz et al. |
| 2010/0131498 | A1 | 5/2010 | Linthicum et al. |
| 2010/0131899 | A1 | 5/2010 | Hubert |
| 2010/0138215 | A1 | 6/2010 | Williams |
| 2010/0138224 | A1 | 6/2010 | Bedingfield, Sr. |
| 2010/0138416 | A1 | 6/2010 | Bellotti |
| 2010/0138680 | A1 | 6/2010 | Brisebois et al. |
| 2010/0138759 | A1 | 6/2010 | Roy |
| 2010/0138798 | A1 | 6/2010 | Wilson et al. |
| 2010/0142740 | A1 | 6/2010 | Roerup |
| 2010/0145694 | A1 | 6/2010 | Ju et al. |

(56) References Cited

U.S. PATENT DOCUMENTS

2010/0145700 A1 6/2010 Kennewick et al.
2010/0145707 A1 6/2010 Ljolje et al.
2010/0146442 A1 6/2010 Nagasaka et al.
2010/0150321 A1 6/2010 Harris et al.
2010/0153114 A1 6/2010 Shih et al.
2010/0153115 A1 6/2010 Klee et al.
2010/0153448 A1 6/2010 Harpur et al.
2010/0153576 A1 6/2010 Wohlert et al.
2010/0161311 A1 6/2010 Massuh
2010/0161313 A1 6/2010 Karttunen
2010/0161337 A1 6/2010 Pulz et al.
2010/0161554 A1 6/2010 Datuashvili et al.
2010/0164897 A1 7/2010 Morin et al.
2010/0169075 A1 7/2010 Raffa et al.
2010/0169093 A1 7/2010 Washio
2010/0169097 A1 7/2010 Nachman et al.
2010/0169098 A1 7/2010 Patch
2010/0171713 A1 7/2010 Kwok et al.
2010/0174544 A1 7/2010 Heifets
2010/0175066 A1 7/2010 Paik
2010/0179932 A1 7/2010 Yoon et al.
2010/0179991 A1 7/2010 Lorch et al.
2010/0180218 A1 7/2010 Boston et al.
2010/0185434 A1 7/2010 Burvall et al.
2010/0185448 A1 7/2010 Meisel
2010/0185949 A1 7/2010 Jaeger
2010/0191520 A1 7/2010 Gruhn et al.
2010/0197359 A1 8/2010 Harris
2010/0198821 A1 8/2010 Loritz et al.
2010/0199180 A1 8/2010 Brichter et al.
2010/0199215 A1 8/2010 Seymour et al.
2010/0199340 A1 8/2010 Jonas et al.
2010/0204986 A1 8/2010 Kennewick et al.
2010/0211199 A1 8/2010 Naik et al.
2010/0211379 A1 8/2010 Gorman et al.
2010/0211644 A1 8/2010 Lavoie et al.
2010/0216509 A1 8/2010 Riemer et al.
2010/0217581 A1 8/2010 Hong
2010/0217604 A1 8/2010 Baldwin et al.
2010/0222033 A1 9/2010 Scott et al.
2010/0222098 A1 9/2010 Garg
2010/0223055 A1 9/2010 Mclean
2010/0223056 A1 9/2010 Kadirkamanathan et al.
2010/0223131 A1 9/2010 Scott et al.
2010/0225599 A1 9/2010 Danielsson et al.
2010/0225809 A1 9/2010 Connors et al.
2010/0227642 A1 9/2010 Kim et al.
2010/0228540 A1 9/2010 Bennett
2010/0228549 A1 9/2010 Herman et al.
2010/0228691 A1 9/2010 Yang et al.
2010/0229082 A1 9/2010 Karmarkar et al.
2010/0229100 A1 9/2010 Miller et al.
2010/0231474 A1 9/2010 Yamagajo et al.
2010/0235167 A1 9/2010 Bourdon
2010/0235341 A1 9/2010 Bennett
2010/0235729 A1 9/2010 Kocienda et al.
2010/0235732 A1 9/2010 Bergman
2010/0235770 A1 9/2010 Ording et al.
2010/0235780 A1 9/2010 Westerman et al.
2010/0235793 A1 9/2010 Ording et al.
2010/0241418 A1 9/2010 Maeda et al.
2010/0250542 A1 9/2010 Fujimaki
2010/0250599 A1 9/2010 Schmidt et al.
2010/0255858 A1 10/2010 Juhasz
2010/0257160 A1 10/2010 Cao
2010/0257478 A1 10/2010 Longe et al.
2010/0257490 A1 10/2010 Lyon et al.
2010/0262599 A1 10/2010 Nitz
2010/0263015 A1 10/2010 Pandey et al.
2010/0268537 A1 10/2010 Al-Telmissani
2010/0268539 A1 10/2010 Xu et al.
2010/0269040 A1 10/2010 Lee
2010/0274753 A1 10/2010 Liberty et al.
2010/0277579 A1 11/2010 Cho et al.
2010/0278320 A1 11/2010 Arsenault et al.
2010/0278391 A1 11/2010 Hsu et al.
2010/0278453 A1 11/2010 King
2010/0280983 A1 11/2010 Cho et al.
2010/0281034 A1 11/2010 Petrou et al.
2010/0286984 A1 11/2010 Wandinger et al.
2010/0286985 A1 11/2010 Kennewick et al.
2010/0287514 A1 11/2010 Cragun et al.
2010/0290632 A1 11/2010 Lin
2010/0293460 A1 11/2010 Budelli
2010/0295645 A1 11/2010 Falldin et al.
2010/0299133 A1 11/2010 Kopparapu et al.
2010/0299138 A1 11/2010 Kim
2010/0299142 A1 11/2010 Freeman et al.
2010/0302056 A1 12/2010 Dutton et al.
2010/0303254 A1 12/2010 Yoshizawa et al.
2010/0304342 A1 12/2010 Zilber
2010/0304705 A1 12/2010 Hursey et al.
2010/0305807 A1 12/2010 Basir et al.
2010/0305947 A1 12/2010 Schwarz et al.
2010/0312547 A1 12/2010 Van Os et al.
2010/0312566 A1 12/2010 Odinak et al.
2010/0318366 A1 12/2010 Sullivan et al.
2010/0318576 A1 12/2010 Kim
2010/0322438 A1 12/2010 Siotis
2010/0324709 A1 12/2010 Starmen
2010/0324895 A1 12/2010 Kurzweil et al.
2010/0324896 A1 12/2010 Attwater et al.
2010/0324905 A1 12/2010 Kurzweil et al.
2010/0325131 A1 12/2010 Dumais et al.
2010/0325158 A1 12/2010 Oral et al.
2010/0325573 A1 12/2010 Estrada et al.
2010/0325588 A1 12/2010 Reddy et al.
2010/0330908 A1 12/2010 Maddern et al.
2010/0332003 A1 12/2010 Yaguez
2010/0332220 A1 12/2010 Hursey et al.
2010/0332224 A1 12/2010 Mäkelä et al.
2010/0332235 A1 12/2010 David
2010/0332236 A1 12/2010 Tan
2010/0332280 A1 12/2010 Bradley et al.
2010/0332348 A1 12/2010 Cao
2010/0332428 A1 12/2010 Mchenry et al.
2010/0332976 A1 12/2010 Fux et al.
2010/0333030 A1 12/2010 Johns
2010/0333163 A1 12/2010 Daly
2011/0002487 A1 1/2011 Panther et al.
2011/0004475 A1 1/2011 Bellegarda
2011/0006876 A1 1/2011 Moberg et al.
2011/0009107 A1 1/2011 Guba et al.
2011/0010178 A1 1/2011 Lee et al.
2011/0010644 A1 1/2011 Merrill et al.
2011/0015928 A1 1/2011 Odell et al.
2011/0016150 A1 1/2011 Engstrom et al.
2011/0016421 A1 1/2011 Krupka et al.
2011/0018695 A1 1/2011 Bells et al.
2011/0021211 A1 1/2011 Ohki
2011/0021213 A1 1/2011 Carr
2011/0022292 A1 1/2011 Shen et al.
2011/0022388 A1 1/2011 Wu et al.
2011/0022393 A1 1/2011 Waller et al.
2011/0022394 A1 1/2011 Wide et al.
2011/0022472 A1 1/2011 Zon et al.
2011/0022952 A1 1/2011 Wu et al.
2011/0029616 A1 2/2011 Wang et al.
2011/0030067 A1 2/2011 Wilson
2011/0033064 A1 2/2011 Johnson et al.
2011/0034183 A1 2/2011 Haag et al.
2011/0035144 A1 2/2011 Okamoto et al.
2011/0035434 A1 2/2011 Lockwood
2011/0038489 A1 2/2011 Visser et al.
2011/0039584 A1 2/2011 Merrett
2011/0040707 A1 2/2011 Theisen et al.
2011/0045841 A1 2/2011 Kuhlke et al.
2011/0047072 A1 2/2011 Ciurea
2011/0047149 A1 2/2011 Vaananen
2011/0047161 A1 2/2011 Myaeng et al.
2011/0047266 A1 2/2011 Yu et al.
2011/0047605 A1 2/2011 Sontag et al.
2011/0050591 A1 3/2011 Kim et al.
2011/0050592 A1 3/2011 Kim et al.

(56) References Cited

U.S. PATENT DOCUMENTS

2011/0054647 A1 3/2011 Chipchase et al.
2011/0054894 A1 3/2011 Phillips et al.
2011/0054901 A1 3/2011 Qin et al.
2011/0055256 A1 3/2011 Phillips et al.
2011/0060584 A1 3/2011 Ferrucci et al.
2011/0060587 A1 3/2011 Phillips et al.
2011/0060589 A1 3/2011 Weinberg et al.
2011/0060807 A1 3/2011 Martin et al.
2011/0060812 A1 3/2011 Middleton
2011/0064378 A1 3/2011 Gharaat et al.
2011/0064387 A1 3/2011 Mendeloff et al.
2011/0065456 A1 3/2011 Brennan et al.
2011/0066366 A1 3/2011 Ellanti et al.
2011/0066436 A1 3/2011 Bezar
2011/0066468 A1 3/2011 Huang et al.
2011/0066634 A1 3/2011 Phillips et al.
2011/0072033 A1 3/2011 White et al.
2011/0072492 A1 3/2011 Mohler et al.
2011/0075818 A1 3/2011 Vance et al.
2011/0076994 A1 3/2011 Kim et al.
2011/0077943 A1 3/2011 Miki et al.
2011/0080260 A1 4/2011 Wang et al.
2011/0081889 A1 4/2011 Gao et al.
2011/0082688 A1 4/2011 Kim et al.
2011/0083079 A1 4/2011 Farrell et al.
2011/0087491 A1 4/2011 Wittenstein et al.
2011/0087685 A1 4/2011 Lin et al.
2011/0090078 A1 4/2011 Kim et al.
2011/0092187 A1 4/2011 Miller
2011/0093261 A1 4/2011 Angott
2011/0093265 A1 4/2011 Stent et al.
2011/0093271 A1 4/2011 Bernard
2011/0093272 A1 4/2011 Isobe et al.
2011/0099000 A1 4/2011 Rai et al.
2011/0099157 A1 4/2011 Lebeau et al.
2011/0103682 A1 5/2011 Chidlovskii et al.
2011/0105097 A1 5/2011 Tadayon et al.
2011/0106736 A1 5/2011 Aharonson et al.
2011/0106878 A1 5/2011 Cho et al.
2011/0106892 A1 5/2011 Nelson et al.
2011/0110502 A1 5/2011 Daye et al.
2011/0111724 A1 5/2011 Baptiste
2011/0112825 A1 5/2011 Bellegarda
2011/0112827 A1 5/2011 Kennewick et al.
2011/0112837 A1 5/2011 Kurki-Suonio et al.
2011/0112838 A1 5/2011 Adibi
2011/0112921 A1 5/2011 Kennewick et al.
2011/0116610 A1 5/2011 Shaw et al.
2011/0119049 A1 5/2011 Ylonen
2011/0119051 A1 5/2011 Li et al.
2011/0119623 A1 5/2011 Kim
2011/0119715 A1 5/2011 Chang et al.
2011/0123004 A1 5/2011 Chang et al.
2011/0125498 A1 5/2011 Pickering et al.
2011/0125540 A1 5/2011 Jang et al.
2011/0125701 A1 5/2011 Nair et al.
2011/0130958 A1 6/2011 Stahl et al.
2011/0131036 A1 6/2011 DiCristo et al.
2011/0131038 A1 6/2011 Oyaizu et al.
2011/0131045 A1 6/2011 Cristo et al.
2011/0137636 A1 6/2011 Srihari et al.
2011/0137664 A1 6/2011 Kho et al.
2011/0141141 A1 6/2011 Kankainen
2011/0143718 A1 6/2011 Engelhart, Sr.
2011/0143726 A1 6/2011 de Silva
2011/0143811 A1 6/2011 Rodriguez
2011/0144857 A1 6/2011 Wingrove et al.
2011/0144901 A1 6/2011 Wang
2011/0144973 A1 6/2011 Bocchieri et al.
2011/0144999 A1 6/2011 Jang et al.
2011/0145718 A1 6/2011 Ketola et al.
2011/0151830 A1 6/2011 Blanda et al.
2011/0153209 A1 6/2011 Geelen
2011/0153322 A1 6/2011 Kwak et al.
2011/0153324 A1 6/2011 Ballinger et al.
2011/0153329 A1 6/2011 Moorer
2011/0153330 A1 6/2011 Yazdani et al.
2011/0153373 A1 6/2011 Dantzig et al.
2011/0154193 A1 6/2011 Creutz et al.
2011/0157029 A1 6/2011 Tseng
2011/0161072 A1 6/2011 Terao et al.
2011/0161076 A1 6/2011 Davis et al.
2011/0161079 A1 6/2011 Gruhn et al.
2011/0161309 A1 6/2011 Lung et al.
2011/0161852 A1 6/2011 Vainio et al.
2011/0166851 A1 7/2011 LeBeau et al.
2011/0166855 A1 7/2011 Vermeulen et al.
2011/0167350 A1 7/2011 Hoellwarth
2011/0175810 A1 7/2011 Markovic et al.
2011/0178804 A1 7/2011 Inoue et al.
2011/0179002 A1 7/2011 Dumitru et al.
2011/0179372 A1 7/2011 Moore et al.
2011/0183627 A1 7/2011 Ueda et al.
2011/0183650 A1 7/2011 Mckee et al.
2011/0184721 A1 7/2011 Subramanian et al.
2011/0184730 A1 7/2011 LeBeau et al.
2011/0184736 A1 7/2011 Slotznick
2011/0184737 A1 7/2011 Nakano et al.
2011/0184768 A1 7/2011 Norton et al.
2011/0185288 A1 7/2011 Gupta et al.
2011/0191108 A1 8/2011 Friedlander
2011/0191271 A1 8/2011 Baker et al.
2011/0191344 A1 8/2011 Jin et al.
2011/0195758 A1 8/2011 Damale et al.
2011/0196670 A1 8/2011 Dang et al.
2011/0197128 A1 8/2011 Assadollahi et al.
2011/0199312 A1 8/2011 Okuta
2011/0201385 A1 8/2011 Higginbotham et al.
2011/0201387 A1* 8/2011 Paek .................... G06F 40/274
455/566
2011/0202526 A1 8/2011 Lee et al.
2011/0202874 A1 8/2011 Ramer et al.
2011/0205149 A1 8/2011 Tom et al.
2011/0208511 A1 8/2011 Sikstrom et al.
2011/0208524 A1 8/2011 Haughay
2011/0209088 A1 8/2011 Hinckley et al.
2011/0212717 A1 9/2011 Rhoads et al.
2011/0216093 A1 9/2011 Griffin
2011/0218806 A1 9/2011 Alewine et al.
2011/0218855 A1 9/2011 Cao et al.
2011/0219018 A1 9/2011 Bailey et al.
2011/0223893 A1 9/2011 Lau et al.
2011/0224972 A1 9/2011 Millett et al.
2011/0228913 A1 9/2011 Cochinwala et al.
2011/0231182 A1 9/2011 Weider et al.
2011/0231184 A1 9/2011 Kerr
2011/0231188 A1 9/2011 Kennewick et al.
2011/0231218 A1 9/2011 Tovar
2011/0231432 A1 9/2011 Sata et al.
2011/0231474 A1 9/2011 Locker et al.
2011/0238191 A1 9/2011 Kristjansson et al.
2011/0238407 A1 9/2011 Kent
2011/0238408 A1 9/2011 Larcheveque et al.
2011/0238676 A1 9/2011 Liu et al.
2011/0239111 A1 9/2011 Grover
2011/0242007 A1 10/2011 Gray et al.
2011/0244888 A1 10/2011 Ohki
2011/0246471 A1 10/2011 Rakib et al.
2011/0249144 A1 10/2011 Chang
2011/0250570 A1 10/2011 Mack et al.
2011/0257966 A1 10/2011 Rychlik
2011/0258188 A1 10/2011 Abdalmageed et al.
2011/0260829 A1 10/2011 Lee
2011/0260861 A1 10/2011 Singh et al.
2011/0264643 A1 10/2011 Cao
2011/0264999 A1 10/2011 Bells et al.
2011/0274303 A1 11/2011 Filson et al.
2011/0276595 A1 11/2011 Kirkland et al.
2011/0276598 A1 11/2011 Kozempel
2011/0276944 A1 11/2011 Bergman et al.
2011/0279368 A1 11/2011 Klein et al.
2011/0280143 A1 11/2011 Li et al.
2011/0282663 A1 11/2011 Talwar et al.
2011/0282888 A1 11/2011 Koperski et al.

(56) References Cited

U.S. PATENT DOCUMENTS

2011/0282903 A1 11/2011 Zhang
2011/0282906 A1 11/2011 Wong
2011/0283189 A1 11/2011 McCarty
2011/0283190 A1 11/2011 Poltorak
2011/0288852 A1 11/2011 Dymetman et al.
2011/0288855 A1 11/2011 Roy
2011/0288861 A1 11/2011 Kurzweil et al.
2011/0288863 A1 11/2011 Rasmussen
2011/0288866 A1 11/2011 Rasmussen
2011/0298585 A1 12/2011 Barry
2011/0301943 A1 12/2011 Patch
2011/0302162 A1 12/2011 Xiao et al.
2011/0302645 A1 12/2011 Headley
2011/0306426 A1 12/2011 Novak et al.
2011/0307241 A1 12/2011 Waibel et al.
2011/0307254 A1 12/2011 Hunt et al.
2011/0307491 A1 12/2011 Fisk et al.
2011/0307810 A1 12/2011 Hilerio et al.
2011/0313775 A1 12/2011 Laligand et al.
2011/0313803 A1 12/2011 Friend et al.
2011/0314003 A1 12/2011 Ju et al.
2011/0314032 A1 12/2011 Bennett et al.
2011/0314404 A1 12/2011 Kotler et al.
2011/0314539 A1 12/2011 Horton
2011/0320187 A1 12/2011 Motik et al.
2012/0002820 A1 1/2012 Leichter
2012/0005602 A1 1/2012 Anttila et al.
2012/0008754 A1 1/2012 Mukherjee et al.
2012/0010886 A1 1/2012 Razavilar
2012/0011138 A1 1/2012 Dunning et al.
2012/0013609 A1 1/2012 Reponen et al.
2012/0015629 A1 1/2012 Olsen et al.
2012/0016658 A1 1/2012 Wu et al.
2012/0016678 A1 1/2012 Gruber et al.
2012/0019400 A1 1/2012 Patel et al.
2012/0020490 A1 1/2012 Leichter
2012/0022787 A1 1/2012 LeBeau
2012/0022857 A1 1/2012 Baldwin et al.
2012/0022860 A1 1/2012 Lloyd et al.
2012/0022868 A1 1/2012 LeBeau et al.
2012/0022869 A1 1/2012 Lloyd et al.
2012/0022870 A1 1/2012 Kristjansson et al.
2012/0022872 A1 1/2012 Gruber et al.
2012/0022874 A1 1/2012 Lloyd et al.
2012/0022876 A1 1/2012 LeBeau et al.
2012/0022967 A1 1/2012 Bachman et al.
2012/0023088 A1 1/2012 Cheng et al.
2012/0023095 A1 1/2012 Wadycki et al.
2012/0023462 A1 1/2012 Rosing et al.
2012/0029661 A1 2/2012 Jones et al.
2012/0029910 A1 2/2012 Medlock et al.
2012/0034904 A1 2/2012 LeBeau et al.
2012/0035907 A1 2/2012 Lebeau et al.
2012/0035908 A1 2/2012 Lebeau et al.
2012/0035924 A1 2/2012 Jitkoff et al.
2012/0035925 A1 2/2012 Friend et al.
2012/0035926 A1 2/2012 Ambler
2012/0035931 A1 2/2012 LeBeau et al.
2012/0035932 A1 2/2012 Jitkoff et al.
2012/0035935 A1 2/2012 Park et al.
2012/0036556 A1 2/2012 LeBeau et al.
2012/0039539 A1 2/2012 Boiman et al.
2012/0041752 A1 2/2012 Wang et al.
2012/0041756 A1 2/2012 Hanazawa et al.
2012/0041759 A1 2/2012 Barker et al.
2012/0042014 A1 2/2012 Desai et al.
2012/0042343 A1 2/2012 Laligand et al.
2012/0053815 A1 3/2012 Montanari et al.
2012/0053829 A1 3/2012 Agarwal et al.
2012/0053945 A1 3/2012 Gupta et al.
2012/0056815 A1 3/2012 Mehra
2012/0059655 A1 3/2012 Cartales
2012/0059813 A1 3/2012 Sejnoha et al.
2012/0060052 A1 3/2012 White et al.
2012/0062473 A1 3/2012 Xiao et al.
2012/0066212 A1 3/2012 Jennings
2012/0066581 A1 3/2012 Spalink
2012/0075054 A1 3/2012 Ge et al.
2012/0075184 A1 3/2012 Madhvanath
2012/0077479 A1 3/2012 Sabotta et al.
2012/0078611 A1 3/2012 Soltani et al.
2012/0078624 A1 3/2012 Yook et al.
2012/0078627 A1 3/2012 Wagner
2012/0078635 A1 3/2012 Rothkopf et al.
2012/0078747 A1 3/2012 Chakrabarti et al.
2012/0082317 A1 4/2012 Pance et al.
2012/0083286 A1 4/2012 Kim et al.
2012/0084086 A1 4/2012 Gilbert et al.
2012/0084089 A1 4/2012 Lloyd et al.
2012/0084634 A1 4/2012 Wong et al.
2012/0088219 A1 4/2012 Briscoe et al.
2012/0089331 A1 4/2012 Schmidt et al.
2012/0101823 A1 4/2012 Weng et al.
2012/0105257 A1 5/2012 Murillo et al.
2012/0108166 A1 5/2012 Hymel
2012/0108221 A1 5/2012 Thomas et al.
2012/0109632 A1 5/2012 Sugiura et al.
2012/0109997 A1 5/2012 Sparks et al.
2012/0110456 A1 5/2012 Larco et al.
2012/0114108 A1 5/2012 Katis et al.
2012/0116770 A1 5/2012 Chen et al.
2012/0117499 A1 5/2012 Mori et al.
2012/0124126 A1 5/2012 Alcazar et al.
2012/0124177 A1 5/2012 Sparks
2012/0124178 A1 5/2012 Sparks
2012/0128322 A1 5/2012 Shaffer et al.
2012/0130709 A1 5/2012 Bocchieri et al.
2012/0130995 A1 5/2012 Risvik et al.
2012/0136572 A1 5/2012 Norton
2012/0136649 A1 5/2012 Freising et al.
2012/0136855 A1 5/2012 Ni et al.
2012/0136985 A1 5/2012 Popescu et al.
2012/0137367 A1 5/2012 Dupont et al.
2012/0149342 A1 6/2012 Cohen et al.
2012/0149394 A1 6/2012 Singh et al.
2012/0150544 A1 6/2012 McLoughlin et al.
2012/0150580 A1 6/2012 Norton
2012/0158293 A1 6/2012 Burnham
2012/0158399 A1 6/2012 Tremblay et al.
2012/0158422 A1 6/2012 Burnham et al.
2012/0159380 A1 6/2012 Kocienda et al.
2012/0163710 A1 6/2012 Skaff et al.
2012/0166196 A1 6/2012 Ju et al.
2012/0166429 A1 6/2012 Moore et al.
2012/0166942 A1 6/2012 Ramerth et al.
2012/0166959 A1 6/2012 Hilerio et al.
2012/0166998 A1 6/2012 Cotterill et al.
2012/0173222 A1 7/2012 Wang et al.
2012/0173244 A1 7/2012 Kwak et al.
2012/0173464 A1 7/2012 Tur et al.
2012/0174121 A1 7/2012 Treat et al.
2012/0179457 A1 7/2012 Newman et al.
2012/0179467 A1 7/2012 Williams
2012/0185237 A1 7/2012 Gajic et al.
2012/0185480 A1 7/2012 Ni et al.
2012/0185781 A1 7/2012 Guzman et al.
2012/0191461 A1 7/2012 Lin et al.
2012/0192096 A1 7/2012 Bowman et al.
2012/0197743 A1 8/2012 Grigg et al.
2012/0197995 A1 8/2012 Caruso
2012/0197998 A1 8/2012 Kessel et al.
2012/0201362 A1 8/2012 Crossan et al.
2012/0209454 A1 8/2012 Miller et al.
2012/0209654 A1 8/2012 Romagnino et al.
2012/0209853 A1 8/2012 Desai et al.
2012/0209874 A1 8/2012 Wong et al.
2012/0210266 A1 8/2012 Jiang et al.
2012/0214141 A1 8/2012 Raya et al.
2012/0214517 A1 8/2012 Singh et al.
2012/0215762 A1 8/2012 Hall et al.
2012/0221339 A1 8/2012 Wang et al.
2012/0221552 A1 8/2012 Reponen et al.
2012/0223889 A1* 9/2012 Medlock ............ G06F 3/04886
345/168

(56) References Cited

U.S. PATENT DOCUMENTS

2012/0223936 A1 9/2012 Aughey et al.
2012/0232885 A1 9/2012 Barbosa et al.
2012/0232886 A1 9/2012 Capuozzo et al.
2012/0232906 A1 9/2012 Lindahl et al.
2012/0233207 A1 9/2012 Mohajer
2012/0233266 A1 9/2012 Hassan et al.
2012/0233280 A1 9/2012 Ebara
2012/0239661 A1 9/2012 Giblin
2012/0239761 A1 9/2012 Linner et al.
2012/0242482 A1 9/2012 Elumalai et al.
2012/0245719 A1 9/2012 Story, Jr. et al.
2012/0245939 A1 9/2012 Braho et al.
2012/0245941 A1 9/2012 Cheyer
2012/0245944 A1 9/2012 Gruber et al.
2012/0246064 A1 9/2012 Balkow
2012/0250858 A1 10/2012 Iqbal et al.
2012/0252367 A1 10/2012 Gaglio et al.
2012/0252540 A1 10/2012 Kirigaya
2012/0253785 A1 10/2012 Hamid et al.
2012/0253791 A1 10/2012 Heck et al.
2012/0254143 A1 10/2012 Varma et al.
2012/0254152 A1 10/2012 Park et al.
2012/0254290 A1 10/2012 Naaman
2012/0259615 A1 10/2012 Morin et al.
2012/0262296 A1 10/2012 Bezar
2012/0265482 A1 10/2012 Grokop et al.
2012/0265528 A1 10/2012 Gruber et al.
2012/0265535 A1 10/2012 Bryant-Rich et al.
2012/0265806 A1 10/2012 Blanchflower et al.
2012/0271625 A1 10/2012 Bernard
2012/0271634 A1 10/2012 Lenke
2012/0271635 A1 10/2012 Ljolje
2012/0271640 A1 10/2012 Basir
2012/0271676 A1 10/2012 Aravamudan et al.
2012/0275377 A1 11/2012 Lehane et al.
2012/0278744 A1 11/2012 Kozitsyn et al.
2012/0278812 A1 11/2012 Wang
2012/0284015 A1 11/2012 Drewes
2012/0284027 A1 11/2012 Mallett et al.
2012/0290291 A1 11/2012 Shelley et al.
2012/0290300 A1 11/2012 Lee et al.
2012/0295708 A1 11/2012 Hernandez-Abrego et al.
2012/0296638 A1 11/2012 Patwa
2012/0296649 A1 11/2012 Bansal et al.
2012/0296654 A1 11/2012 Hendrickson et al.
2012/0296891 A1 11/2012 Rangan
2012/0297348 A1 11/2012 Santoro
2012/0303369 A1 11/2012 Brush et al.
2012/0303371 A1 11/2012 Labsky et al.
2012/0304124 A1 11/2012 Chen et al.
2012/0309363 A1 12/2012 Gruber et al.
2012/0310642 A1 12/2012 Cao et al.
2012/0310649 A1 12/2012 Cannistraro et al.
2012/0310652 A1 12/2012 O'Sullivan
2012/0310922 A1 12/2012 Johnson et al.
2012/0311478 A1 12/2012 Van Os et al.
2012/0311583 A1 12/2012 Gruber et al.
2012/0311584 A1 12/2012 Gruber et al.
2012/0311585 A1 12/2012 Gruber et al.
2012/0316862 A1 12/2012 Sultan et al.
2012/0316875 A1 12/2012 Nyquist et al.
2012/0316878 A1 12/2012 Singleton et al.
2012/0317194 A1 12/2012 Tian
2012/0317498 A1 12/2012 Logan et al.
2012/0321112 A1 12/2012 Schubert et al.
2012/0323560 A1 12/2012 Perez et al.
2012/0324391 A1 12/2012 Tocci et al.
2012/0327009 A1 12/2012 Fleizach
2012/0329529 A1 12/2012 van der Raadt
2012/0330660 A1 12/2012 Jaiswal
2012/0330661 A1 12/2012 Lindahl
2012/0330990 A1 12/2012 Chen et al.
2013/0002716 A1 1/2013 Walker et al.
2013/0005405 A1 1/2013 Prociw
2013/0006633 A1 1/2013 Grokop et al.
2013/0006637 A1 1/2013 Kanevsky et al.
2013/0006638 A1 1/2013 Lindahl
2013/0007240 A1 1/2013 Qiu et al.
2013/0007648 A1 1/2013 Gamon et al.
2013/0009858 A1 1/2013 Lacey
2013/0010575 A1 1/2013 He et al.
2013/0013313 A1 1/2013 Shechtman et al.
2013/0013319 A1 1/2013 Grant et al.
2013/0014026 A1 1/2013 Beringer et al.
2013/0018659 A1 1/2013 Chi
2013/0018863 A1 1/2013 Regan et al.
2013/0024576 A1 1/2013 Dishneau et al.
2013/0027875 A1 1/2013 Zhu et al.
2013/0030787 A1 1/2013 Cancedda et al.
2013/0030789 A1 1/2013 Dalce
2013/0030804 A1 1/2013 Zavaliagkos et al.
2013/0030815 A1 1/2013 Madhvanath et al.
2013/0030904 A1 1/2013 Aidasani et al.
2013/0030913 A1 1/2013 Zhu et al.
2013/0030955 A1 1/2013 David
2013/0031162 A1 1/2013 Willis et al.
2013/0031476 A1 1/2013 Coin et al.
2013/0033643 A1 2/2013 Kim et al.
2013/0035086 A1 2/2013 Chardon et al.
2013/0035942 A1 2/2013 Kim et al.
2013/0035961 A1 2/2013 Yegnanarayanan
2013/0041647 A1 2/2013 Ramerth et al.
2013/0041654 A1 2/2013 Walker et al.
2013/0041661 A1 2/2013 Lee et al.
2013/0041665 A1 2/2013 Jang et al.
2013/0041667 A1 2/2013 Longe et al.
2013/0041968 A1 2/2013 Cohen et al.
2013/0046544 A1 2/2013 Kay et al.
2013/0050089 A1 2/2013 Neels et al.
2013/0054550 A1 2/2013 Bolohan
2013/0054609 A1 2/2013 Rajput et al.
2013/0054613 A1 2/2013 Bishop
2013/0054631 A1 2/2013 Govani et al.
2013/0054675 A1 2/2013 Jenkins et al.
2013/0054706 A1 2/2013 Graham et al.
2013/0055099 A1 2/2013 Yao et al.
2013/0055147 A1 2/2013 Vasudev et al.
2013/0063611 A1 3/2013 Papakipos et al.
2013/0066832 A1 3/2013 Sheehan et al.
2013/0067307 A1 3/2013 Tian et al.
2013/0069769 A1 3/2013 Pennington et al.
2013/0073286 A1 3/2013 Bastea-Forte et al.
2013/0073346 A1 3/2013 Chun et al.
2013/0078930 A1 3/2013 Chen et al.
2013/0080152 A1 3/2013 Brun et al.
2013/0080162 A1 3/2013 Chang et al.
2013/0080167 A1 3/2013 Mozer
2013/0080177 A1 3/2013 Chen
2013/0080178 A1 3/2013 Kang et al.
2013/0080251 A1 3/2013 Dempski
2013/0082967 A1 4/2013 Hillis et al.
2013/0085755 A1 4/2013 Bringert et al.
2013/0085761 A1 4/2013 Bringert et al.
2013/0086609 A1 4/2013 Levy et al.
2013/0090921 A1 4/2013 Liu et al.
2013/0091090 A1 4/2013 Spivack et al.
2013/0095805 A1 4/2013 Lebeau et al.
2013/0096909 A1 4/2013 Brun et al.
2013/0096917 A1 4/2013 Edgar et al.
2013/0097566 A1 4/2013 Berglund
2013/0097682 A1 4/2013 Zeljkovic et al.
2013/0100268 A1 4/2013 Mihailidis et al.
2013/0103391 A1 4/2013 Millmore et al.
2013/0103405 A1 4/2013 Namba et al.
2013/0106742 A1 5/2013 Lee et al.
2013/0110505 A1 5/2013 Gruber et al.
2013/0110515 A1 5/2013 Guzzoni et al.
2013/0110518 A1 5/2013 Gruber et al.
2013/0110519 A1 5/2013 Cheyer et al.
2013/0110520 A1 5/2013 Cheyer et al.
2013/0110943 A1 5/2013 Menon et al.
2013/0111330 A1 5/2013 Staikos et al.
2013/0111348 A1 5/2013 Gruber et al.
2013/0111365 A1 5/2013 Chen et al.

(56) References Cited

U.S. PATENT DOCUMENTS

2013/0111487 A1 5/2013 Cheyer et al.
2013/0111581 A1 5/2013 Griffin et al.
2013/0115927 A1 5/2013 Gruber et al.
2013/0117022 A1 5/2013 Chen et al.
2013/0124189 A1 5/2013 Baldwin et al.
2013/0124672 A1 5/2013 Pan
2013/0125168 A1 5/2013 Agnihotri et al.
2013/0132081 A1 5/2013 Ryu et al.
2013/0132084 A1 5/2013 Stonehocker et al.
2013/0132089 A1 5/2013 Fanty et al.
2013/0132871 A1 5/2013 Zeng et al.
2013/0138440 A1 5/2013 Strope et al.
2013/0141551 A1 6/2013 Kim
2013/0142317 A1 6/2013 Reynolds
2013/0142345 A1 6/2013 Waldmann
2013/0144594 A1 6/2013 Bangalore et al.
2013/0144616 A1 6/2013 Bangalore et al.
2013/0151339 A1 6/2013 Kim et al.
2013/0152092 A1 6/2013 Yadgar et al.
2013/0154811 A1 6/2013 Ferren et al.
2013/0156198 A1 6/2013 Kim et al.
2013/0157629 A1 6/2013 Lee et al.
2013/0158977 A1 6/2013 Senior
2013/0159847 A1 6/2013 Banke et al.
2013/0165232 A1 6/2013 Nelson et al.
2013/0166303 A1 6/2013 Chang et al.
2013/0166332 A1 6/2013 Hammad
2013/0166442 A1 6/2013 Nakajima et al.
2013/0170738 A1 7/2013 Capuozzo et al.
2013/0172022 A1 7/2013 Seymour et al.
2013/0173258 A1 7/2013 Liu et al.
2013/0174034 A1 7/2013 Brown et al.
2013/0176244 A1 7/2013 Yamamoto et al.
2013/0176592 A1 7/2013 Sasaki
2013/0179172 A1 7/2013 Nakamura et al.
2013/0179440 A1 7/2013 Gordon
2013/0183944 A1 7/2013 Mozer et al.
2013/0185059 A1 7/2013 Riccardi et al.
2013/0185074 A1 7/2013 Gruber et al.
2013/0185081 A1 7/2013 Cheyer et al.
2013/0185336 A1 7/2013 Singh et al.
2013/0187850 A1 7/2013 Schulz et al.
2013/0187857 A1 7/2013 Griffin et al.
2013/0191117 A1 7/2013 Atti et al.
2013/0197911 A1 8/2013 Wei et al.
2013/0198159 A1 8/2013 Hendry
2013/0198841 A1 8/2013 Poulson
2013/0204813 A1 8/2013 Master et al.
2013/0204897 A1 8/2013 McDougall
2013/0204967 A1 8/2013 Seo et al.
2013/0207898 A1 8/2013 Sullivan et al.
2013/0218553 A1 8/2013 Fujii et al.
2013/0218560 A1 8/2013 Hsiao et al.
2013/0218899 A1 8/2013 Raghavan et al.
2013/0219333 A1 8/2013 Palwe et al.
2013/0222249 A1 8/2013 Pasquero et al.
2013/0225128 A1 8/2013 Gomar
2013/0226935 A1 8/2013 Bai et al.
2013/0231917 A1 9/2013 Naik
2013/0234947 A1 9/2013 Kristensson et al.
2013/0235987 A1 9/2013 Arroniz-Escobar et al.
2013/0238326 A1 9/2013 Kim et al.
2013/0238647 A1 9/2013 Thompson
2013/0244615 A1 9/2013 Miller et al.
2013/0246048 A1 9/2013 Nagase et al.
2013/0246050 A1 9/2013 Yu et al.
2013/0246329 A1 9/2013 Pasquero et al.
2013/0253911 A1 9/2013 Petri et al.
2013/0253912 A1 9/2013 Medlock et al.
2013/0268263 A1 10/2013 Park et al.
2013/0275117 A1 10/2013 Winer
2013/0275138 A1 10/2013 Gruber et al.
2013/0275164 A1 10/2013 Gruber et al.
2013/0275199 A1 10/2013 Proctor, Jr. et al.
2013/0275625 A1 10/2013 Taivalsaari et al.
2013/0275875 A1 10/2013 Gruber et al.
2013/0275899 A1 10/2013 Schubert et al.
2013/0282709 A1 10/2013 Zhu et al.
2013/0283168 A1 10/2013 Brown et al.
2013/0285913 A1 10/2013 Griffin et al.
2013/0289991 A1 10/2013 Eshwar et al.
2013/0289993 A1 10/2013 Rao et al.
2013/0289994 A1 10/2013 Newman et al.
2013/0291015 A1 10/2013 Pan
2013/0297317 A1 11/2013 Lee et al.
2013/0297319 A1 11/2013 Kim
2013/0297348 A1 11/2013 Cardoza et al.
2013/0300645 A1 11/2013 Fedorov
2013/0300648 A1 11/2013 Kim et al.
2013/0303106 A1 11/2013 Martin
2013/0304479 A1 11/2013 Teller et al.
2013/0304758 A1 11/2013 Gruber et al.
2013/0304815 A1 11/2013 Puente et al.
2013/0305119 A1 11/2013 Kern et al.
2013/0307855 A1 11/2013 Lamb et al.
2013/0307997 A1 11/2013 O'Keefe et al.
2013/0308922 A1 11/2013 Sano et al.
2013/0311184 A1 11/2013 Badavne et al.
2013/0311487 A1 11/2013 Moore et al.
2013/0311997 A1 11/2013 Gruber et al.
2013/0315038 A1 11/2013 Ferren et al.
2013/0316746 A1 11/2013 Miller et al.
2013/0322634 A1 12/2013 Bennett et al.
2013/0325436 A1 12/2013 Wang et al.
2013/0325443 A1 12/2013 Begeja et al.
2013/0325447 A1 12/2013 Levien et al.
2013/0325448 A1 12/2013 Levien et al.
2013/0325481 A1 12/2013 Van Os et al.
2013/0325484 A1 12/2013 Chakladar et al.
2013/0325967 A1 12/2013 Parks et al.
2013/0325970 A1 12/2013 Roberts et al.
2013/0325979 A1 12/2013 Mansfield et al.
2013/0328809 A1 12/2013 Smith
2013/0329023 A1 12/2013 Suplee, III et al.
2013/0331127 A1 12/2013 Sabatelli et al.
2013/0332159 A1 12/2013 Federighi et al.
2013/0332162 A1 12/2013 Keen
2013/0332164 A1 12/2013 Nalk
2013/0332168 A1 12/2013 Kim et al.
2013/0332172 A1 12/2013 Prakash et al.
2013/0332400 A1 12/2013 González
2013/0339256 A1 12/2013 Shroff
2013/0343721 A1 12/2013 Abecassis
2013/0346068 A1 12/2013 Solem et al.
2013/0346347 A1 12/2013 Patterson et al.
2013/0347117 A1 12/2013 Parks et al.
2014/0006012 A1 1/2014 Zhou et al.
2014/0006025 A1 1/2014 Krishnan et al.
2014/0006027 A1 1/2014 Kim et al.
2014/0006030 A1 1/2014 Fleizach et al.
2014/0006153 A1 1/2014 Thangam et al.
2014/0006483 A1 1/2014 Garmark et al.
2014/0006496 A1 1/2014 Dearman et al.
2014/0006562 A1 1/2014 Handa et al.
2014/0006947 A1 1/2014 Garmark et al.
2014/0012574 A1 1/2014 Pasupalak et al.
2014/0012580 A1 1/2014 Ganong et al.
2014/0012586 A1 1/2014 Rubin et al.
2014/0012587 A1 1/2014 Park
2014/0019133 A1 1/2014 Lundberg et al.
2014/0019460 A1 1/2014 Sambrani et al.
2014/0028735 A1 1/2014 Williams et al.
2014/0033071 A1 1/2014 Eustice et al.
2014/0035823 A1 2/2014 Khoe et al.
2014/0039888 A1 2/2014 Taubman et al.
2014/0039893 A1 2/2014 Weiner
2014/0039894 A1 2/2014 Shostak
2014/0040274 A1 2/2014 Aravamudan et al.
2014/0040748 A1 2/2014 Lemay et al.
2014/0040801 A1 2/2014 Patel et al.
2014/0040918 A1 2/2014 Li et al.
2014/0040961 A1 2/2014 Green, Sr. et al.
2014/0046934 A1 2/2014 Zhou et al.
2014/0047001 A1 2/2014 Phillips et al.

(56) References Cited

U.S. PATENT DOCUMENTS

2014/0052451 A1 2/2014 Cheong et al.
2014/0052680 A1 2/2014 Nitz et al.
2014/0052791 A1 2/2014 Chakra et al.
2014/0053082 A1 2/2014 Park et al.
2014/0053210 A1 2/2014 Cheong et al.
2014/0057610 A1 2/2014 Olincy et al.
2014/0059030 A1 2/2014 Hakkani-Tur et al.
2014/0067361 A1 3/2014 Nikoulina et al.
2014/0067371 A1 3/2014 Liensberger
2014/0067402 A1 3/2014 Kim
2014/0067738 A1 3/2014 Kingsbury
2014/0068751 A1 3/2014 Last et al.
2014/0074454 A1 3/2014 Brown et al.
2014/0074466 A1 3/2014 Sharifi et al.
2014/0074470 A1 3/2014 Jansche et al.
2014/0074472 A1 3/2014 Lin et al.
2014/0074483 A1 3/2014 Van Os
2014/0074815 A1 3/2014 Plimton
2014/0078065 A1 3/2014 Akkok
2014/0079195 A1 3/2014 Srivastava et al.
2014/0080428 A1 3/2014 Rhoads et al.
2014/0081619 A1 3/2014 Solntseva et al.
2014/0081633 A1 3/2014 Badaskar et al.
2014/0082501 A1 3/2014 Bae et al.
2014/0086458 A1 3/2014 Rogers et al.
2014/0087711 A1 3/2014 Geyer et al.
2014/0088961 A1 3/2014 Woodward et al.
2014/0095171 A1 4/2014 Lynch et al.
2014/0095172 A1 4/2014 Cabaco et al.
2014/0095173 A1 4/2014 Lynch et al.
2014/0095601 A1 4/2014 Abuelsaad et al.
2014/0096209 A1 4/2014 Saraf et al.
2014/0098247 A1 4/2014 Rao et al.
2014/0100847 A1 4/2014 Ishii et al.
2014/0108017 A1 4/2014 Mason et al.
2014/0114554 A1 4/2014 Lagassey
2014/0115062 A1 4/2014 Liu et al.
2014/0115114 A1 4/2014 Garmark et al.
2014/0118155 A1 5/2014 Bowers et al.
2014/0118624 A1 5/2014 Jang et al.
2014/0122059 A1 5/2014 Patel et al.
2014/0122085 A1 5/2014 Piety et al.
2014/0122086 A1 5/2014 Kapur et al.
2014/0122136 A1 5/2014 Jayanthi
2014/0122153 A1 5/2014 Truitt
2014/0132935 A1 5/2014 Kim et al.
2014/0134983 A1 5/2014 Jung et al.
2014/0135036 A1 5/2014 Bonanni et al.
2014/0136013 A1 5/2014 Wolverton et al.
2014/0136187 A1 5/2014 Wolverton et al.
2014/0136195 A1 5/2014 Abdossalami et al.
2014/0136212 A1 5/2014 Kwon et al.
2014/0136946 A1 5/2014 Matas
2014/0136987 A1 5/2014 Rodriguez
2014/0142922 A1 5/2014 Liang et al.
2014/0142923 A1 5/2014 Jones et al.
2014/0142935 A1 5/2014 Lindahl et al.
2014/0143550 A1 5/2014 Ganong, III et al.
2014/0143721 A1 5/2014 Suzuki et al.
2014/0146200 A1 5/2014 Scott et al.
2014/0152577 A1 6/2014 Yuen et al.
2014/0153709 A1 6/2014 Byrd et al.
2014/0155031 A1 6/2014 Lee et al.
2014/0156262 A1 6/2014 Yuen et al.
2014/0156279 A1 6/2014 Okamoto et al.
2014/0157422 A1 6/2014 Livshits et al.
2014/0163951 A1 6/2014 Nikoulina et al.
2014/0163953 A1 6/2014 Parikh
2014/0163954 A1* 6/2014 Joshi .................... G06F 3/0237
704/9
2014/0163962 A1 6/2014 Castelli et al.
2014/0163976 A1 6/2014 Park et al.
2014/0163977 A1 6/2014 Hoffmeister et al.
2014/0163981 A1 6/2014 Cook et al.
2014/0163995 A1 6/2014 Burns et al.
2014/0164305 A1 6/2014 Lynch et al.
2014/0164312 A1 6/2014 Lynch et al.
2014/0164476 A1 6/2014 Thomson
2014/0164508 A1 6/2014 Lynch et al.
2014/0164532 A1 6/2014 Lynch et al.
2014/0164533 A1 6/2014 Lynch et al.
2014/0169795 A1 6/2014 Clough
2014/0172878 A1 6/2014 Clark et al.
2014/0173460 A1 6/2014 Kim
2014/0180499 A1 6/2014 Cooper et al.
2014/0180689 A1 6/2014 Kim et al.
2014/0180697 A1 6/2014 Torok et al.
2014/0181865 A1 6/2014 Koganei
2014/0188477 A1 7/2014 Zhang
2014/0195226 A1 7/2014 Yun et al.
2014/0195230 A1 7/2014 Han et al.
2014/0195233 A1 7/2014 Bapat
2014/0195244 A1 7/2014 Cha et al.
2014/0195251 A1 7/2014 Zeinstra et al.
2014/0195252 A1 7/2014 Gruber et al.
2014/0198048 A1 7/2014 Unruh et al.
2014/0203939 A1 7/2014 Harrington et al.
2014/0205076 A1 7/2014 Kumar et al.
2014/0207439 A1 7/2014 Venkatapathy et al.
2014/0207446 A1 7/2014 Klein et al.
2014/0207466 A1 7/2014 Smadi
2014/0207468 A1 7/2014 Bartnik
2014/0207582 A1 7/2014 Flinn et al.
2014/0214429 A1 7/2014 Pantel
2014/0214537 A1 7/2014 Yoo et al.
2014/0215513 A1 7/2014 Ramer et al.
2014/0218372 A1 8/2014 Missig et al.
2014/0222436 A1 8/2014 Binder et al.
2014/0222678 A1 8/2014 Sheets et al.
2014/0223377 A1 8/2014 Shaw et al.
2014/0223481 A1 8/2014 Fundament
2014/0226503 A1 8/2014 Cooper et al.
2014/0229184 A1 8/2014 Shires
2014/0230055 A1 8/2014 Boehl
2014/0232656 A1 8/2014 Pasquero et al.
2014/0236595 A1 8/2014 Gray
2014/0236986 A1 8/2014 Guzman
2014/0237042 A1 8/2014 Ahmed et al.
2014/0237366 A1 8/2014 Poulos et al.
2014/0244248 A1 8/2014 Arisoy et al.
2014/0244249 A1 8/2014 Mohamed et al.
2014/0244254 A1 8/2014 Ju et al.
2014/0244257 A1 8/2014 Colibro et al.
2014/0244258 A1 8/2014 Song et al.
2014/0244263 A1 8/2014 Pontual et al.
2014/0244266 A1 8/2014 Brown et al.
2014/0244268 A1 8/2014 Abdelsamie et al.
2014/0244271 A1 8/2014 Lindahl
2014/0244712 A1 8/2014 Walters et al.
2014/0245140 A1 8/2014 Brown et al.
2014/0247383 A1 9/2014 Dave et al.
2014/0247926 A1 9/2014 Gainsboro et al.
2014/0249812 A1 9/2014 Bou-ghazale et al.
2014/0249817 A1 9/2014 Hart et al.
2014/0249821 A1 9/2014 Kennewick et al.
2014/0250046 A1 9/2014 Winn et al.
2014/0257809 A1 9/2014 Goel et al.
2014/0257815 A1 9/2014 Zhao et al.
2014/0257902 A1 9/2014 Moore et al.
2014/0258857 A1 9/2014 Dykstra-Erickson et al.
2014/0267022 A1 9/2014 Kim
2014/0267599 A1 9/2014 Drouin et al.
2014/0272821 A1 9/2014 Pitschel et al.
2014/0273979 A1 9/2014 Van os et al.
2014/0274005 A1 9/2014 Luna et al.
2014/0274203 A1 9/2014 Ganong et al.
2014/0274211 A1 9/2014 Sejnoha
2014/0278343 A1 9/2014 Tran
2014/0278349 A1 9/2014 Grieves et al.
2014/0278379 A1 9/2014 Coccaro et al.
2014/0278390 A1 9/2014 Kingsbury et al.
2014/0278391 A1 9/2014 Braho et al.
2014/0278394 A1 9/2014 Bastyr et al.
2014/0278406 A1 9/2014 Tsumura et al.

(56) References Cited

U.S. PATENT DOCUMENTS

2014/0278413 A1 9/2014 Pitschel et al.
2014/0278429 A1 9/2014 Ganong, III
2014/0278435 A1 9/2014 Ganong et al.
2014/0278436 A1 9/2014 Khanna et al.
2014/0278438 A1 9/2014 Hart et al.
2014/0278443 A1 9/2014 Gunn et al.
2014/0278513 A1 9/2014 Prakash et al.
2014/0279622 A1 9/2014 Lamoureux et al.
2014/0279739 A1 9/2014 Elkington et al.
2014/0280107 A1 9/2014 Heymans et al.
2014/0280138 A1 9/2014 Li et al.
2014/0280292 A1 9/2014 Skinder
2014/0280353 A1 9/2014 Delaney et al.
2014/0280450 A1 9/2014 Luna
2014/0281983 A1 9/2014 Xian et al.
2014/0281997 A1 9/2014 Fleizach et al.
2014/0282003 A1 9/2014 Gruber et al.
2014/0282007 A1 9/2014 Fleizach
2014/0282045 A1 9/2014 Ayanam et al.
2014/0282201 A1 9/2014 Pasquero et al.
2014/0282203 A1 9/2014 Pasquero et al.
2014/0282586 A1 9/2014 Shear et al.
2014/0282743 A1 9/2014 Howard et al.
2014/0288990 A1 9/2014 Moore et al.
2014/0289508 A1 9/2014 Wang
2014/0297267 A1 10/2014 Spencer et al.
2014/0297281 A1 10/2014 Togawa et al.
2014/0297284 A1 10/2014 Gruber et al.
2014/0297288 A1 10/2014 Yu et al.
2014/0304605 A1 10/2014 Ohmura et al.
2014/0309996 A1 10/2014 Gandrabur et al.
2014/0310001 A1 10/2014 Kalns et al.
2014/0310002 A1 10/2014 Nitz et al.
2014/0310348 A1 10/2014 Keskitalo et al.
2014/0313007 A1 10/2014 Harding
2014/0315492 A1 10/2014 Woods
2014/0316585 A1 10/2014 Boesveld et al.
2014/0317030 A1 10/2014 Shen et al.
2014/0317502 A1 10/2014 Brown et al.
2014/0324884 A1 10/2014 Lindahl et al.
2014/0330569 A1 11/2014 Kolavennu et al.
2014/0330951 A1 11/2014 Sukoff et al.
2014/0337037 A1 11/2014 Chi
2014/0337048 A1 11/2014 Brown et al.
2014/0337266 A1 11/2014 Wolverton et al.
2014/0337371 A1 11/2014 Li
2014/0337438 A1 11/2014 Govande et al.
2014/0337751 A1 11/2014 Lim et al.
2014/0337814 A1 11/2014 Kalns et al.
2014/0342762 A1 11/2014 Hajdu et al.
2014/0343943 A1 11/2014 Al-telmissani
2014/0344627 A1 11/2014 Schaub et al.
2014/0344687 A1 11/2014 Durham et al.
2014/0350924 A1 11/2014 Zurek et al.
2014/0350933 A1 11/2014 Bak et al.
2014/0351741 A1 11/2014 Medlock et al.
2014/0351760 A1 11/2014 Skory et al.
2014/0358519 A1 12/2014 Mirkin et al.
2014/0358523 A1 12/2014 Sheth et al.
2014/0361973 A1 12/2014 Raux et al.
2014/0363074 A1 12/2014 Dolfing et al.
2014/0364149 A1 12/2014 Marti et al.
2014/0365209 A1 12/2014 Evermann
2014/0365214 A1 12/2014 Bayley
2014/0365216 A1 12/2014 Gruber et al.
2014/0365226 A1 12/2014 Sinha
2014/0365227 A1 12/2014 Cash et al.
2014/0365407 A1 12/2014 Brown et al.
2014/0365880 A1 12/2014 Bellegarda
2014/0365885 A1 12/2014 Carson et al.
2014/0365895 A1 12/2014 Paulson et al.
2014/0365922 A1 12/2014 Yang
2014/0365945 A1 12/2014 Karunamuni et al.
2014/0370817 A1 12/2014 Luna
2014/0370841 A1 12/2014 Roberts et al.
2014/0372112 A1 12/2014 Xue et al.
2014/0372356 A1 12/2014 Bilal et al.
2014/0372931 A1 12/2014 Zhai et al.
2014/0379334 A1 12/2014 Fry
2014/0379341 A1 12/2014 Seo et al.
2014/0380285 A1 12/2014 Gabel et al.
2015/0003797 A1 1/2015 Schmidt
2015/0006148 A1 1/2015 Goldszmit et al.
2015/0006157 A1 1/2015 Andrade Silva et al.
2015/0006167 A1 1/2015 Kato et al.
2015/0006176 A1 1/2015 Pogue et al.
2015/0006178 A1 1/2015 Peng et al.
2015/0006184 A1 1/2015 Marti et al.
2015/0006199 A1 1/2015 Snider et al.
2015/0012271 A1 1/2015 Peng et al.
2015/0019219 A1 1/2015 Tzirkel-hancock et al.
2015/0019221 A1 1/2015 Lee et al.
2015/0019974 A1 1/2015 Doi et al.
2015/0031416 A1 1/2015 Wells et al.
2015/0032443 A1 1/2015 Karov et al.
2015/0033219 A1 1/2015 Breiner et al.
2015/0033275 A1 1/2015 Natani et al.
2015/0039292 A1 2/2015 Suleman et al.
2015/0039295 A1 2/2015 Soschen
2015/0039299 A1 2/2015 Weinstein et al.
2015/0039305 A1 2/2015 Huang
2015/0039606 A1 2/2015 Salaka et al.
2015/0040012 A1 2/2015 Faaborg et al.
2015/0045003 A1 2/2015 Vora et al.
2015/0045007 A1 2/2015 Cash
2015/0045068 A1 2/2015 Soffer et al.
2015/0046537 A1 2/2015 Rakib
2015/0046828 A1 2/2015 Desai et al.
2015/0050633 A1 2/2015 Christmas et al.
2015/0051754 A1 2/2015 Kwon et al.
2015/0053779 A1 2/2015 Adamek et al.
2015/0053781 A1 2/2015 Nelson et al.
2015/0058013 A1 2/2015 Pakhomov et al.
2015/0058018 A1 2/2015 Georges et al.
2015/0058720 A1* 2/2015 Smadja .................. H04W 4/14
715/271
2015/0058785 A1 2/2015 Ookawara
2015/0065200 A1 3/2015 Namgung et al.
2015/0066494 A1 3/2015 Salvador et al.
2015/0066496 A1 3/2015 Deoras et al.
2015/0066506 A1 3/2015 Romano et al.
2015/0066516 A1 3/2015 Nishikawa et al.
2015/0067485 A1 3/2015 Kim et al.
2015/0067822 A1 3/2015 Randall
2015/0071121 A1 3/2015 Patil et al.
2015/0073788 A1 3/2015 Allauzen et al.
2015/0073804 A1 3/2015 Senior et al.
2015/0074524 A1 3/2015 Nicholson et al.
2015/0074615 A1 3/2015 Han et al.
2015/0082229 A1 3/2015 Ouyang et al.
2015/0088511 A1 3/2015 Bharadwaj et al.
2015/0088514 A1 3/2015 Typrin
2015/0088518 A1 3/2015 Kim et al.
2015/0088522 A1 3/2015 Hendrickson et al.
2015/0088523 A1 3/2015 Schuster
2015/0094834 A1 4/2015 Vega et al.
2015/0095031 A1 4/2015 Conkie et al.
2015/0095278 A1 4/2015 Flinn et al.
2015/0100144 A1 4/2015 Lee et al.
2015/0100313 A1 4/2015 Sharma
2015/0100316 A1 4/2015 Williams et al.
2015/0100537 A1 4/2015 Grieves et al.
2015/0100983 A1 4/2015 Pan
2015/0106093 A1 4/2015 Weeks et al.
2015/0113407 A1 4/2015 Hoffert et al.
2015/0120296 A1 4/2015 Stern et al.
2015/0120723 A1 4/2015 Deshmukh et al.
2015/0121216 A1 4/2015 Brown et al.
2015/0127337 A1 5/2015 Heigold et al.
2015/0127348 A1 5/2015 Follis
2015/0127350 A1 5/2015 Agiomyrgiannakis
2015/0133049 A1 5/2015 Lee et al.
2015/0133109 A1 5/2015 Freeman et al.
2015/0134318 A1 5/2015 Cuthbert et al.

(56) References Cited

U.S. PATENT DOCUMENTS

2015/0134322 A1 5/2015 Cuthbert et al.
2015/0134334 A1 5/2015 Sachidanandam et al.
2015/0135085 A1 5/2015 Shoham et al.
2015/0135123 A1 5/2015 Carr et al.
2015/0142420 A1 5/2015 Sarikaya et al.
2015/0142438 A1 5/2015 Dai et al.
2015/0142447 A1 5/2015 Kennewick et al.
2015/0142851 A1 5/2015 Gupta et al.
2015/0143419 A1 5/2015 Bhagwat et al.
2015/0149177 A1 5/2015 Baldwin et al.
2015/0149182 A1 5/2015 Kalns et al.
2015/0149354 A1 5/2015 Mccoy
2015/0149469 A1 5/2015 Xu et al.
2015/0149899 A1 5/2015 Bernstein et al.
2015/0149964 A1 5/2015 Bernstein et al.
2015/0154185 A1 6/2015 Waibel
2015/0154976 A1 6/2015 Mutagi
2015/0160855 A1 6/2015 Bi
2015/0161370 A1 6/2015 North et al.
2015/0161521 A1 6/2015 Shah et al.
2015/0161989 A1 6/2015 Hsu et al.
2015/0162001 A1 6/2015 Kar et al.
2015/0162006 A1 6/2015 Kummer
2015/0163558 A1 6/2015 Wheatley
2015/0169284 A1 6/2015 Quast et al.
2015/0169336 A1 6/2015 Harper et al.
2015/0169696 A1 6/2015 Krishnappa et al.
2015/0170664 A1 6/2015 Doherty et al.
2015/0172262 A1 6/2015 Ortiz, Jr. et al.
2015/0172463 A1 6/2015 Quast et al.
2015/0178388 A1 6/2015 Winnemoeller et al.
2015/0179176 A1 6/2015 Ryu et al.
2015/0185964 A1 7/2015 Stout
2015/0186012 A1 7/2015 Coleman et al.
2015/0186110 A1 7/2015 Kannan
2015/0186154 A1 7/2015 Brown et al.
2015/0186155 A1 7/2015 Brown et al.
2015/0186156 A1 7/2015 Brown et al.
2015/0186351 A1 7/2015 Hicks et al.
2015/0187355 A1 7/2015 Parkinson et al.
2015/0187369 A1 7/2015 Dadu et al.
2015/0189362 A1 7/2015 Lee et al.
2015/0193379 A1 7/2015 Mehta
2015/0193391 A1 7/2015 Khvostichenko et al.
2015/0193392 A1 7/2015 Greenblatt et al.
2015/0194152 A1 7/2015 Katuri et al.
2015/0195379 A1 7/2015 Zhang et al.
2015/0195606 A1 7/2015 McDevitt
2015/0199077 A1 7/2015 Zuger et al.
2015/0199960 A1 7/2015 Huo et al.
2015/0199965 A1 7/2015 Leak et al.
2015/0199967 A1 7/2015 Reddy et al.
2015/0201064 A1 7/2015 Bells et al.
2015/0201077 A1 7/2015 Konig et al.
2015/0205858 A1 7/2015 Xie et al.
2015/0208226 A1 7/2015 Kuusilinna et al.
2015/0212791 A1 7/2015 Kumar et al.
2015/0213796 A1 7/2015 Waltermann et al.
2015/0215258 A1 7/2015 Nowakowski et al.
2015/0220507 A1 8/2015 Mohajer et al.
2015/0221304 A1 8/2015 Stewart
2015/0221307 A1 8/2015 Shah et al.
2015/0222586 A1* 8/2015 Ebersman ........... G06F 3/04817
715/752
2015/0227505 A1 8/2015 Morimoto et al.
2015/0227633 A1 8/2015 Shapira
2015/0228274 A1 8/2015 Leppnen et al.
2015/0228281 A1 8/2015 Raniere
2015/0230095 A1 8/2015 Smith et al.
2015/0234636 A1 8/2015 Barnes, Jr.
2015/0234800 A1 8/2015 Patrick et al.
2015/0242091 A1 8/2015 Lu et al.
2015/0243278 A1 8/2015 Kibre et al.
2015/0243283 A1 8/2015 Halash et al.
2015/0245154 A1 8/2015 Dadu et al.
2015/0248651 A1 9/2015 Akutagawa et al.
2015/0248886 A1 9/2015 Sarikaya et al.
2015/0253146 A1 9/2015 Annapureddy et al.
2015/0254057 A1 9/2015 Klein et al.
2015/0254058 A1 9/2015 Klein et al.
2015/0254333 A1 9/2015 Fife et al.
2015/0255071 A1 9/2015 Chiba
2015/0256873 A1 9/2015 Klein et al.
2015/0261298 A1 9/2015 Li
2015/0261496 A1 9/2015 Faaborg et al.
2015/0261850 A1 9/2015 Mittal
2015/0269139 A1 9/2015 McAteer et al.
2015/0269943 A1 9/2015 VanBlon et al.
2015/0277574 A1 10/2015 Jain et al.
2015/0278348 A1 10/2015 Paruchuri et al.
2015/0278370 A1 10/2015 Stratvert et al.
2015/0278737 A1 10/2015 Chen Huebscher et al.
2015/0279358 A1 10/2015 Kingsbury et al.
2015/0279360 A1 10/2015 Mengibar et al.
2015/0281380 A1 10/2015 Wang et al.
2015/0281401 A1 10/2015 Le et al.
2015/0286627 A1 10/2015 Chang et al.
2015/0286716 A1 10/2015 Snibbe et al.
2015/0287401 A1 10/2015 Lee et al.
2015/0287409 A1 10/2015 Jang
2015/0288629 A1* 10/2015 Choi ....................... H04L 51/32
709/206
2015/0294086 A1 10/2015 Kare et al.
2015/0294377 A1 10/2015 Chow
2015/0294516 A1 10/2015 Chiang
2015/0295915 A1 10/2015 Xiu
2015/0302855 A1 10/2015 Kim et al.
2015/0302856 A1 10/2015 Kim et al.
2015/0302857 A1 10/2015 Yamada
2015/0309997 A1 10/2015 Lee et al.
2015/0310114 A1 10/2015 Ryger et al.
2015/0310858 A1 10/2015 Li et al.
2015/0310862 A1 10/2015 Dauphin et al.
2015/0310879 A1 10/2015 Buchanan et al.
2015/0312182 A1 10/2015 Langholz
2015/0314454 A1 11/2015 Breazeal et al.
2015/0317069 A1 11/2015 Clements et al.
2015/0317310 A1 11/2015 Eiche et al.
2015/0324041 A1 11/2015 Varley et al.
2015/0324334 A1 11/2015 Lee et al.
2015/0331664 A1 11/2015 Osawa et al.
2015/0331711 A1 11/2015 Huang et al.
2015/0332667 A1 11/2015 Mason
2015/0334346 A1 11/2015 Cheatham, III et al.
2015/0339049 A1 11/2015 Kasemset et al.
2015/0339391 A1 11/2015 Kang et al.
2015/0340033 A1 11/2015 Di Fabbrizio et al.
2015/0340040 A1 11/2015 Mun et al.
2015/0340042 A1 11/2015 Sejnoha et al.
2015/0341717 A1 11/2015 Song et al.
2015/0347086 A1 12/2015 Liedholm et al.
2015/0347381 A1 12/2015 Bellegarda
2015/0347382 A1 12/2015 Dolfing et al.
2015/0347385 A1 12/2015 Flor et al.
2015/0347393 A1 12/2015 Futrell et al.
2015/0347733 A1 12/2015 Tsou et al.
2015/0347985 A1 12/2015 Gross et al.
2015/0348547 A1 12/2015 Paulik et al.
2015/0348548 A1 12/2015 Piernot et al.
2015/0348549 A1 12/2015 Giuli et al.
2015/0348551 A1 12/2015 Gruber et al.
2015/0348554 A1 12/2015 Orr et al.
2015/0348555 A1 12/2015 Sugita
2015/0349934 A1 12/2015 Pollack et al.
2015/0350031 A1 12/2015 Burks et al.
2015/0350342 A1 12/2015 Thorpe et al.
2015/0350594 A1 12/2015 Mate et al.
2015/0352999 A1 12/2015 Bando et al.
2015/0355879 A1 12/2015 Beckhardt et al.
2015/0356410 A1 12/2015 Faith et al.
2015/0363587 A1 12/2015 Ahn et al.
2015/0364128 A1 12/2015 Zhao et al.
2015/0364140 A1 12/2015 Thorn
2015/0370531 A1 12/2015 Faaborg

(56) References Cited

U.S. PATENT DOCUMENTS

2015/0370780 A1 12/2015 Wang et al.
2015/0370787 A1 12/2015 Akbacak et al.
2015/0371215 A1 12/2015 Zhou et al.
2015/0371529 A1 12/2015 Dolecki
2015/0371639 A1 12/2015 Foerster et al.
2015/0371663 A1 12/2015 Gustafson et al.
2015/0371665 A1 12/2015 Naik et al.
2015/0373183 A1 12/2015 Woolsey et al.
2015/0379414 A1 12/2015 Yeh et al.
2015/0379993 A1 12/2015 Subhojit et al.
2015/0382047 A1 12/2015 Napolitano et al.
2015/0382079 A1 12/2015 Lister et al.
2015/0382147 A1 12/2015 Clark et al.
2016/0004690 A1 1/2016 Bangalore et al.
2016/0005320 A1 1/2016 deCharms et al.
2016/0012038 A1 1/2016 Edwards et al.
2016/0014476 A1 1/2016 Caliendo, Jr. et al.
2016/0018872 A1 1/2016 Tu et al.
2016/0018900 A1 1/2016 Tu et al.
2016/0018959 A1 1/2016 Yamashita et al.
2016/0019886 A1 1/2016 Hong
2016/0026258 A1 1/2016 Ou et al.
2016/0027431 A1 1/2016 Kurzweil et al.
2016/0028666 A1 1/2016 Li
2016/0029316 A1 1/2016 Mohan et al.
2016/0034042 A1 2/2016 Joo
2016/0034811 A1 2/2016 Paulik et al.
2016/0036953 A1 2/2016 Lee et al.
2016/0042735 A1 2/2016 Vibbert et al.
2016/0042748 A1 2/2016 Jain et al.
2016/0048666 A1 2/2016 Dey et al.
2016/0055422 A1 2/2016 Li
2016/0062605 A1 3/2016 Agarwal et al.
2016/0063998 A1 3/2016 Krishnamoorthy et al.
2016/0070581 A1 3/2016 Soon-Shiong
2016/0071516 A1 3/2016 Lee et al.
2016/0071521 A1 3/2016 Haughay
2016/0072940 A1 3/2016 Cronin
2016/0077794 A1 3/2016 Kim et al.
2016/0078860 A1 3/2016 Paulik et al.
2016/0080165 A1 3/2016 Ehsani et al.
2016/0086116 A1 3/2016 Rao et al.
2016/0091967 A1 3/2016 Prokofieva et al.
2016/0092447 A1 3/2016 Venkataraman et al.
2016/0092766 A1 3/2016 Sainath et al.
2016/0093291 A1 3/2016 Kim
2016/0093298 A1 3/2016 Naik et al.
2016/0093301 A1 3/2016 Bellegarda et al.
2016/0093304 A1 3/2016 Kim et al.
2016/0094700 A1 3/2016 Lee et al.
2016/0094979 A1 3/2016 Naik et al.
2016/0098991 A1 4/2016 Luo et al.
2016/0104480 A1 4/2016 Sharifi
2016/0104486 A1 4/2016 Penilla et al.
2016/0111091 A1 4/2016 Bakish
2016/0117386 A1 4/2016 Ajmera et al.
2016/0118048 A1 4/2016 Heide
2016/0119338 A1 4/2016 Cheyer
2016/0125048 A1 5/2016 Hamada
2016/0125071 A1 5/2016 Gabbai
2016/0132046 A1 5/2016 Beoughter et al.
2016/0132484 A1 5/2016 Nauze et al.
2016/0132488 A1 5/2016 Clark et al.
2016/0133254 A1 5/2016 Vogel et al.
2016/0139662 A1 5/2016 Dabhade
2016/0140951 A1 5/2016 Agiomyrgiannakis et al.
2016/0140962 A1 5/2016 Sharifi
2016/0147725 A1 5/2016 Patten et al.
2016/0148610 A1 5/2016 Kennewick, Jr. et al.
2016/0150020 A1 5/2016 Farmer et al.
2016/0154880 A1 6/2016 Hoarty
2016/0155442 A1 6/2016 Kannan et al.
2016/0155443 A1 6/2016 Khan et al.
2016/0162456 A1 6/2016 Munro et al.
2016/0163311 A1 6/2016 Crook et al.
2016/0163312 A1 6/2016 Naik et al.
2016/0170966 A1 6/2016 Kolo
2016/0173578 A1 6/2016 Sharma et al.
2016/0173617 A1 6/2016 Allinson
2016/0173960 A1 6/2016 Snibbe et al.
2016/0179462 A1 6/2016 Bjorkengren
2016/0179464 A1 6/2016 Reddy et al.
2016/0179787 A1 6/2016 Deleeuw
2016/0180840 A1 6/2016 Siddiq et al.
2016/0180844 A1 6/2016 Vanblon et al.
2016/0182410 A1 6/2016 Janakiraman et al.
2016/0182709 A1 6/2016 Kim et al.
2016/0188181 A1 6/2016 Smith
2016/0188738 A1 6/2016 Gruber et al.
2016/0189717 A1 6/2016 Kannan et al.
2016/0198319 A1 7/2016 Huang et al.
2016/0210551 A1 7/2016 Lee et al.
2016/0210981 A1 7/2016 Lee
2016/0212488 A1 7/2016 Os et al.
2016/0217784 A1 7/2016 Gelfenbeyn et al.
2016/0224540 A1 8/2016 Stewart et al.
2016/0224774 A1 8/2016 Pender
2016/0225372 A1 8/2016 Cheung et al.
2016/0239645 A1 8/2016 Heo et al.
2016/0240187 A1 8/2016 Fleizach et al.
2016/0240189 A1 8/2016 Lee et al.
2016/0247061 A1 8/2016 Trask et al.
2016/0253312 A1 9/2016 Rhodes
2016/0253528 A1 9/2016 Gao et al.
2016/0259623 A1 9/2016 Sumner et al.
2016/0259656 A1 9/2016 Sumner et al.
2016/0259779 A1 9/2016 Labsk et al.
2016/0260431 A1 9/2016 Newendorp et al.
2016/0260433 A1 9/2016 Sumner et al.
2016/0260434 A1 9/2016 Gelfenbeyn et al.
2016/0260436 A1 9/2016 Lemay et al.
2016/0266871 A1 9/2016 Schmid et al.
2016/0267904 A1 9/2016 Biadsy et al.
2016/0275941 A1 9/2016 Bellegarda et al.
2016/0275947 A1 9/2016 Li et al.
2016/0282824 A1 9/2016 Smallwood et al.
2016/0282956 A1 9/2016 Ouyang et al.
2016/0284005 A1 9/2016 Daniel et al.
2016/0284199 A1 9/2016 Dotan-Cohen et al.
2016/0285808 A1 9/2016 Franklin et al.
2016/0286045 A1 9/2016 Shaltiel et al.
2016/0293168 A1 10/2016 Chen
2016/0299685 A1 10/2016 Zhai et al.
2016/0299882 A1 10/2016 Hegerty et al.
2016/0299883 A1 10/2016 Zhu et al.
2016/0307566 A1 10/2016 Bellegarda
2016/0313906 A1 10/2016 Kilchenko et al.
2016/0314788 A1 10/2016 Jitkoff et al.
2016/0314792 A1 10/2016 Alvarez et al.
2016/0315996 A1 10/2016 Ha et al.
2016/0317924 A1 11/2016 Tanaka et al.
2016/0321239 A1 11/2016 Iso-sipilä et al.
2016/0321261 A1 11/2016 Spasojevic et al.
2016/0322045 A1 11/2016 Hatfield et al.
2016/0322048 A1 11/2016 Amano et al.
2016/0322050 A1 11/2016 Wang et al.
2016/0328205 A1 11/2016 Agrawal et al.
2016/0328893 A1 11/2016 Cordova et al.
2016/0336007 A1 11/2016 Hanazawa
2016/0336010 A1 11/2016 Lindahl
2016/0336024 A1 11/2016 Choi et al.
2016/0337299 A1 11/2016 Lane et al.
2016/0337301 A1 11/2016 Rollins et al.
2016/0342685 A1 11/2016 Basu et al.
2016/0342781 A1 11/2016 Jeon
2016/0351190 A1 12/2016 Binder et al.
2016/0352567 A1 12/2016 Robbins et al.
2016/0357304 A1 12/2016 Hatori et al.
2016/0357728 A1 12/2016 Bellegarda et al.
2016/0357790 A1 12/2016 Elkington et al.
2016/0357861 A1 12/2016 Carlhian et al.
2016/0357870 A1 12/2016 Hentschel et al.
2016/0358598 A1 12/2016 Williams et al.
2016/0358600 A1 12/2016 Nallasamy et al.

(56) References Cited

U.S. PATENT DOCUMENTS

2016/0358619 A1 12/2016 Ramprashad et al.
2016/0359771 A1* 12/2016 Sridhar ............. H04M 1/72436
2016/0360039 A1 12/2016 Sanghavi et al.
2016/0360336 A1 12/2016 Gross et al.
2016/0360382 A1 12/2016 Gross et al.
2016/0364378 A1 12/2016 Futrell et al.
2016/0365101 A1 12/2016 Foy et al.
2016/0371250 A1 12/2016 Rhodes
2016/0372112 A1 12/2016 Miller et al.
2016/0378747 A1 12/2016 Orr et al.
2016/0379091 A1 12/2016 Lin et al.
2016/0379626 A1 12/2016 Deisher et al.
2016/0379633 A1 12/2016 Lehman et al.
2016/0379641 A1 12/2016 Liu et al.
2017/0003931 A1 1/2017 Dvortsov et al.
2017/0004824 A1 1/2017 Yoo et al.
2017/0011091 A1 1/2017 Chehreghani
2017/0011303 A1 1/2017 Annapureddy et al.
2017/0011742 A1 1/2017 Jing et al.
2017/0013124 A1 1/2017 Havelka et al.
2017/0018271 A1 1/2017 Khan et al.
2017/0019987 A1 1/2017 Dragone et al.
2017/0025124 A1 1/2017 Mixter et al.
2017/0031576 A1 2/2017 Saoji et al.
2017/0032783 A1 2/2017 Lord et al.
2017/0032791 A1 2/2017 Elson et al.
2017/0039283 A1 2/2017 Bennett et al.
2017/0039475 A1 2/2017 Cheyer et al.
2017/0040002 A1 2/2017 Basson et al.
2017/0053652 A1 2/2017 Choi et al.
2017/0055895 A1 3/2017 Des Jardins et al.
2017/0060853 A1 3/2017 Lee et al.
2017/0061423 A1 3/2017 Bryant et al.
2017/0068423 A1 3/2017 Napolitano et al.
2017/0068513 A1 3/2017 Stasior et al.
2017/0068550 A1 3/2017 Zeitlin
2017/0068670 A1 3/2017 Orr et al.
2017/0076720 A1 3/2017 Gopalan et al.
2017/0076721 A1 3/2017 Bargetzi et al.
2017/0078490 A1 3/2017 Kaminsky et al.
2017/0083179 A1 3/2017 Gruber et al.
2017/0083285 A1 3/2017 Meyers et al.
2017/0083504 A1 3/2017 Huang
2017/0084277 A1 3/2017 Sharifi
2017/0085547 A1 3/2017 De Aguiar et al.
2017/0090569 A1 3/2017 Levesque
2017/0091168 A1 3/2017 Bellegarda et al.
2017/0091612 A1 3/2017 Gruber et al.
2017/0092270 A1 3/2017 Newendorp et al.
2017/0092278 A1 3/2017 Evermann et al.
2017/0102837 A1 4/2017 Toumpelis
2017/0102915 A1 4/2017 Kuscher et al.
2017/0103749 A1 4/2017 Zhao et al.
2017/0105190 A1 4/2017 Logan et al.
2017/0116177 A1 4/2017 Walia
2017/0116989 A1 4/2017 Yadgar et al.
2017/0124190 A1 5/2017 Wang et al.
2017/0125016 A1 5/2017 Wang
2017/0127124 A9 5/2017 Wilson et al.
2017/0131778 A1 5/2017 Iyer
2017/0132019 A1 5/2017 Karashchuk et al.
2017/0132199 A1 5/2017 Vescovi et al.
2017/0140644 A1 5/2017 Hwang et al.
2017/0147841 A1 5/2017 Stagg et al.
2017/0148044 A1 5/2017 Fukuda et al.
2017/0154033 A1 6/2017 Lee
2017/0154055 A1 6/2017 Dimson et al.
2017/0155940 A1 6/2017 Ji et al.
2017/0161018 A1 6/2017 Lemay et al.
2017/0161268 A1 6/2017 Badaskar
2017/0161293 A1 6/2017 Ionescu et al.
2017/0169818 A1 6/2017 VanBlon et al.
2017/0169819 A1 6/2017 Mese et al.
2017/0177547 A1 6/2017 Ciereszko et al.
2017/0178619 A1 6/2017 Naik et al.
2017/0178626 A1 6/2017 Gruber et al.
2017/0180499 A1 6/2017 Gelfenbeyn et al.
2017/0185375 A1 6/2017 Martel et al.
2017/0185581 A1 6/2017 Bojja et al.
2017/0186429 A1 6/2017 Giuli et al.
2017/0193083 A1 7/2017 Bhatt et al.
2017/0195493 A1 7/2017 Kasilya Sudarsan et al.
2017/0199870 A1 7/2017 Zheng et al.
2017/0199874 A1 7/2017 Patel et al.
2017/0200066 A1 7/2017 Wang et al.
2017/0206899 A1 7/2017 Bryant et al.
2017/0215052 A1 7/2017 Koum et al.
2017/0221486 A1 8/2017 Kurata et al.
2017/0227935 A1 8/2017 Su et al.
2017/0228367 A1 8/2017 Pasupalak et al.
2017/0228382 A1 8/2017 Haviv et al.
2017/0230429 A1 8/2017 Garmark et al.
2017/0230709 A1 8/2017 Van Os et al.
2017/0236512 A1 8/2017 Williams et al.
2017/0236514 A1 8/2017 Nelson
2017/0242653 A1 8/2017 Lang et al.
2017/0242657 A1 8/2017 Jarvis et al.
2017/0243468 A1 8/2017 Dotan-Cohen et al.
2017/0243586 A1 8/2017 Civelli et al.
2017/0256256 A1 9/2017 Wang et al.
2017/0263247 A1 9/2017 Kang et al.
2017/0263248 A1* 9/2017 Gruber .................. G06F 40/166
2017/0263249 A1 9/2017 Akbacak et al.
2017/0264451 A1 9/2017 Yu et al.
2017/0264711 A1 9/2017 Natarajan et al.
2017/0278514 A1 9/2017 Mathias et al.
2017/0285915 A1 10/2017 Napolitano et al.
2017/0286397 A1 10/2017 Gonzalez
2017/0295446 A1 10/2017 Thagadur Shivappa
2017/0311005 A1 10/2017 Lin
2017/0316775 A1 11/2017 Le et al.
2017/0316782 A1 11/2017 Haughay
2017/0323637 A1 11/2017 Naik
2017/0329490 A1 11/2017 Esinovskaya et al.
2017/0329572 A1 11/2017 Shah et al.
2017/0345411 A1 11/2017 Raitio et al.
2017/0345420 A1 11/2017 Barnett, Jr.
2017/0346949 A1 11/2017 Sanghavi et al.
2017/0352346 A1 12/2017 Paulik et al.
2017/0352350 A1 12/2017 Booker et al.
2017/0357478 A1 12/2017 Piersol et al.
2017/0357632 A1 12/2017 Pagallo et al.
2017/0357633 A1 12/2017 Wang et al.
2017/0357637 A1 12/2017 Nell et al.
2017/0357640 A1 12/2017 Bellegarda et al.
2017/0357716 A1 12/2017 Bellegarda et al.
2017/0358300 A1 12/2017 Laurens et al.
2017/0358301 A1 12/2017 Raitio et al.
2017/0358302 A1 12/2017 Orr et al.
2017/0358303 A1 12/2017 Walker, II et al.
2017/0358304 A1 12/2017 Castillo et al.
2017/0358305 A1 12/2017 Kudurshian et al.
2017/0365251 A1 12/2017 Park et al.
2017/0371885 A1 12/2017 Aggarwal et al.
2017/0374093 A1 12/2017 Dhar et al.
2018/0005112 A1 1/2018 Iso-sipila et al.
2018/0007060 A1 1/2018 Leblang et al.
2018/0007096 A1 1/2018 Levin et al.
2018/0007538 A1 1/2018 Naik et al.
2018/0012596 A1 1/2018 Piernot et al.
2018/0018248 A1 1/2018 Bhargava et al.
2018/0033431 A1 2/2018 Newendorp et al.
2018/0047406 A1 2/2018 Park
2018/0054505 A1 2/2018 Hart et al.
2018/0060032 A1 3/2018 Boesen
2018/0060312 A1 3/2018 Won
2018/0061400 A1 3/2018 Carbune et al.
2018/0061401 A1 3/2018 Sarikaya et al.
2018/0062691 A1 3/2018 Barnett, Jr.
2018/0063308 A1 3/2018 Crystal et al.
2018/0063624 A1 3/2018 Boesen
2018/0067914 A1 3/2018 Chen et al.
2018/0067918 A1 3/2018 Bellegarda et al.
2018/0069743 A1 3/2018 Bakken et al.

(56) References Cited

U.S. PATENT DOCUMENTS

2018/0075847 A1 3/2018 Lee et al.
2018/0088969 A1 3/2018 Vanblon et al.
2018/0089166 A1 3/2018 Meyer et al.
2018/0090143 A1 3/2018 Saddler et al.
2018/0096683 A1 4/2018 James et al.
2018/0107917 A1 4/2018 Hewavitharana et al.
2018/0107945 A1 4/2018 Gao et al.
2018/0108346 A1 4/2018 Paulik et al.
2018/0122376 A1 5/2018 Kojima
2018/0122378 A1 5/2018 Mixter et al.
2018/0130470 A1 5/2018 Lemay et al.
2018/0130471 A1 5/2018 Trufinescu et al.
2018/0137856 A1 5/2018 Gilbert
2018/0137857 A1 5/2018 Zhou et al.
2018/0143967 A1 5/2018 Anbazhagan et al.
2018/0144615 A1 5/2018 Kinney et al.
2018/0144748 A1 5/2018 Leong
2018/0150744 A1 5/2018 Orr et al.
2018/0157372 A1 6/2018 Kurabayashi
2018/0157992 A1 6/2018 Susskind et al.
2018/0174406 A1 6/2018 Arashi et al.
2018/0174597 A1 6/2018 Lee et al.
2018/0182376 A1 6/2018 Van Gysel et al.
2018/0190273 A1 7/2018 Karimli et al.
2018/0196683 A1 7/2018 Radebaugh et al.
2018/0213448 A1 7/2018 Segal et al.
2018/0218735 A1 8/2018 Hunt et al.
2018/0232203 A1 8/2018 Gelfenbeyn et al.
2018/0247065 A1 8/2018 Rhee et al.
2018/0253209 A1 9/2018 Jaygarl et al.
2018/0253652 A1 9/2018 Palzer et al.
2018/0270343 A1 9/2018 Rout et al.
2018/0275839 A1 9/2018 Kocienda et al.
2018/0276197 A1 9/2018 Nell et al.
2018/0278740 A1 9/2018 Choi et al.
2018/0293984 A1 10/2018 Lindahl
2018/0308480 A1 10/2018 Jang et al.
2018/0308485 A1 10/2018 Kudurshian et al.
2018/0308486 A1 10/2018 Saddler et al.
2018/0314552 A1 11/2018 Kim et al.
2018/0322112 A1 11/2018 Bellegarda et al.
2018/0322881 A1 11/2018 Min et al.
2018/0329677 A1 11/2018 Gruber et al.
2018/0329957 A1 11/2018 Frazzingaro et al.
2018/0329982 A1 11/2018 Patel et al.
2018/0329998 A1 11/2018 Thomson et al.
2018/0330714 A1 11/2018 Paulik et al.
2018/0330721 A1 11/2018 Thomson et al.
2018/0330722 A1 11/2018 Newendorp et al.
2018/0330723 A1 11/2018 Acero et al.
2018/0330729 A1 11/2018 Golipour et al.
2018/0330730 A1 11/2018 Garg et al.
2018/0330731 A1 11/2018 Zeitlin et al.
2018/0330733 A1 11/2018 Orr et al.
2018/0330737 A1 11/2018 Paulik et al.
2018/0332118 A1 11/2018 Phipps et al.
2018/0336184 A1 11/2018 Bellegarda et al.
2018/0336275 A1 11/2018 Graham et al.
2018/0336449 A1 11/2018 Adan et al.
2018/0336892 A1 11/2018 Kim et al.
2018/0336894 A1 11/2018 Graham et al.
2018/0336904 A1 11/2018 Piercy et al.
2018/0336905 A1 11/2018 Kim et al.
2018/0336920 A1 11/2018 Bastian et al.
2018/0349346 A1 12/2018 Hatori et al.
2018/0349349 A1 12/2018 Bellegarda et al.
2018/0349447 A1 12/2018 Maccartney et al.
2018/0349472 A1 12/2018 Kohlschuetter et al.
2018/0350345 A1 12/2018 Naik
2018/0350353 A1 12/2018 Gruber et al.
2018/0357308 A1 12/2018 Cheyer
2018/0358015 A1 12/2018 Cash et al.
2018/0366105 A1 12/2018 Kim
2018/0373487 A1 12/2018 Gruber et al.
2018/0374484 A1 12/2018 Huang et al.
2019/0012141 A1 1/2019 Piersol et al.
2019/0012449 A1 1/2019 Cheyer
2019/0013018 A1 1/2019 Rekstad
2019/0013025 A1 1/2019 Alcorn et al.
2019/0014450 A1 1/2019 Gruber et al.
2019/0034040 A1 1/2019 Shah et al.
2019/0034826 A1 1/2019 Ahmad et al.
2019/0035405 A1 1/2019 Haughay
2019/0045040 A1 2/2019 Lee et al.
2019/0051309 A1 2/2019 Kim et al.
2019/0057697 A1 2/2019 Giuli et al.
2019/0065144 A1 2/2019 Sumner et al.
2019/0074009 A1 3/2019 Kim et al.
2019/0074015 A1 3/2019 Orr et al.
2019/0074016 A1 3/2019 Orr et al.
2019/0080685 A1 3/2019 Johnson, Jr.
2019/0095050 A1 3/2019 Seyed Ibrahim et al.
2019/0095171 A1 3/2019 Carson et al.
2019/0102378 A1 4/2019 Piernot et al.
2019/0103112 A1 4/2019 Walker et al.
2019/0116264 A1 4/2019 Sanghavi et al.
2019/0122666 A1 4/2019 Raitio et al.
2019/0122692 A1 4/2019 Binder et al.
2019/0124019 A1* 4/2019 Leon .................. G06F 3/04842
2019/0147880 A1 5/2019 Booker et al.
2019/0164546 A1 5/2019 Piernot et al.
2019/0172467 A1 6/2019 Kim et al.
2019/0179890 A1 6/2019 Evermann
2019/0189118 A1 6/2019 Piernot et al.
2019/0189125 A1 6/2019 Van Os et al.
2019/0197053 A1 6/2019 Graham et al.
2019/0213999 A1 7/2019 Grupen et al.
2019/0214024 A1 7/2019 Gruber et al.
2019/0220245 A1 7/2019 Martel et al.
2019/0220246 A1 7/2019 Orr et al.
2019/0220247 A1 7/2019 Lemay et al.
2019/0236130 A1 8/2019 Li et al.
2019/0236459 A1 8/2019 Cheyer et al.
2019/0244618 A1 8/2019 Newendorp et al.
2019/0251960 A1 8/2019 Maker et al.
2019/0259386 A1 8/2019 Kudurshian et al.
2019/0272831 A1 9/2019 Kajarekar
2019/0278841 A1 9/2019 Pusateri et al.

FOREIGN PATENT DOCUMENTS

AU 2015101171 A4 10/2015
AU 2018100187 A4 3/2018
CA 2694314 A1 8/2010
CA 2792412 A1 7/2011
CA 2666438 C 6/2013
CN 101388012 A 3/2009
CN 101416471 A 4/2009
CN 101427244 A 5/2009
CN 101448340 A 6/2009
CN 101453498 A 6/2009
CN 101499156 A 8/2009
CN 101500041 A 8/2009
CN 101515952 A 8/2009
CN 101535983 A 9/2009
CN 101547396 A 9/2009
CN 101557432 A 10/2009
CN 101601088 A 12/2009
CN 101604521 A 12/2009
CN 101632316 A 1/2010
CN 101636736 A 1/2010
CN 101667424 A 3/2010
CN 101673544 A 3/2010
CN 101751387 A 6/2010
CN 101833286 A 9/2010
CN 101847405 A 9/2010
CN 101894547 A 11/2010
CN 101930789 A 12/2010
CN 101939740 A 1/2011
CN 101951553 A 1/2011
CN 101971250 A 5/2011
CN 102056026 A 5/2011
CN 102137085 A 7/2011
CN 102137193 A 7/2011

(56) References Cited

FOREIGN PATENT DOCUMENTS

| | | | |
|---|---|---|---|
| CN | 102160043 | A | 9/2011 |
| CN | 102201235 | A | 9/2011 |
| CN | 102214187 | A | 10/2011 |
| CN | 102237088 | A | 11/2011 |
| CN | 102246136 | A | 11/2011 |
| CN | 202035047 | U | 11/2011 |
| CN | 102282609 | A | 12/2011 |
| CN | 202092650 | U | 12/2011 |
| CN | 102368256 | A | 3/2012 |
| CN | 102405463 | A | 4/2012 |
| CN | 102498457 | A | 6/2012 |
| CN | 102510426 | A | 6/2012 |
| CN | 102629246 | A | 8/2012 |
| CN | 102651217 | A | 8/2012 |
| CN | 102682769 | A | 9/2012 |
| CN | 102682771 | A | 9/2012 |
| CN | 102685295 | A | 9/2012 |
| CN | 102693725 | A | 9/2012 |
| CN | 202453859 | U | 9/2012 |
| CN | 102722478 | A | 10/2012 |
| CN | 102750087 | A | 11/2012 |
| CN | 102792320 | A | 11/2012 |
| CN | 102801853 | A | 11/2012 |
| CN | 102870065 | A | 1/2013 |
| CN | 102882752 | A | 1/2013 |
| CN | 102917004 | A | 2/2013 |
| CN | 102917271 | A | 2/2013 |
| CN | 102918493 | A | 4/2013 |
| CN | 103035240 | A | 4/2013 |
| CN | 103035251 | A | 4/2013 |
| CN | 103038728 | A | 4/2013 |
| CN | 103093334 | A | 5/2013 |
| CN | 103135916 | A | 6/2013 |
| CN | 103198831 | A | 7/2013 |
| CN | 103209369 | A | 7/2013 |
| CN | 103226949 | A | 7/2013 |
| CN | 103236260 | A | 8/2013 |
| CN | 103292437 | A | 10/2013 |
| CN | 103365279 | A | 10/2013 |
| CN | 103390016 | A | 11/2013 |
| CN | 103455234 | A | 12/2013 |
| CN | 103562863 | A | 4/2014 |
| CN | 103744761 | A | 4/2014 |
| CN | 103760984 | A | 4/2014 |
| CN | 103792985 | A | 5/2014 |
| CN | 103795850 | A | 5/2014 |
| CN | 103841268 | A | 6/2014 |
| CN | 103930945 | A | 7/2014 |
| CN | 104038621 | A | 9/2014 |
| CN | 104090652 | A | 10/2014 |
| CN | 104113471 | A | 10/2014 |
| CN | 104144377 | A | 11/2014 |
| CN | 104281259 | A | 1/2015 |
| CN | 104284257 | A | 1/2015 |
| CN | 104335234 | A | 3/2015 |
| CN | 104423625 | A | 3/2015 |
| CN | 104463552 | A | 3/2015 |
| CN | 104516522 | A | 4/2015 |
| CN | 104854583 | A | 8/2015 |
| CN | 104951077 | A | 9/2015 |
| CN | 105100356 | A | 11/2015 |
| CN | 105247511 | A | 1/2016 |
| CN | 105264524 | A | 1/2016 |
| CN | 105471705 | A | 5/2016 |
| CN | 105556592 | A | 5/2016 |
| CN | 105869641 | A | 8/2016 |
| CN | 106030699 | A | 10/2016 |
| CN | 106062734 | A | 10/2016 |
| CN | 106462383 | A | 2/2017 |
| CN | 107919123 | A | 4/2018 |
| DE | 102008024258 | A1 | 11/2009 |
| DE | 202016008226 | U1 | 5/2017 |
| EP | 1909263 | B1 | 1/2009 |
| EP | 1335620 | B1 | 3/2009 |
| EP | 2069895 | A1 | 6/2009 |
| EP | 2081185 | A1 | 7/2009 |
| EP | 2094032 | A1 | 8/2009 |
| EP | 2096840 | A1 | 9/2009 |
| EP | 2107553 | A1 | 10/2009 |
| EP | 2109295 | A1 | 10/2009 |
| EP | 1720375 | B1 | 7/2010 |
| EP | 2205010 | A1 | 7/2010 |
| EP | 2309491 | A1 | 4/2011 |
| EP | 2329348 | | 6/2011 |
| EP | 2339576 | | 6/2011 |
| EP | 2355093 | A2 | 8/2011 |
| EP | 2400373 | A1 | 12/2011 |
| EP | 2431842 | A2 | 3/2012 |
| EP | 2523188 | A1 | 11/2012 |
| EP | 2551784 | A1 | 1/2013 |
| EP | 2555536 | A1 | 2/2013 |
| EP | 2575128 | A2 | 4/2013 |
| EP | 2632129 | A1 | 8/2013 |
| EP | 2669889 | A2 | 12/2013 |
| EP | 2683175 | A1 | 1/2014 |
| EP | 2733598 | A2 | 5/2014 |
| EP | 2760015 | A1 | 7/2014 |
| EP | 2801890 | A1 | 11/2014 |
| EP | 2801972 | A1 | 11/2014 |
| EP | 2824564 | A1 | 1/2015 |
| EP | 2849177 | A1 | 6/2015 |
| EP | 2879402 | A1 | 6/2015 |
| EP | 2930715 | A1 | 10/2015 |
| EP | 2938022 | A1 | 10/2015 |
| EP | 2940556 | A1 | 11/2015 |
| EP | 2950307 | A1 | 12/2015 |
| EP | 2985984 | A2 | 2/2016 |
| EP | 3035329 | A1 | 6/2016 |
| EP | 3125097 | A2 | 2/2017 |
| EP | 3224708 | A1 | 10/2017 |
| EP | 3246916 | A1 | 11/2017 |
| EP | 3300074 | A1 | 3/2018 |
| EP | 2983065 | B1 | 8/2018 |
| JP | 2009-2850 | A | 1/2009 |
| JP | 2009-503623 | A | 1/2009 |
| JP | 2009-36999 | A | 2/2009 |
| JP | 2009-505142 | A | 2/2009 |
| JP | 2009-47920 | A | 3/2009 |
| JP | 2009-60512 | A | 3/2009 |
| JP | 2009-069062 | A | 4/2009 |
| JP | 2009-98490 | A | 5/2009 |
| JP | 2009-110300 | A | 5/2009 |
| JP | 2009-116841 | A | 5/2009 |
| JP | 2009-134409 | A | 6/2009 |
| JP | 2009-140444 | A | 6/2009 |
| JP | 2009-169470 | A | 7/2009 |
| JP | 2009-177440 | A | 8/2009 |
| JP | 2009-186989 | A | 8/2009 |
| JP | 2009-193448 | A | 8/2009 |
| JP | 2009-193457 | A | 8/2009 |
| JP | 2009-193532 | A | 8/2009 |
| JP | 2009-205367 | A | 9/2009 |
| JP | 2009-223840 | A | 10/2009 |
| JP | 2009-294913 | A | 12/2009 |
| JP | 2009-294946 | A | 12/2009 |
| JP | 2009-543166 | A | 12/2009 |
| JP | 2010-66519 | A | 3/2010 |
| JP | 2010-78979 | A | 5/2010 |
| JP | 2010-108378 | A | 5/2010 |
| JP | 2010-518475 | A | 5/2010 |
| JP | 2010-518526 | A | 5/2010 |
| JP | 2010-146347 | A | 7/2010 |
| JP | 2010-157207 | A | 7/2010 |
| JP | 2010-166478 | A | 7/2010 |
| JP | 2010-205111 | A | 9/2010 |
| JP | 2010-224236 | A | 10/2010 |
| JP | 4563106 | B2 | 10/2010 |
| JP | 2010-535377 | A | 11/2010 |
| JP | 2010-287063 | A | 12/2010 |
| JP | 2011-33874 | A | 2/2011 |
| JP | 2011-41026 | A | 3/2011 |
| JP | 2011-45005 | A | 3/2011 |
| JP | 2011-59659 | A | 4/2011 |
| JP | 2011-81541 | A | 4/2011 |

(56) References Cited

FOREIGN PATENT DOCUMENTS

| | | | |
|---|---|---|---|
| JP | 2011-525045 | A | 9/2011 |
| JP | 2011-238022 | A | 11/2011 |
| JP | 2011-250027 | A | 12/2011 |
| JP | 2012-014394 | A | 1/2012 |
| JP | 2012-33997 | A | 2/2012 |
| JP | 2012-508530 | A | 4/2012 |
| JP | 2012-089020 | A | 5/2012 |
| JP | 2012-116442 | A | 6/2012 |
| JP | 2012-142744 | A | 7/2012 |
| JP | 2012-147063 | A | 8/2012 |
| JP | 2012-518847 | A | 8/2012 |
| JP | 2013-37688 | A | 2/2013 |
| JP | 2013-511214 | A | 3/2013 |
| JP | 2013-65284 | A | 4/2013 |
| JP | 2013-73240 | A | 4/2013 |
| JP | 2013-513315 | A | 4/2013 |
| JP | 2013-080476 | A | 5/2013 |
| JP | 2013-517566 | A | 5/2013 |
| JP | 2013-134430 | A | 7/2013 |
| JP | 2013-140520 | A | 7/2013 |
| JP | 2013-527947 | A | 7/2013 |
| JP | 2013-528012 | A | 7/2013 |
| JP | 2013-156349 | A | 8/2013 |
| JP | 2013-200423 | A | 10/2013 |
| JP | 2013-205999 | A | 10/2013 |
| JP | 2013-238936 | A | 12/2013 |
| JP | 2013-258600 | A | 12/2013 |
| JP | 2014-2586 | A | 1/2014 |
| JP | 2014-10688 | A | 1/2014 |
| JP | 2014-026629 | A | 4/2014 |
| JP | 2014-60600 | A | 4/2014 |
| JP | 2014-72586 | A | 4/2014 |
| JP | 2014-077969 | A | 5/2014 |
| JP | 2014-89711 | A | 5/2014 |
| JP | 2014-109889 | A | 6/2014 |
| JP | 2014-124332 | A | 7/2014 |
| JP | 2014-126600 | A | 7/2014 |
| JP | 2014-140121 | A | 7/2014 |
| JP | 2014-145842 | A | 8/2014 |
| JP | 2014-146940 | A | 8/2014 |
| JP | 2014-150323 | A | 8/2014 |
| JP | 2014-219614 | A | 11/2014 |
| JP | 2014-222514 | A | 11/2014 |
| JP | 2015-8001 | A | 1/2015 |
| JP | 2015-18365 | A | 1/2015 |
| JP | 2015-501022 | A | 1/2015 |
| JP | 2015-41845 | A | 3/2015 |
| JP | 2015-81971 | A | 4/2015 |
| JP | 2015-94848 | A | 5/2015 |
| JP | 2015-519675 | A | 8/2015 |
| JP | 2015-524974 | A | 9/2015 |
| JP | 2015-527683 | A | 9/2015 |
| JP | 2015-528140 | A | 9/2015 |
| JP | 2015-526776 | A | 10/2015 |
| JP | 2015-528918 | A | 10/2015 |
| JP | 2016-508007 | A | 3/2016 |
| JP | 2016-71247 | A | 5/2016 |
| JP | 2016-119615 | A | 6/2016 |
| JP | 2016-151928 | A | 8/2016 |
| JP | 2016-524193 | A | 8/2016 |
| JP | 2017-19331 | A | 1/2017 |
| JP | 2018-525950 | A | 9/2018 |
| KR | 10-2009-0001716 | A | 1/2009 |
| KR | 10-2009-0028464 | A | 3/2009 |
| KR | 10-2009-0030117 | A | 3/2009 |
| KR | 10-2009-0086805 | A | 8/2009 |
| KR | 10-0920267 | B1 | 10/2009 |
| KR | 10-2009-0122944 | A | 12/2009 |
| KR | 10-2009-0127961 | A | 12/2009 |
| KR | 10-2009-0129192 | A | 12/2009 |
| KR | 10-2010-0015958 | A | 2/2010 |
| KR | 10-2010-0048571 | A | 5/2010 |
| KR | 10-2010-0053149 | A | 5/2010 |
| KR | 10-2010-0119519 | A | 11/2010 |
| KR | 10-2011-0043644 | A | 4/2011 |
| KR | 10-1032792 | B1 | 5/2011 |
| KR | 10-2011-0068490 | A | 6/2011 |
| KR | 10-2011-0086492 | A | 7/2011 |
| KR | 10-2011-0100620 | A | 9/2011 |
| KR | 10-2011-0113414 | A | 10/2011 |
| KR | 10-2011-0115134 | A | 10/2011 |
| KR | 10-2012-0020164 | A | 3/2012 |
| KR | 10-2011-0072847 | A | 4/2012 |
| KR | 10-2012-0031722 | A | 4/2012 |
| KR | 10-1178310 | B1 | 8/2012 |
| KR | 10-2012-0120316 | A | 11/2012 |
| KR | 10-2012-0137424 | A | 12/2012 |
| KR | 10-2012-0137435 | A | 12/2012 |
| KR | 10-2012-0137440 | A | 12/2012 |
| KR | 10-2012-0138826 | A | 12/2012 |
| KR | 10-2012-0139827 | A | 12/2012 |
| KR | 10-1193668 | B1 | 12/2012 |
| KR | 10-2013-0035983 | A | 4/2013 |
| KR | 10-2013-0090947 | A | 8/2013 |
| KR | 10-2013-0108563 | A | 10/2013 |
| KR | 10-1334342 | B1 | 11/2013 |
| KR | 10-2013-0131252 | A | 12/2013 |
| KR | 10-2013-0133629 | A | 12/2013 |
| KR | 10-2014-0024271 | A | 2/2014 |
| KR | 10-2014-0031283 | A | 3/2014 |
| KR | 10-2014-0033574 | A | 3/2014 |
| KR | 10-2014-0055204 | A | 5/2014 |
| KR | 10-2014-0106715 | A | 9/2014 |
| KR | 10-2014-0147557 | A | 12/2014 |
| KR | 10-2015-0013631 | A | 2/2015 |
| KR | 10-1506510 | B1 | 3/2015 |
| KR | 10-2015-0038375 | A | 4/2015 |
| KR | 10-2015-0043512 | A | 4/2015 |
| KR | 10-2016-0004351 | A | 1/2016 |
| KR | 10-2016-0010523 | A | 1/2016 |
| KR | 10-2016-0040279 | A | 4/2016 |
| KR | 10-2016-0101198 | A | 8/2016 |
| KR | 10-2017-0036805 | A | 4/2017 |
| RU | 2349970 | C2 | 3/2009 |
| RU | 2353068 | C2 | 4/2009 |
| RU | 2364917 | C2 | 8/2009 |
| TW | M348993 | U | 1/2009 |
| TW | 200943903 | A | 10/2009 |
| TW | 201018258 | A | 5/2010 |
| TW | 201027515 | A1 | 7/2010 |
| TW | 201028996 | A1 | 8/2010 |
| TW | 201110108 | A1 | 3/2011 |
| TW | 201142823 | A1 | 12/2011 |
| TW | 201227715 | A1 | 7/2012 |
| TW | 201245989 | A1 | 11/2012 |
| TW | 201312548 | A1 | 3/2013 |
| WO | 2009/009240 | A2 | 1/2009 |
| WO | 2009/016631 | A2 | 2/2009 |
| WO | 2009/017280 | A1 | 3/2009 |
| WO | 2009/034686 | A1 | 3/2009 |
| WO | 2009/075912 | A1 | 6/2009 |
| WO | 2009/104126 | A1 | 8/2009 |
| WO | 2009/156438 | A1 | 12/2009 |
| WO | 2009/156978 | A1 | 12/2009 |
| WO | 2010/013369 | A1 | 2/2010 |
| WO | 2010/054373 | A2 | 5/2010 |
| WO | 2010/075623 | A1 | 7/2010 |
| WO | 2010/100937 | A1 | 9/2010 |
| WO | 2010/141802 | A1 | 12/2010 |
| WO | 2010/144651 | A2 | 12/2010 |
| WO | 2011/028842 | A2 | 3/2011 |
| WO | 2011/057346 | A1 | 5/2011 |
| WO | 2011/060106 | A1 | 5/2011 |
| WO | 2011/088053 | A2 | 7/2011 |
| WO | 2011/093025 | A1 | 8/2011 |
| WO | 2011/116309 | A1 | 9/2011 |
| WO | 2011/133543 | A1 | 10/2011 |
| WO | 2011/150730 | A1 | 12/2011 |
| WO | 2011/163350 | A1 | 12/2011 |
| WO | 2011/088053 | A3 | 1/2012 |
| WO | 2012/019020 | A1 | 2/2012 |
| WO | 2012/019637 | A1 | 2/2012 |
| WO | 2012/129231 | A1 | 9/2012 |
| WO | 2012/135157 | A2 | 10/2012 |

(56) References Cited

FOREIGN PATENT DOCUMENTS

| | | | |
|---|---|---|---|
| WO | 2012/154317 | A1 | 11/2012 |
| WO | 2012/155079 | A2 | 11/2012 |
| WO | 2012/167168 | A2 | 12/2012 |
| WO | 2013/009578 | A2 | 1/2013 |
| WO | 2013/022135 | A1 | 2/2013 |
| WO | 2013/022223 | A2 | 2/2013 |
| WO | 2013/048880 | A1 | 4/2013 |
| WO | 2013/049358 | A1 | 4/2013 |
| WO | 2013/163113 | A1 | 10/2013 |
| WO | 2013/169842 | A2 | 11/2013 |
| WO | 2013/173504 | A1 | 11/2013 |
| WO | 2013/173511 | A2 | 11/2013 |
| WO | 2013/176847 | A1 | 11/2013 |
| WO | 2013/184953 | A1 | 12/2013 |
| WO | 2013/184990 | A1 | 1/2014 |
| WO | 2014/003138 | A1 | 2/2014 |
| WO | 2014/021967 | A1 | 2/2014 |
| WO | 2014/022148 | A1 | 2/2014 |
| WO | 2014/028797 | A1 | 2/2014 |
| WO | 2014/031505 | A1 | 3/2014 |
| WO | 2014/047047 | A1 | 5/2014 |
| WO | 2014/066352 | A1 | 5/2014 |
| WO | 2014/070872 | A2 | 5/2014 |
| WO | 2014/078965 | A1 | 5/2014 |
| WO | 2014/096506 | A1 | 6/2014 |
| WO | 2014/124332 | A2 | 9/2014 |
| WO | 2014/137074 | A1 | 9/2014 |
| WO | 2014/138604 | A1 | 9/2014 |
| WO | 2014/143959 | A2 | 9/2014 |
| WO | 2014/144579 | A1 | 9/2014 |
| WO | 2014/159581 | A1 | 10/2014 |
| WO | 2014/197336 | A1 | 12/2014 |
| WO | 2014/200728 | A1 | 12/2014 |
| WO | 2014/204659 | A2 | 2/2015 |
| WO | 2015/018440 | A1 | 2/2015 |
| WO | 2015/029379 | A1 | 3/2015 |
| WO | 2015/030796 | A1 | 3/2015 |
| WO | 2015/041892 | A1 | 3/2015 |
| WO | 2015/084659 | A1 | 6/2015 |
| WO | 2015/092943 | A1 | 6/2015 |
| WO | 2015/094169 | A1 | 6/2015 |
| WO | 2015/094369 | A1 | 6/2015 |
| WO | 2015/099939 | A1 | 7/2015 |
| WO | 2015/116151 | A1 | 8/2015 |
| WO | 2015/151133 | A1 | 10/2015 |
| WO | 2015/153310 | A1 | 10/2015 |
| WO | 2015/157013 | A1 | 10/2015 |
| WO | 2015/183401 | A1 | 12/2015 |
| WO | 2015/183699 | A1 | 12/2015 |
| WO | 2015/184186 | A1 | 12/2015 |
| WO | 2015/184387 | A1 | 12/2015 |
| WO | 2015/200207 | A1 | 12/2015 |
| WO | 2016/027933 | A1 | 2/2016 |
| WO | 2016/028946 | A1 | 2/2016 |
| WO | 2016/033257 | A1 | 3/2016 |
| WO | 2016/052164 | A1 | 4/2016 |
| WO | 2016/054230 | A1 | 4/2016 |
| WO | 2016/057268 | A1 | 4/2016 |
| WO | 2016/075081 | A1 | 5/2016 |
| WO | 2016/085775 | A2 | 6/2016 |
| WO | 2016/100139 | A1 | 6/2016 |
| WO | 2016/111881 | A1 | 7/2016 |
| WO | 2016/144840 | A1 | 9/2016 |
| WO | 2016/144982 | A1 | 9/2016 |
| WO | 2016/175354 | A1 | 11/2016 |
| WO | 2016/190950 | A1 | 12/2016 |
| WO | 2016/209444 | A1 | 12/2016 |
| WO | 2017/044260 | A1 | 3/2017 |
| WO | 2017/044629 | A1 | 3/2017 |
| WO | 2017/053311 | A1 | 3/2017 |
| WO | 2018/213415 | A1 | 11/2018 |

OTHER PUBLICATIONS

"Alexa, Turn Up the Heat!", Smartthings Samsung [online], Available online at https://web.archive.org/web/20160329142041/https://blog.smartthings.com/news/smartthingsupdates/alexa-turn-up-the-heat/, Mar. 3, 2016, 3 pages.

Alfred App, "Alfred", available at <http://www.alfredapp.com/>, retrieved on Feb. 8, 2012, 5 pages.

Anania, Peter, "Amazon Echo with Home Automation (Smartthings)", Available online at https://www.youtube.com/watch?v=LMW6aXmsWNE, Dec. 20, 2015, 1 page.

API.AI, "Android App Review—Speaktoit Assistant", Available at https://www.youtube.com/watch?v=myE498nyfGw>, Mar. 30, 2011, 3 pages.

Apple, "VoiceOver", available at <http://www.apple.com/accessibility/voiceover/>, May 19, 2014, 3 pages.

Asakura et al., "What LG thinks; How the TV should be in the Living Room", HiVi, vol. 31, No. 7 (Jul. 2013), Stereo Sound Publishing, Inc., Jun. 17, 2013, pp. 68-71 (Official Copy Only) {(See Communication under 37 CFR § 1.98(a) (3))}.

Ashbrook, Daniel L.., "Enabling Mobile Microinteractions", Retrieved from the Internet: URL: "http://danielashbrook.com/wp-content/uploads/2012/06/2009-Ashbrook-Thesis.pdf", May 2010, 186 pages.

Ashingtondctech & Gaming, "SwipeStatusBar—Reveal the Status Bar in a Fullscreen App", Online Available at: <https://www.youtube.com/watch?v=wA_tT9IAreQ>, Jul. 1, 2013, 3 pages.

"Ask Alexa—Things That Are Smart Wiki", Available online at <URL:http://thingsthataresmart.wiki/index.php?title=Ask_Alexa&oldid=4283>, [retrieved from internet on Aug. 2, 2017], Jun. 8, 2016, pp. 1-31.

Bellegarda, Jerome R., "Chapter 1: Spoken Language Understanding for Natural Interaction: The Siri Experience", Natural Interaction with Robots, Knowbots and Smartphones, 2014, pp. 3-14.

Bellegarda, Jerome, "Spoken Language Understanding for Natural Interaction: The Siri Experience", Slideshow retrieved from : <https://www.uni-ulm.de/fileadmin/website_uni_ulm/iui.iwsds2012/files/Bellegarda.pdf>, International Workshop on Spoken Dialog Systems (IWSDS) 2012, May 2012, pp. 1-43.

Berry et al., "PTIME: Personalized Assistance for Calendaring", ACM Transactions on Intelligent Systems and Technology, vol. 2, No. 4, Article 40, Jul. 2011, pp. 1-22.

Bertulucci, Jeff, "Google Adds Voice Search to Chrome Browser", PC World, Jun. 14, 2011, 5 pages.

Bocchieri et al., "Use of Geographical Meta-Data in ASR Language and Acoustic Models", IEEE International Conference on Acoustics Speech and Signal Processing, 2010, pp. 5118-5121.

Burgess, Brian, "Amazon Echo Tip: Enable the Wake Up Sound", Available online at:- https://www.groovypost.com/howto/amazon-echo-tip-enable-wake-up-sound/, Jun. 30, 2015, 4 pages.

Butcher, Mike, "EVI Arrives in Town to go Toe-to-Toe with Siri", TechCrunch, Jan. 23, 2012, 2 pages.

Cambria et al., "Jumping NLP Curves: A Review of Natural Language Processing Research", IEEE Computational Intelligence Magazine, 2014, vol. 9, May 2014, pp. 48-57.

Caraballo et al., "Language Identification Based on a Discriminative Text Categorization Technique", Iberspeech 2012—Vii Jornadas En Tecnologia Del Habla and Iii Iberiansl Tech Workshop, Nov. 21, 2012, pp. 1-10.

Castleos, "Whole House Voice Control Demonstration", available online at: https://www.youtube.com/watch?v=9SRCoxrZ_W4, Jun. 2, 2012, 26 pages.

Chang et al., "Monaural Multi-Talker Speech Recognition with Attention Mechanism and Gated Convolutional Networks", Interspeech 2018, Sep. 2-6, 2018, pp. 1586-1590.

Chen et al., "Progressive Joint Modeling in Unsupervised Single-Channel Overlapped Speech Recognition", IEEE/ACM Transactions on Audio, Speech, and Language Processing, vol. 26, No. 1, Jan. 2018, pp. 184-196.

Chen, Yi, "Multimedia Siri Finds and Plays Whatever You Ask for", PSFK Report, Feb. 9, 2012, 9 pages.

Cheyer, Adam, "About Adam Cheyer", available at <http://www.adam.cheyer.com/about.html>, retrieved on Sep. 7, 2012, 2 pages.

(56) References Cited

OTHER PUBLICATIONS

Choi et al., "Acoustic and Visual Signal based Context Awareness System for Mobile Application", IEEE Transactions on Consumer Electronics, vol. 57, No. 2, May 2011, pp. 738-746.
Colt, Sam, "Here's One Way Apple's Smartwatch Could Be Better Than Anything Else", Business Insider, Aug. 21, 2014, pp. 1-4.
Czech, Lucas, "A System for Recognizing Natural Spelling of English Words", Diploma Thesis, Karlsruhe Institute of Technology, May 7, 2014, 107 pages.
Deedeevuu, "Amazon Echo Alarm Feature", Available online at https://www.youtube.com/watch?v=fdjU8eRLk7c, Feb. 16, 2015, 1 page.
Delcroix et al., "Context Adaptive Deep Neural Networks for Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
"DIRECTV™ Voice", Now Part of the DIRECTTV Mobile App for Phones, Sep. 18, 2013, 5 pages.
EARTHLING1984, "Samsung Galaxy Smart Stay Feature Explained", Available online at:- "https://www.youtube.com/watch?v=RpjBNtSjupl", May 29, 2013, 1 page.
Evi, "Meet Evi: The One Mobile Application that Provides Solutions for your Everyday Problems", Feb. 2012, 3 pages.
Exhibit 1, "Natural Language Interlace Using Constrained Intermediate Dictionary of Results", List of Publications Manually Reviewed for the Search of U.S. Pat. No. 7,177,798, Mar. 22, 2013, 1 page.
Filipowicz, Luke, "How to use the Quick Type Keyboard in iOS 8", available online at <https://www.imore.com/comment/568232>, Oct. 11, 2014, pp. 1-17.
Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Finkel et al., "Joint Parsing and Named Entity Recognition", Human Language Technologies: The 2009 Annual Conference of the North American Chapter of the ACL, Jun. 2009, pp. 326-334.
"Galaxy S7: How to Adjust Screen Timeout & Lock Screen Timeout", Available online at:- "https://www.youtube.com/watch?v=n6e1WKUS2ww", Jun. 9, 2016, 1 page.
Gannes, Liz, "Alfred App Gives Personalized Restaurant Recommendations", AllThingsD, Jul. 18, 2011, pp. 1-3.
Gasic et al., "Effective Handling of Dialogue State in the Hidden Information State Pomdp-based Dialogue Manager", ACM Transactions on Speech and Language Processing, May 2011, pp. 1-25.
Gomez et al., "Mouth Gesture and Voice Command Based Robot Command Interface", IEEE International Conference on Robotics and Automation, May 12-17, 2009, pp. 333-338.
Google Developers, "Voice Search in Your App", Available online at:- https://www.youtube.com/watch?v=PS1FbB5qWEI, Nov. 12, 2014, 1 page.
Gruber, Thomas R., et al., U.S. Appl. No. 61/186,414, filed Jun. 12, 2009 titled "System and Method for Semantic Auto-Completion" 13 pages.
Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Siri, a Virtual Personal Assistant—Bringing Intelligence to the Interface", Semantic Technologies Conference, Jun. 16, 2009, 21 pages.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guim, Mark, "How to Set a Person-Based Reminder with Cortana", available at <http://www.wpcentral.com/how-to-person-based-reminder-cortana>, Apr. 26, 2014, 15 pages.
Gupta et al., "I-vector-based Speaker Adaptation of Deep Neural Networks for French Broadcast Audio Transcription", ICASSP, 2014, pp. 6334-6338.
Hardwar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Hashimoto, Yoshiyuki, "Simple Guide for iPhone Siri, Which Can Be Operated with Your Voice", Shuwa System Co., Ltd., vol. 1, Jul. 5, 2012, pp. 8, 130, 131.
Headset Button Controller v7.3 APK Full App Download for Android, Blackberry, iPhone, Jan. 27, 2014, 11 pages.
Hear voice from Google translate, Available on URL:https://www.youtube.com/watch?v=18AvMhFqD28, Jan. 28, 2011, 1 page.
Hershey et al., "Deep Clustering: Discriminative Embeddings for Segmentation and Separation", Proc. ICASSP, Mar. 2016, 6 pages.
"Hey Google: How to Create a Shopping List with Your Google Assistant", Available online at:- https://www.youtube.com/watch?v=w9NCsElax1Y, May 25, 2018, 1 page.
"How to Enable Google Assistant on Galaxy 57 and other Android Phones (No Root)", Available online at:- "https://www.youtube.com/watch?v=HeklQbWyksE", Mar. 20, 2017, 1 page.
"How to Use Ok Google Assistant Even Phone is Locked", Available online at:- "https://www.youtube.com/watch?v=9B_gP4j_SP8", Mar. 12, 2018, 1 page.
IClarified, "How to Use Voice Control on Your iPhone 3GS", Online Available at: <https://www.iclarified.com./4296/how-to-use-voice-control-on-your-iphone-3g-s>, Jun. 19, 2009, 16 pages.
ID3.org, "id3v2.4.0-Frames", available at <http://id3.org/id3v2.4.0-frames?action=print>, retrieved on Jan. 22, 2015, 41 pages.
INews and Tech, "How to Use the QuickType Keyboard in iOS 8", Available online at:- "http://www.inewsandtech.com/how-to-use-the-quicktype-keyboard-in-ios-8/", Sep. 17, 2014, 6 pages.
Interactive Voice, available at <http://www.helloivee.com/company/>, retrieved on Feb. 10, 2014, 2 pages.
Internet Services and Social Net, "How to Search for Similar Websites", Retrieved from <https://www.youtube.com/watch?v=nLf2uirpt5s>see from 0:17 to 1:06, Jul. 4, 2013, 1 page.
IOS 8 Release, "Quick Type Keyboard on iOS 8 Makes Typing Easier", Retrieved from the Internet: URL:https://www.youtube.com/watch?v=0CidLR4fhVU, [Retrieved on Nov. 23, 2018], XP054978896, Jun. 3, 2014, 1 page.
Iowegian International, "FIR Filter Properties, DSPGuru, Digital Signal Processing Central", available at <http://www.dspguru.com/dsp/faq/fir/properties> retrieved on Jul. 28, 2010, 6 pages.
Isik et al., "Single-Channel Multi-Speaker Separation using Deep Clustering", Interspeech 2016, Sep. 8-12, 2016, pp. 545-549.
Jawaid et al., "Machine Translation with Significant Word Reordering and Rich Target-Side Morphology", WDS'11 Proceedings of Contributed Papers, Part I, 2011, pp. 161-166.
Jiang et al., "A Syllable-based Name Transliteration System", Proc. of the 2009 Named Entities Workshop, Aug. 7, 2009, pp. 96-99.
Jonsson et al, "Proximity-based Reminders Using Bluetooth", 2014 IEEE International Conference on Pervasive Computing and Communications Demonstrations, 2014, pp. 151-153.
Jouvet et al., "Evaluating Grapheme-to-phoneme Converters in Automatic Speech Recognition Context", IEEE, 2012, pp. 4821-4824.
Karn, Ujjwal, "An Intuitive Explanation of Convolutional Neural Networks", The Data Science Blog, Aug. 11, 2016, 23 pages.
Kazmucha, Allyson, "How to Send Map Locations Using iMessage", iMore.com, Available at <http://www.imore.com/how-use-imessage-share-your-location-your-iphone>, Aug. 2, 2012, 6 pages.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
King et al., "Robust Speech Recognition Via Anchor Word Representations", Interspeech 2017, Aug. 20-24, 2017, pp. 2471-2475.
Lee, Sungjin, "Structured Discriminative Model for Dialog State Tracking", Proceedings of the SIGDIAL 2013 Conference, Aug. 2013, pp. 442-451.
Lewis, Cameron, "Task Ave for iPhone Review", Mac Life, Available at <http://www.maclife.com/article/reviews/task_ave_iphone_review>, Mar. 3, 2011, 5 pages.
Liou et al., "Autoencoder for Words", Neurocomputing, vol. 139, Sep. 2014, pp. 84-96.

(56) References Cited

OTHER PUBLICATIONS

Luo et al.. "Speaker-Independent Speech Separation With Deep Attractor Network", IEEE/ACm Transactions on Audio, Speech, and Language Processing, vol. 26, No. 4, Apr. 2018, pp. 787-796.
Majerus, Wesley, "Cell Phone Accessibility for your Blind Child", Retrieved from the Internet <URL:https://web.archive.org/web/20100210001100/https://nfb.org/images/nfb/publications/fr/fr28/3/11280314.htm>, 2010, pp. 1-5.
Marketing Land, "Amazon Echo: Play Music", Online Available at: <https://www.youtube.com/watch?v=A7V5NPbsXi4>, Apr. 27, 2015, 3 pages.
Meet Ivee, Your Wi-Fi Voice Activated Assistant, available at <http://www.helloivee.com/>, retrieved on Feb. 10, 2014, 8 pages.
Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.
Mhatre et al,, "Donna Interactive Chat-bot acting as a Personal Assistant", International Journal of Computer Applications (0975-8887), vol. 140, No. 10, Apr. 2016, 6 pages.
Microsoft, "Turn on and Use Magnifier", available at <http://www.microsoft.com/windowsxp/using/accessibility/magnifierturnon.mspx>, retrieved on Jun. 6, 2009.
Mikolov et al., "Linguistic Regularities in Continuous Space Word Representations", Proceedings of NAACL-HLT, Jun. 9-14, 2013, pp. 746-751.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.
Mobile Speech Solutions, Mobile Accessibility, SVOX AG Product Information Sheet, available at <http://www.svox.com/site/bra840604/con782768/mob965831936.aSQ?osLang=1>, Sep. 27, 2012, 1 page.
Morrison, Jonathan, "iPhone 5 Siri Demo", Online Available at <https://www.youtube.com/watch?v=_wHWwG5IhWc>, Sep. 21, 2012, 3 pages.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
Nakamura, Satoshi, "Overcoming the Language Barrier with Speech Translation Technology, Science & Technology Trends", Quarterly Review No. 31, Apr. 2009, pp. 36-49.
Nakazawa et al., "Detection and Labeling of Significant Scenes from TV program based on Twitter Analysis", Proceedings of the 3rd Forum on Data Engineering and Information Management (deim 2011 proceedings), IEICE Data Engineering Technical Group, Available online at: http://db-event.jpn.org/deim2011/proceedings/pdf/f5-6.pdf, Feb. 28, 2011, 10 pages. (Official Copy Only). (See Communication under 37 CFR § 1.98(a) (3)).
Naone, Erica, "TR10: Intelligent Software Assistant", Technology Review, Mar.-Apr. 2009, 2 pages.
Navigli, Roberto, "Word Sense Disambiguation: A Survey", ACM Computing Surveys, vol. 41, No. 2, Feb. 2009, 69 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Ng, Simon, "Google's Task List Now Comes to Iphone", SimonBlog, Available at <http://www.simonblog.com/2009/02/04/googles-task-list-now-comes-to-iphone/>, Feb. 4, 2009, 3 pages.
Nozawa et al., "iPhone 4S Perfect Manual", vol. 1, First Edition, Nov. 11, 2011, 5 pages (Official Copy Only) (See Communication under 37 CFR § 1.98(a) (3)).
Okuno et al,, "System for Japanese Input Method based on the Internet", Technical Report of Information Processing Society of Japan, Natural Language Processing, Japan, information Processing Society of Japan, vol. 2009, No. 36, Mar. 18, 2009, 8 pages (Official Copy Only) (See Communication under 37 CFR § 1.98(a) (3)).
Osxdaily, "Get a List of Siri Commands Directly from Siri", Available at <http://osxdaily.com/2013/02/05/list-siri-cornmands/>, Feb. 5, 2013, 15 pages.
Pan et al., "Natural Language Aided Visual Query Building for Complex Data Access", In proceeding of: Proceedings of the Twenty-Second Conference on Innovative Applications of Artificial Intelligence, XP055114607, Jul. 11. 2010, pp. 1821-1826.
Pathak et al., "Privacy-preserving Speech Processing: Cryptographic and String-matching Frameworks Show Promise", In: IEEE signal processing magazine, retrieved from <http://www.merl.com/publications/docs/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
Pennington et al., "GloVe: Global Vectors for Word Representation", Proceedings of the Conference on Empirical Methods Natural Language Processing (EMNLP), Oct. 25-29, 2014, pp. 1532-1543.
Perlow, Jason, "Alexa Loop Mode With Playlist for Sleep Noise", Online Available at: <https://www.youtube.com/watch?v=nSkSuXziJSg>, Apr. 11, 2016, 3 pages.
Phoenix Solutions, Inc., "Declaration of Christopher Schmandt Regarding the MIT Galaxy System", West Interactive Corp., A Delaware Corporation, Document 40, Jul. 2, 2010, 162 pages.
Powell, Josh, "Now You See Me...Show/Hide Performance", available at http://www.learningjquery.com/2010/05/now-you-see-me-showhide-performance, May 4, 2010, 3 pages.
Qian et al., "Single-channel Multi-talker Speech Recognition With Permutation Invariant Training", Speech Communication, Issue 104, 2018, pp. 1-11.
Rios, Mafe, "New bar search for Facebook", Youtube, available at "https://www.youtube.com/watch?v=vwgN1WbvCas", Jul. 19, 2013, 2 pages.
Routines, "SmartThings Support", Available online at <https://web.archive.org/web/20151207165701/https://support.smartthings.com/hc/en-us/articles/205380034-Routines>, 2015, 2 pages.
Samsung Support, "Create a Qucik Command in Bixby to Launch Custom Settings by at your Command", Retrieved from Internet: https://www.facebook.com/samsungsupport/videos/10154746303151213, Nov. 13, 2017, 1 page.
Samsung, "SGH-a885 Series—Portable Quad-Band Mobile Phone—User Manual", Retrieved from the Internet: URL: "http://web.archive.org/web/20100106113758/http://www.comparecellular.com/images/phones/userguide1896.pdf", Jan. 1, 2009, 144 pages.
Sarawagi, Sunita, "CRF Package Page", available at <http://crf.sourceforge.net/>, retrieved on Apr. 6, 2011, 2 pages.
Seehafer, Brent, "Activate google assistant on Galaxy S7 with screen off", Available online at:- "https://productforums.google.com/forum/#!topic/websearch/lp3qIGBHLVI", Mar. 8, 2017, 4 pages.
Selfrifge et al., "Interact: Tightly-coupling Multimodal Dialog with an Interactive Virtual Assistant", International Conference on Multimodal Interaction, ACM, Nov. 9, 2015, pp. 381-382.
Senior et al., "Improving DNN Speaker Independence With I-Vector Inputs", ICASSP, 2014, pp. 225-229.
Settle et al., "End-to-End Multi-Speaker Speech Recognition", Proc. ICASSP, Apr. 2018, 6 pages.
Simonite, Tom, "One Easy Way to Make Siri Smarter", Technology Review, Oct. 18, 2011, 2 pages.
"SmartThings +Amazon Echo", Smartthings Samsung [online], Available online at <https://web.archive.org/web/20160509231428/https://blog.srnartth ings.com/featured/alexa-turn-on-my-smartthings/>, Aug. 21, 2015, 3 pages.
Smith, Jake, "Amazon Alexa Calling: How to Set it up and Use it on Your Echo", iGeneration, May 30, 2017, 5 pages.
Speaker Recognition, Wikipedia, The Free Enclyclopedia, Nov. 2, 2010, 4 pages.
Spivack, Nova, "Sneak Preview of Siri—Part Two—Technical Foundations—Interview with Tom Gruber, CTO of Siri", Online Available at , <https://web.archive.org/web/20100114234454/http://www.twine.com/item/12vhy39k4-22rn/interview-with-tom-gruber-of-siri>, Jan. 14, 2010, 5 pages.

(56) References Cited

OTHER PUBLICATIONS

SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, 2 pages.
Stent et al., "Geo-Centric Language Models for Local Business Voice Search", AT&T Labs—Research, 2009, pp. 389-396.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Sundaram et al., "Latent Perceptual Mapping with Data-Driven Variable-Length Acoustic Units for Template-Based Speech Recognition", ICASSP 2012, Mar. 2012, pp. 4125-4128.
Sundermeyer et al., "From Feedforward to Recurrent LSTM Neural Networks for Language Modeling", IEEE Transactions to Audio, Speech, and Language Processing, 2015, vol. 23, Mar. 2015, pp. 517-529.
Sundermeyer et al., "LSTM Neural Networks for Language Modeling", INTERSPEECH 2012, ISCA's 13 Annual Conference, Sep. 9-13, 2012, pp. 194-197.
Tan et al., "Knowledge Transfer In Permutation Invariant Training for Single-channel Multi-talker Speech Recognition", ICASSP 2018, 2018, pp. 5714-5718.
Tanaka, Tatsuo, "Next Generation IT Channel Strategy Through "Experience Technology"", Intellectual Resource Creation, Japan, Nomura Research Institute Ltd. vol. 19, No. 1, Dec. 20, 2010, 17 pages. (Official Copy only) (See Communication under 37 CFR § 1.98(a) (3)).
Textndrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.
"The world of Virtual Assistants—more SemTech...", End of Business as Usual—Glenn's External blog, Online Available at <https://web.archive.org/web/20091101840940/http://glennas.wordpress.com/2009/10/17/the-world-of-virtual-assistants-more-semtech/>, Oct. 17, 2009, 5 pages.
Tofel, Kevin C., "SpeakToIt: A Personal Assistant for Older iPhones, iPads", Apple News, Tips and Reviews, Feb. 9, 2012, 7 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Vaswani et al., "Attention Is All You Need", 31st Conference on Neural Information Processing Systems (NIPS 2017), 2017, 11 pages.
Vlingo InCar, "Distracted Driving Solution with Vlingo InCar", YouTube Video, Available online at <http://www.youtube.com/watch?v=Vqs8XfXxgz4>, Oct. 2010, 2 pages.
Vodafone Deutschland, "Samsung Galaxy S3 Tastatur Spracheingabe", Available online at - "https://www.youtube.com/watch?v=6kOd6Gr8uFE", Aug. 22, 2012, 1 page.
Voiceassist, "Send Text, Listen to and Send E-Mail by Voice", YouTube Video, Available online at <http://www.youtube.com/watch?v=0tEU61nHHA4>, Jul. 30, 2009, 1 page.
Voiceonthego, "Voice on the Go (BlackBerry)", YouTube Video, available online at <http://www.youtube.com/watch?v=pJqpWgQS98w>, Jul. 27, 2009, 1 page.
Wang et al., "End-to-end Anchored Speech Recognition", Proc. ICASSP2019, May 12-17, 2019, 5 pages.
Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 4 pages.
Wikipedia, "Siri", Available At: URL: <https:jjen.wikipedia.orgjwjindex.php?title=Siri&oldid>, Nov. 8, 2015, 13 pages.
Wikipedia, "Speech Recognition", available at <http://en.wikipedia.org/wiki/Speech_recognition>, retrieved on Sep. 14, 2011, 12 pages.
Wikipedia, "Virtual Assistant", Wikepedia, Online Available at : <https:jjen.wikipedia.orgjwjindex.php?title=Virtual assistant&oldid=679330666>, Sep. 3, 2015, 4 Pages.
Wikipedia, "Home Automation", Available At: https://en.wikipedia.org/w/index.php?titie=Home automation&oldid, Oct. 19, 2015, 9 pages.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 12 pages.
X.AI, "How it Works", May 2016, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
Xu, Yuhong, "Policy optimization of dialogue management in spoken dialogue system for out-of-domain utterances", 2016 International Conference on Asian Language Processing (IALP), IEEE, Nov. 21, 2016, pp. 10-13.
Yan et al,, "A Scalable Approach to Using DNN-Derived Features in GMM-HMM Based Acoustic Modeling for LVCSR", InInterspeech, 2013, pp. 104-108.
Yates, Michael C., "How can I exit Google Assistant after i'm finished with it", Available online at:- "https://productforums.google.com/forum/#!msg/phone-by-google/faECnR2RJwA/gKNtOkQgAQAJ", Jan. 11, 2016, 2 pages.
Yeh, Jui-Feng, "Speech Act Identification Using Semantic Dependency Graphs With Probabilistic Context-free Grammars", ACM Transactions on Asian and Low-Resource Language Information Processing 15, No. 1, Article 5, Dec. 2015, pp. 5.1-5.28.
Young et al., "The Hidden Information State model: A practical framework for POMDP-based spoken dialogue management", Computer Speech & Language, vol. 24, Issue 2, 2010, pp. 150-174.
Yu et al., "Permutation Invariant Training of Deep Models for Speaker-independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zangerle et al., "Recommending #-Tag in Twitter", Proceedings of the Workshop on Semantic Adaptive Socail Web, 2011, pp. 1-12.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Zhong et al., "JustSpeak: Enabling Universal Voice Control on Android", W4A'14, Proceedings of the 11th Web for All Conference, No. 36, Apr. 7-9, 2014, 8 pages.
Zmolikova et al., "Speaker-aware Neural Network Based Beamformer for Speaker Extraction in Speech Mixtures", Interspeech 2017, Aug. 20-24, 2017, pp. 2655-2659.

* cited by examiner

1000

PROVIDING MESSAGE RESPONSE SUGGESTIONS

FIELD

This application claims priority to U.S. Provisional Patent Application 62/850,771, entitled "PROVIDING MESSAGE RESPONSE SUGGESTIONS," filed on May 21, 2019, which is incorporated herein in its entirety.

This application relates generally to digital assistants and, more specifically, to providing message response suggestions.

BACKGROUND

Intelligent automated assistants, or digital assistants, can provide a beneficial interface between human users and electronic devices. In some instances, digital assistants can provide proactive assistance to users, such as providing relevant information or suggested tasks based on the user's current activity. Certain tasks may be more difficult to perform on specific devices. For example, a user may wish to respond to a message on a small-form device, such as a smart watch. However, conventional systems are inadequate for providing a user with efficient ways to respond to messages when using such devices. For example, these systems are not equipped to handle the large variety of different response types that are applicable to various received messages, much less provide suggested responses in a personalized and logical manner. Accordingly, an improved system for providing message response suggestions is desired.

SUMMARY

Systems and processes for providing response suggestions are provided. In one example process, a textual representation of a message is received. Based on the textual representation of the message, one or more response categories and a predetermined number of suggested inputs corresponding to each of the one of more response categories are obtained. Based on the predetermined number of suggested inputs corresponding to each of the one of more response categories, one or more suggested inputs for each of the one or more response categories are determined. The one or more suggested inputs are provided as response suggestions to the message.

DETAILED DESCRIPTION

Figure 1:
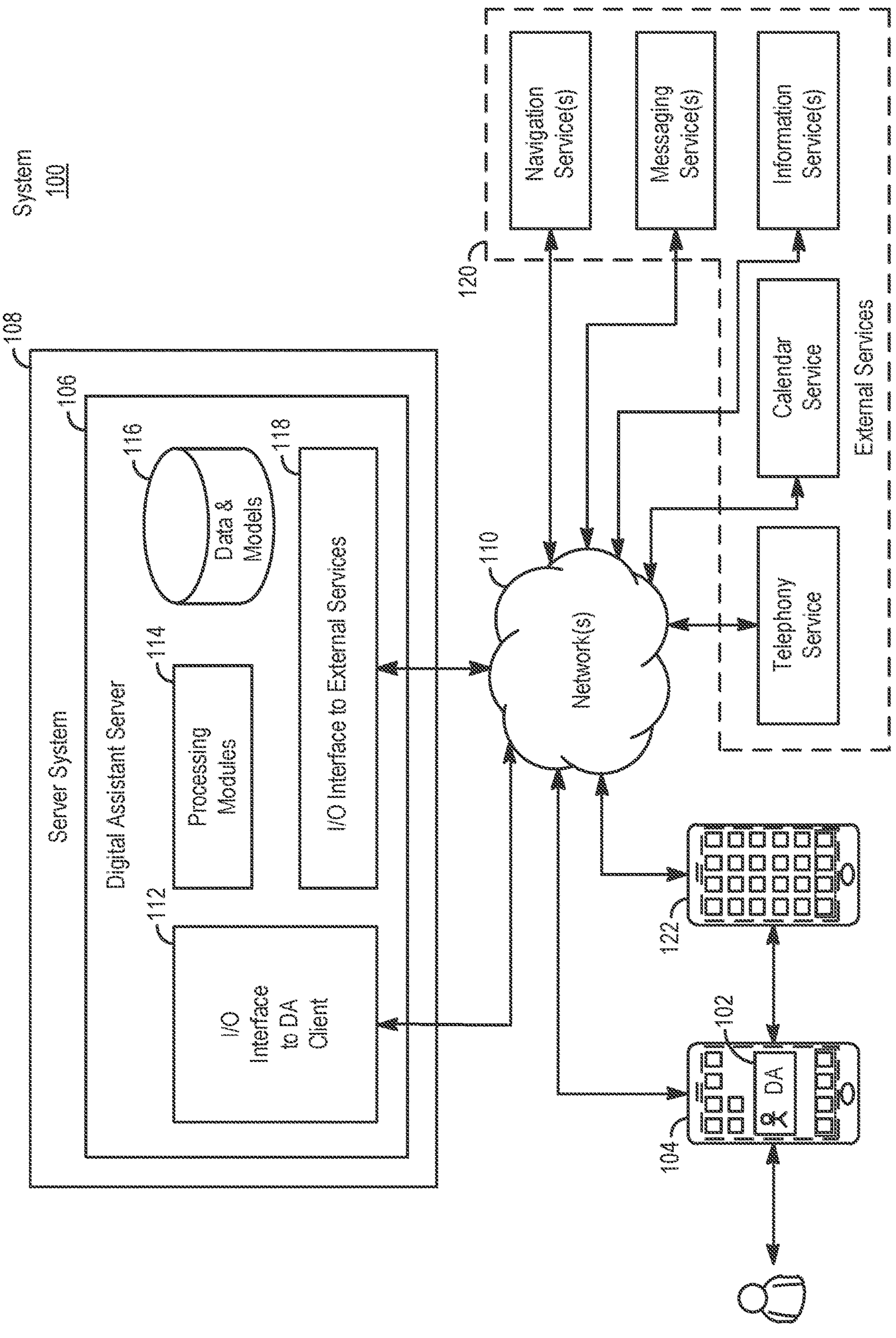
FIG. 1 is a block diagram illustrating a system and environment for implementing a digital assistant, according to various examples.

In the following description of examples, reference is made to the accompanying drawings in which are shown by way of illustration specific examples that can be practiced. It is to be understood that other examples can be used and structural changes can be made without departing from the scope of the various examples.

Conventional systems for providing response suggestions are generally lacking in effectiveness. For instance, these systems do not provide users with message response suggestions in an efficient and ordered manner. Specifically, such systems lack the functionality to both provide users with relevant response types based on global trends, while at the same time personalizing suggested inputs associated with the response types. For example, certain systems may only provide one response suggestion to a user, which results in a poor user experience when the suggestion is irrelevant or needs modification. Furthermore, such suggestions are typically not personalized, much less prioritized and ordered based on specific constraints.

In accordance with some systems, computer-readable media, and processes described herein, improvements in providing message response suggestions are achieved. In one example process, a textual representation of a message is received. Based on the textual representation of the message, one or more response categories and a predetermined number of suggested inputs corresponding to each of the one of more response categories are obtained. Based on the predetermined number of suggested inputs corresponding to each of the one of more response categories, one or more suggested inputs for each of the one or more response categories are determined. The one or more suggested inputs are provided as response suggestions to the message.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting.

As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIGS. 6A-B.) A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, Calif. Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
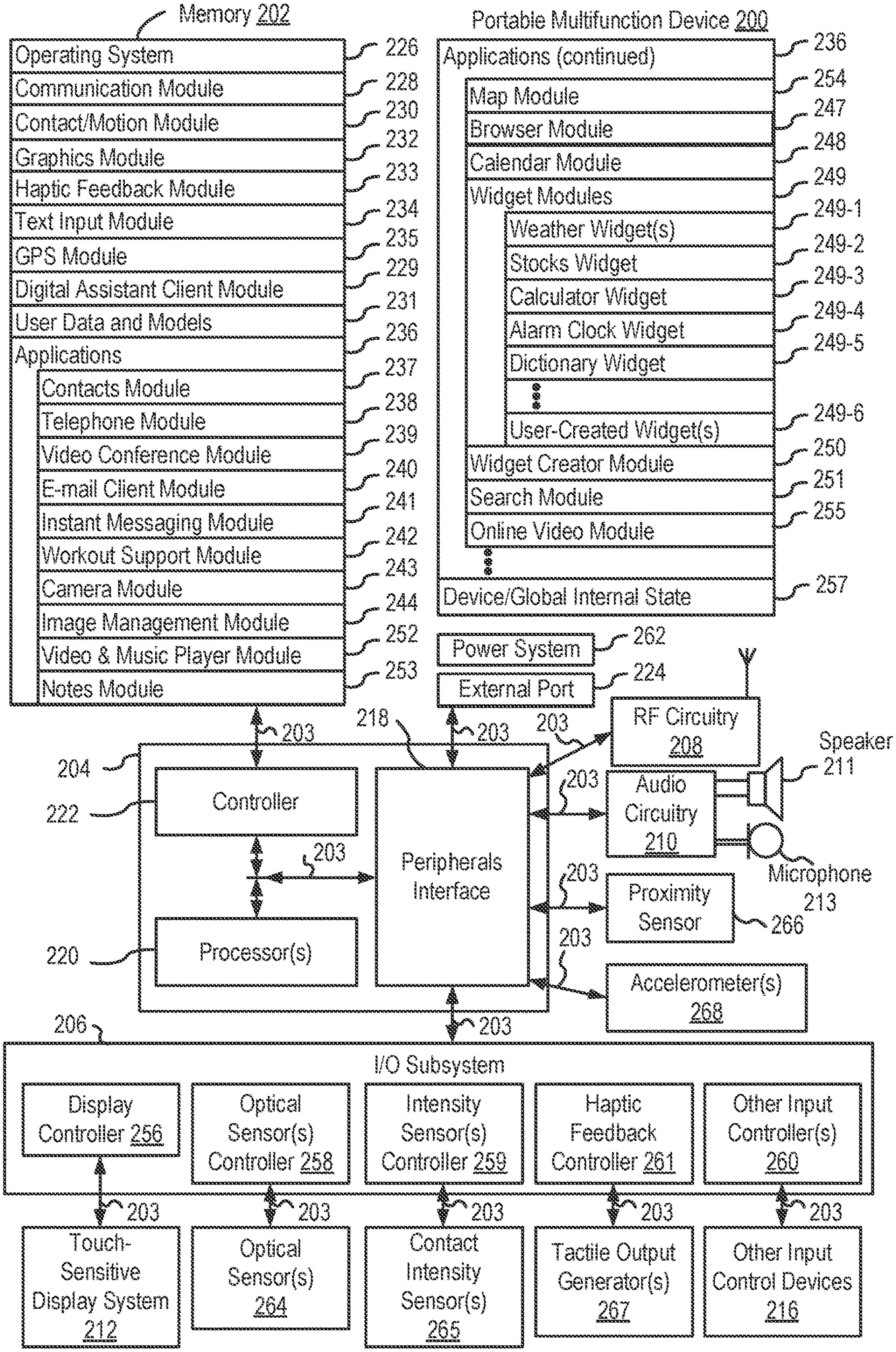
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
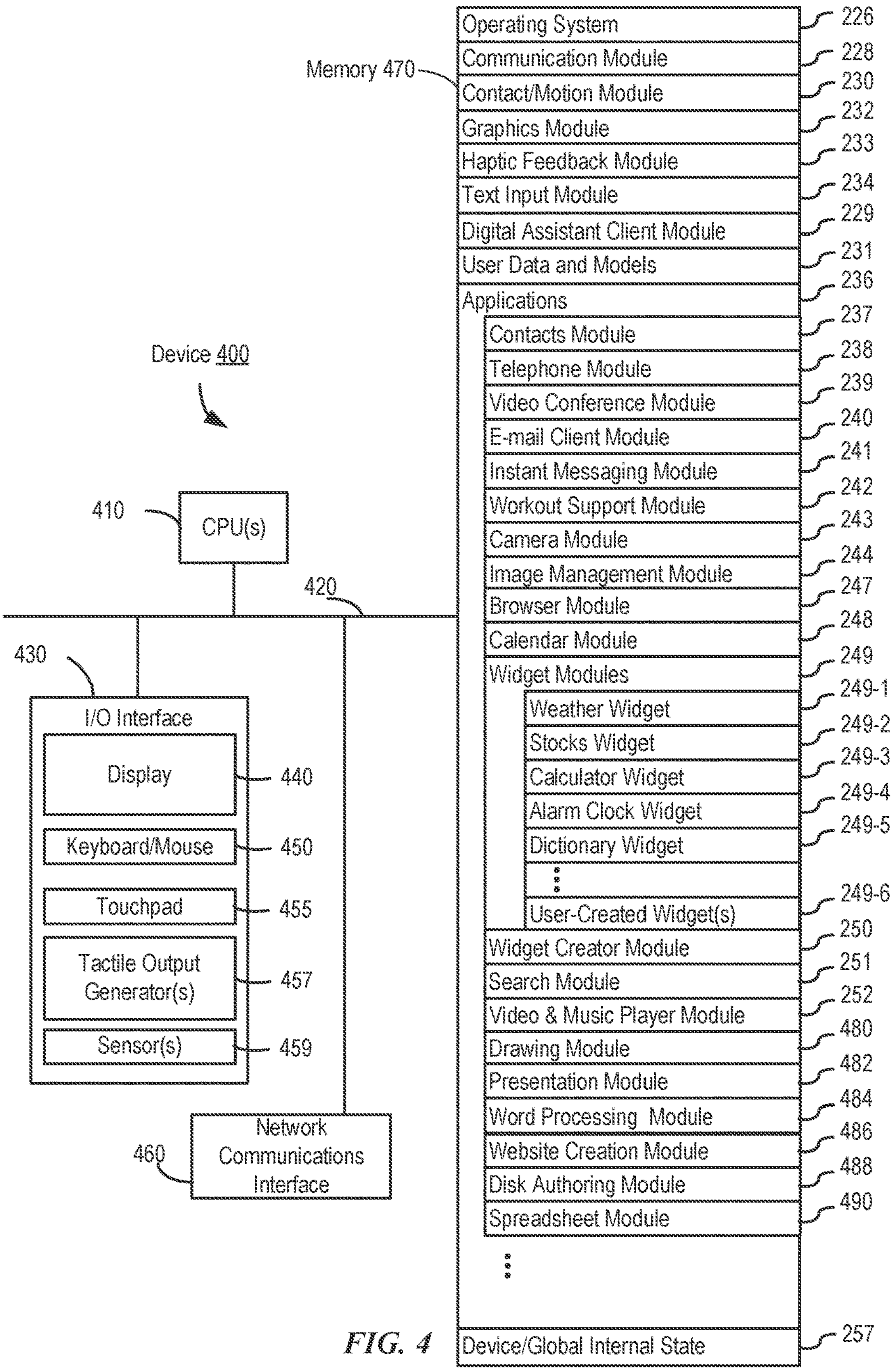
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 include the following modules (or sets of instructions), or a subset or superset thereof:

- Contacts module 237 (sometimes called an address book or contact list);
- Telephone module 238;
- Video conference module 239;
- E-mail client module 240;
- Instant messaging (IM) module 241;
- Workout support module 242;
- Camera module 243 for still and/or video images;
- Image management module 244;
- Video player module;
- Music player module;
- Browser module 247;
- Calendar module 248;
- Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
- Widget creator module 250 for making user-created widgets 249-6;
- Search module 251;
- Video and music player module 252, which merges video player module and music player module;
- Notes module 253;
- Map module 254; and/or
- Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
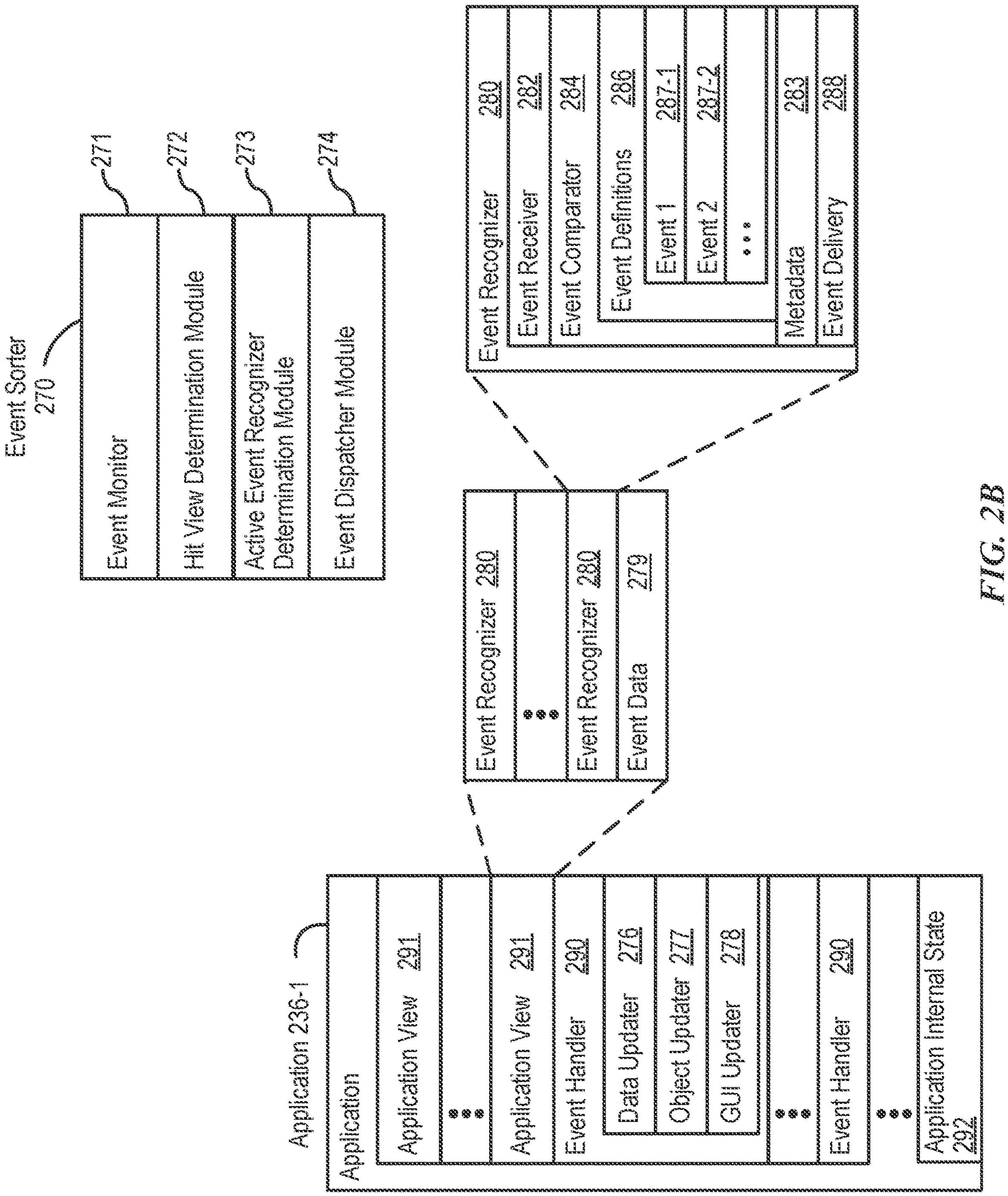
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
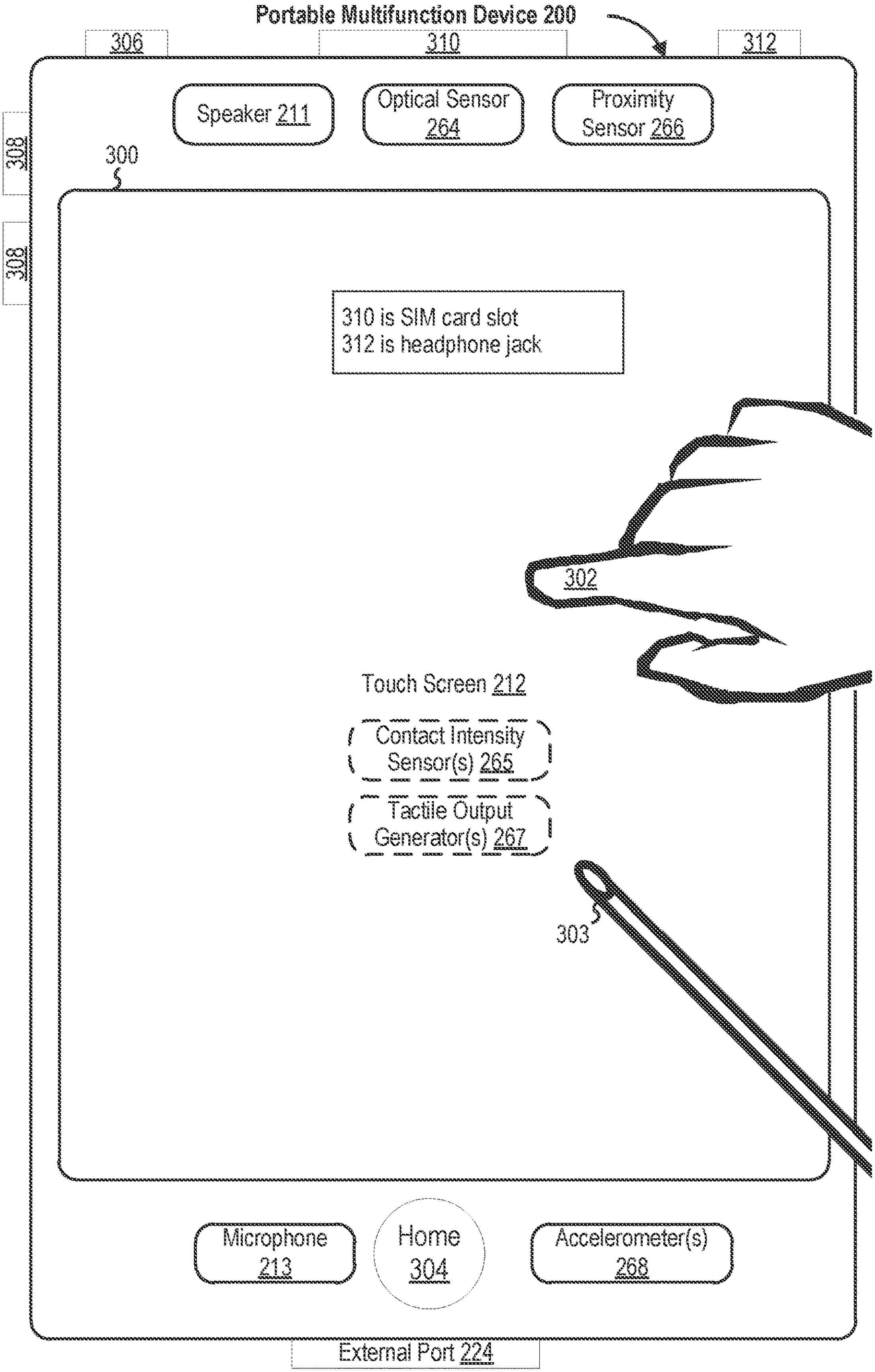
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
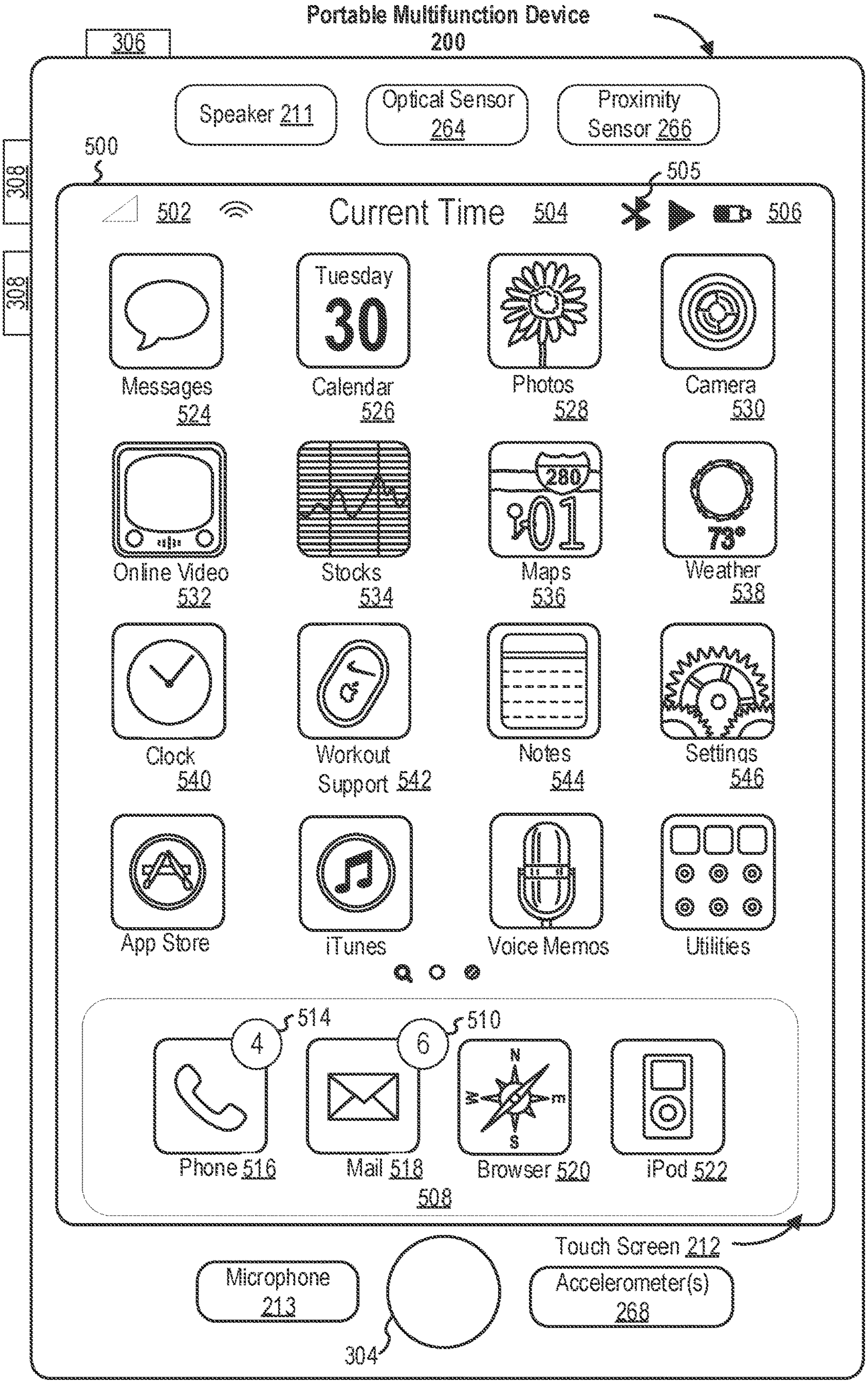
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

- Signal strength indicator(s) 502 for wireless communication(s), such as cellular and Wi-Fi signals;
- Time 504;
- Bluetooth indicator 505;
- Battery status indicator 506;
- Tray 508 with icons for frequently used applications, such as:
  - Icon 516 for telephone module 238, labeled "Phone," which optionally includes an indicator 514 of the number of missed calls or voicemail messages;
  - Icon 518 for e-mail client module 240, labeled "Mail," which optionally includes an indicator 510 of the number of unread e-mails;
  - Icon 520 for browser module 247, labeled "Browser;" and
  - Icon 522 for video and music player module 252, also referred to as iPod (trademark of Apple Inc.) module 252, labeled "iPod;" and
- Icons for other applications, such as:
  - Icon 524 for IM module 241, labeled "Messages;"
  - Icon 526 for calendar module 248, labeled "Calendar;"
  - Icon 528 for image management module 244, labeled "Photos;"
  - Icon 530 for camera module 243, labeled "Camera;"
  - Icon 532 for online video module 255, labeled "Online Video;"
  - Icon 534 for stocks widget 249-2, labeled "Stocks;"
  - Icon 536 for map module 254, labeled "Maps;"
  - Icon 538 for weather widget 249-1, labeled "Weather;"
  - Icon 540 for alarm clock widget 249-4, labeled "Clock;"
  - Icon 542 for workout support module 242, labeled "Workout Support;"

Icon 544 for notes module 253, labeled "Notes;" and

Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
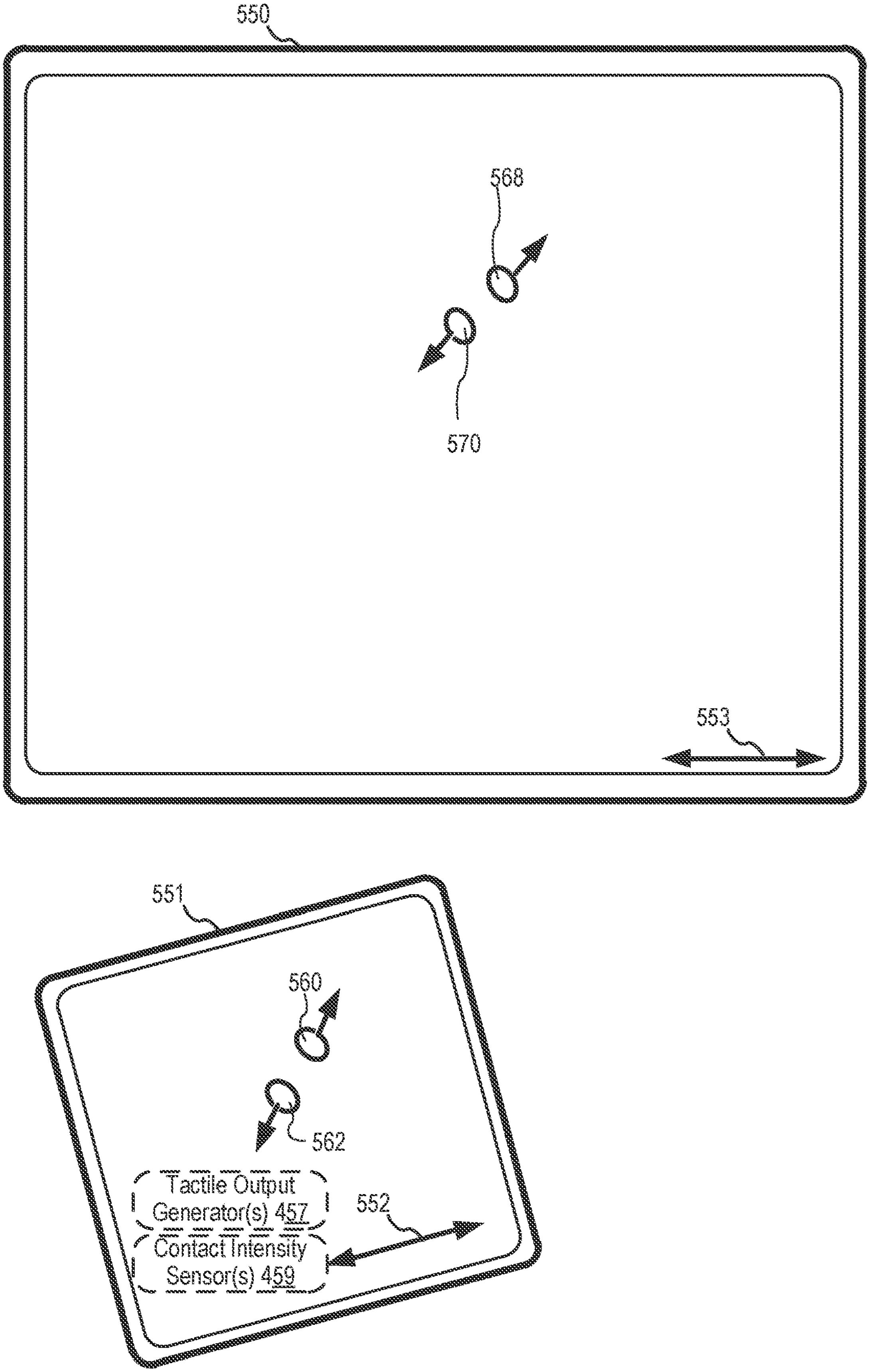
FIG. 5B illustrates an exemplary user interface for a multifunction device with a touch-sensitive surface that is separate from the display, according to various examples.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
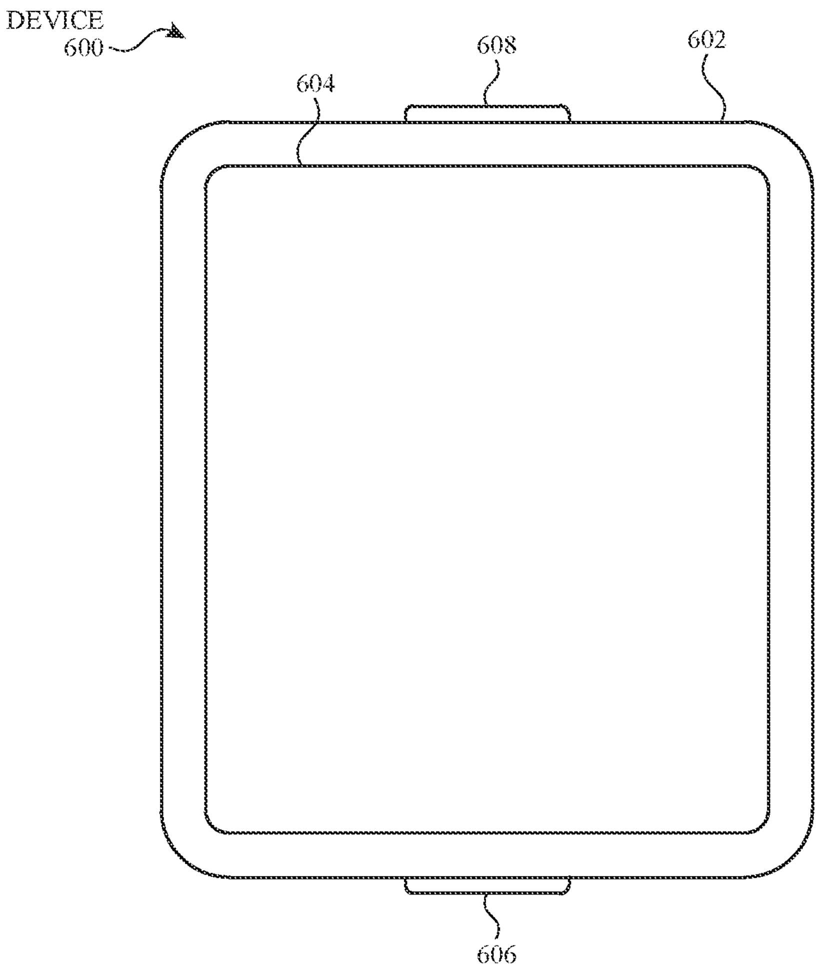
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
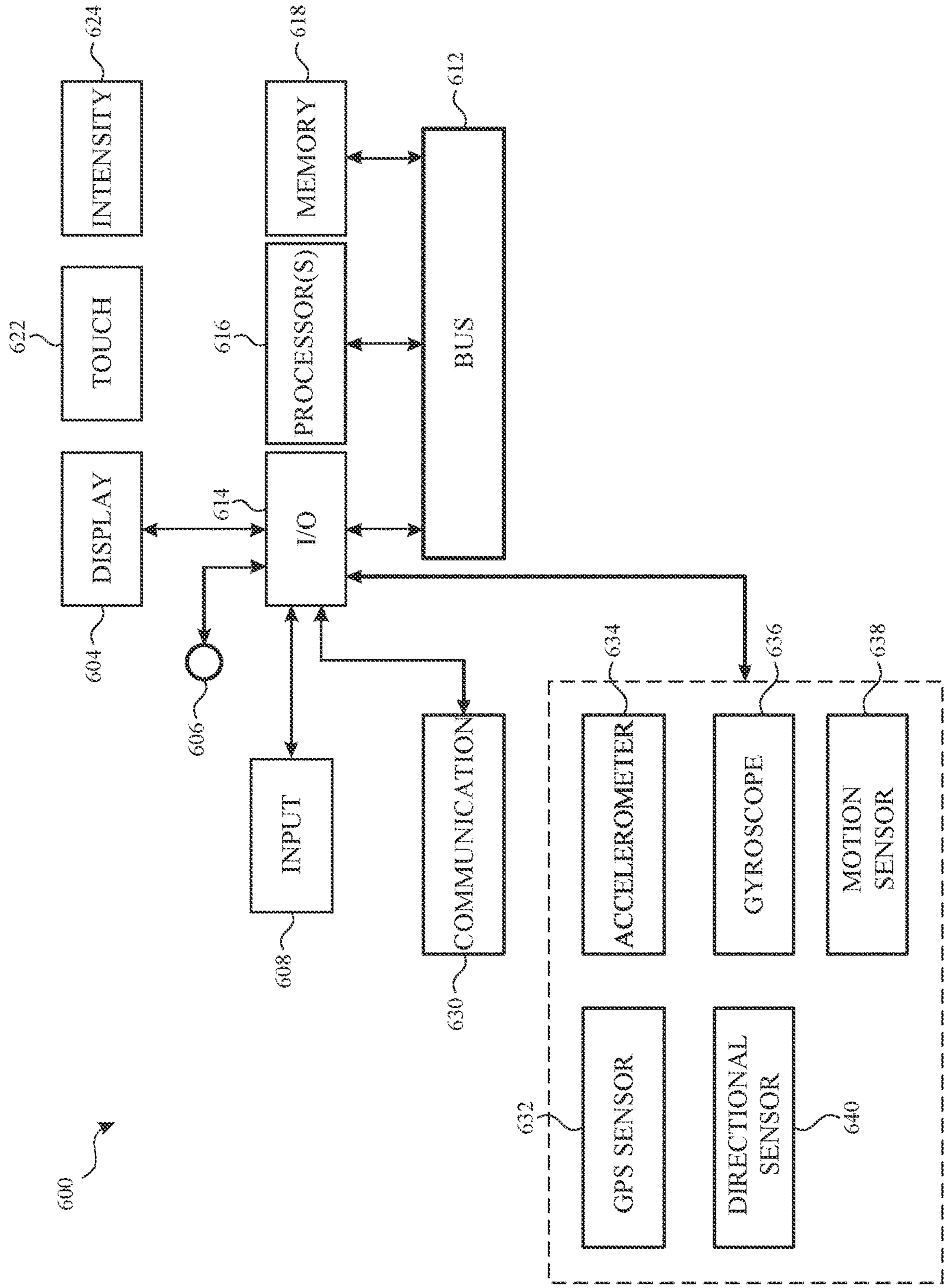
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, and/or 600 (FIGS. 2A, 4, and 6A-B). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a “light press” input. An increase of characteristic intensity of the contact from an intensity below the deep press intensity threshold to an intensity above the deep press intensity threshold is sometimes referred to as a “deep press” input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a “down stroke” of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an “up stroke” of the respective press input).

In some embodiments, the device employs intensity hysteresis to avoid accidental inputs sometimes termed “jitter,” where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an “up stroke” of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
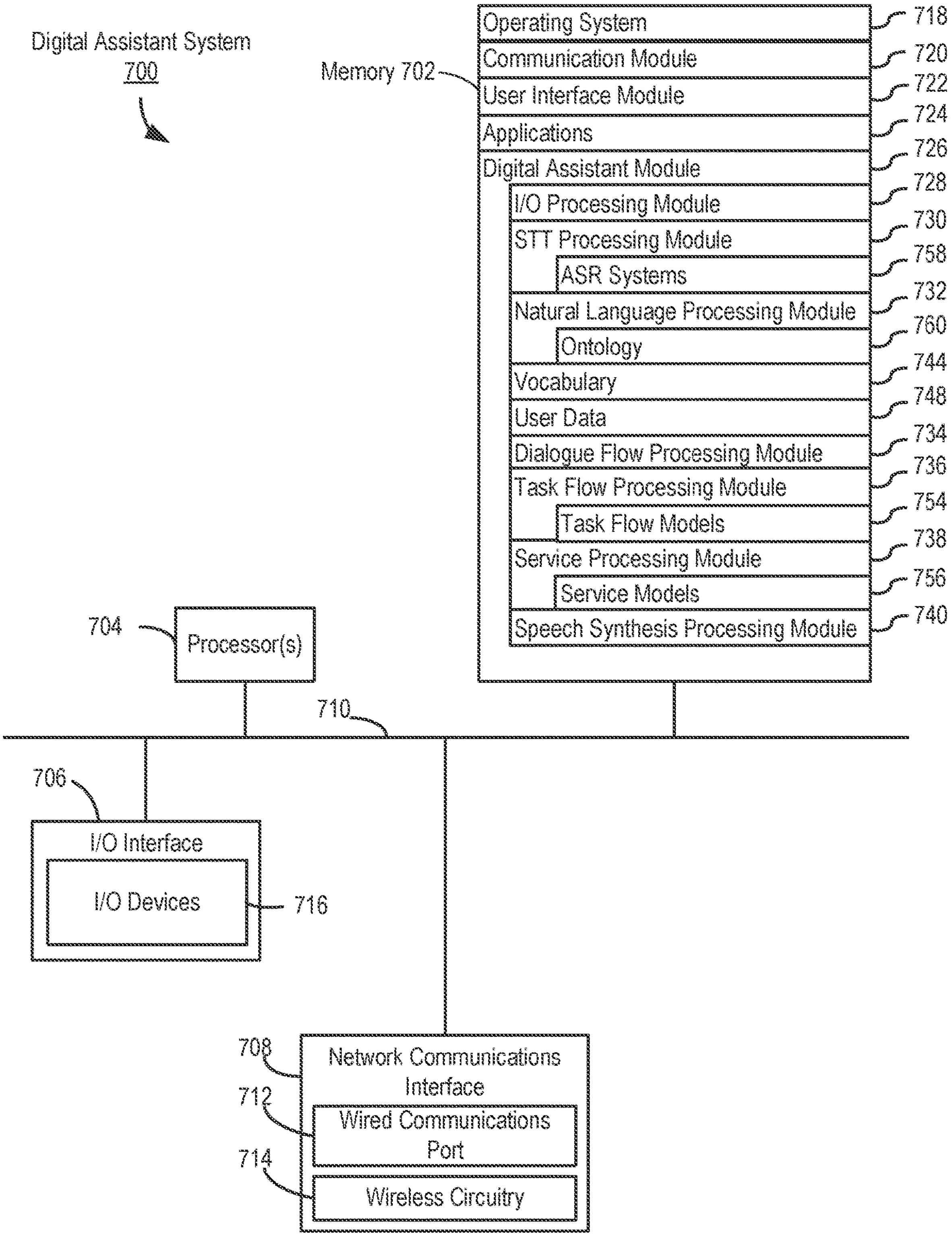
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, or 600 in FIGS. 2A, 4, 6A-B, respectively. In some examples, digital assistant system 700 represents the server portion of a digital assistant implementation, and can interact with the user through a client-side portion residing on a user device (e.g., devices 104, 200, 400, or 600).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4, 6A-B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
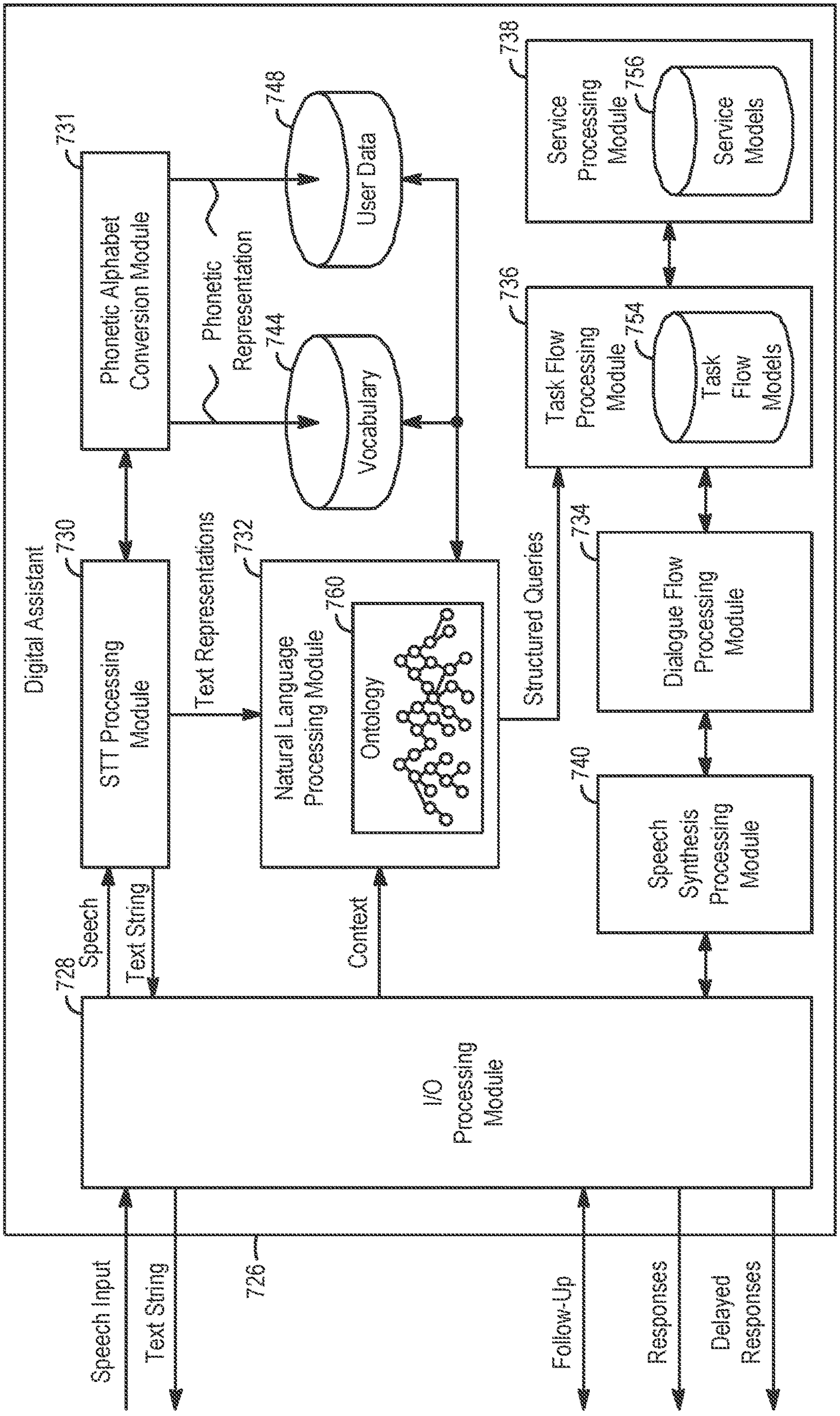
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /tə'meɪroʊ/ and /ttə'mɑtoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /tə'meɪroʊ/ is ranked higher than /tə'mɑtoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /tə'meɪroʊ/ is associated with the United States, whereas the candidate pronunciation /tə'mɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪroʊ/ (associated with the United States) is ranked higher than the candidate pronunciation /tə'mɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /tə'meɪroʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /tə'meɪroʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
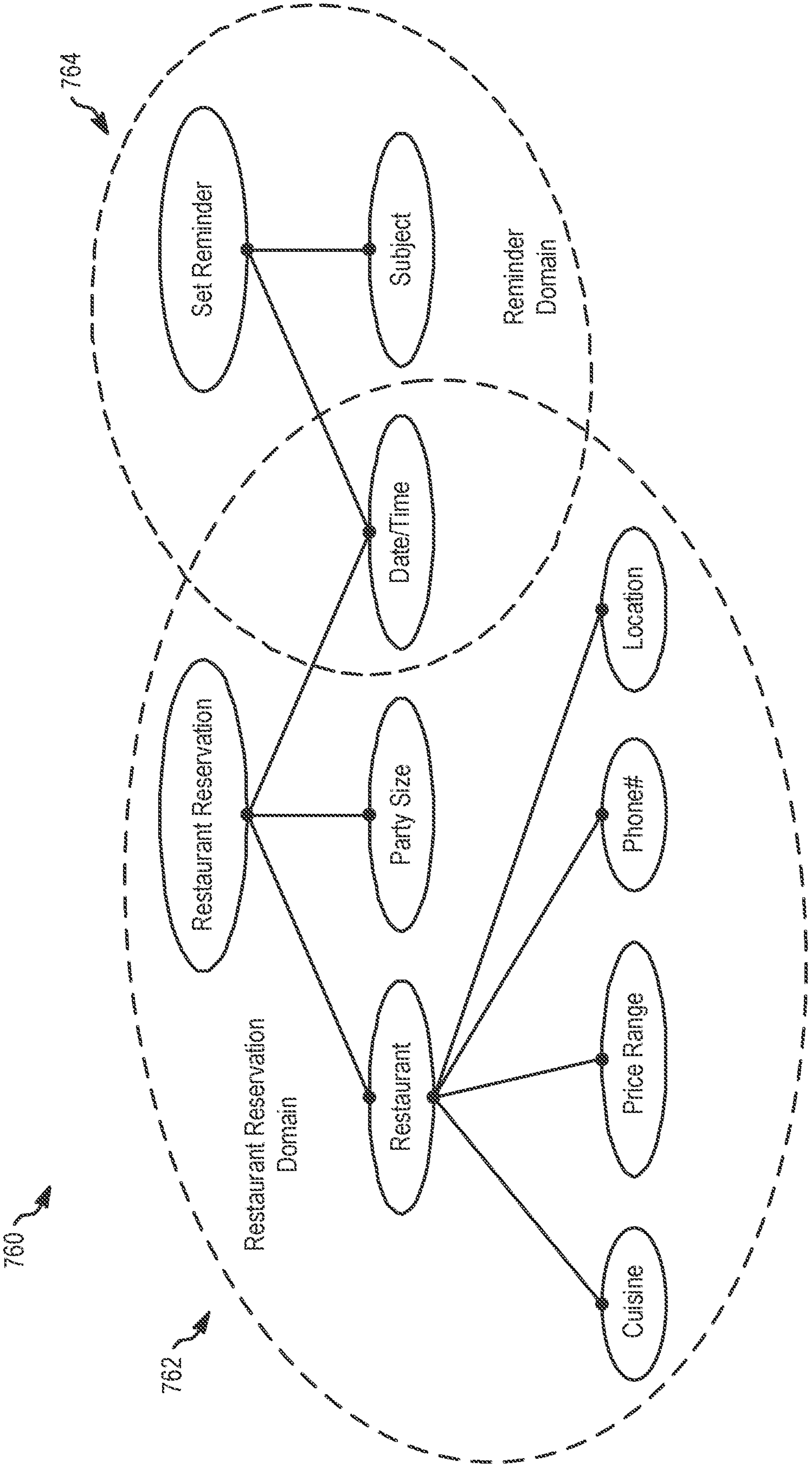
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Providing Message Response Suggestions

Figure 8A:
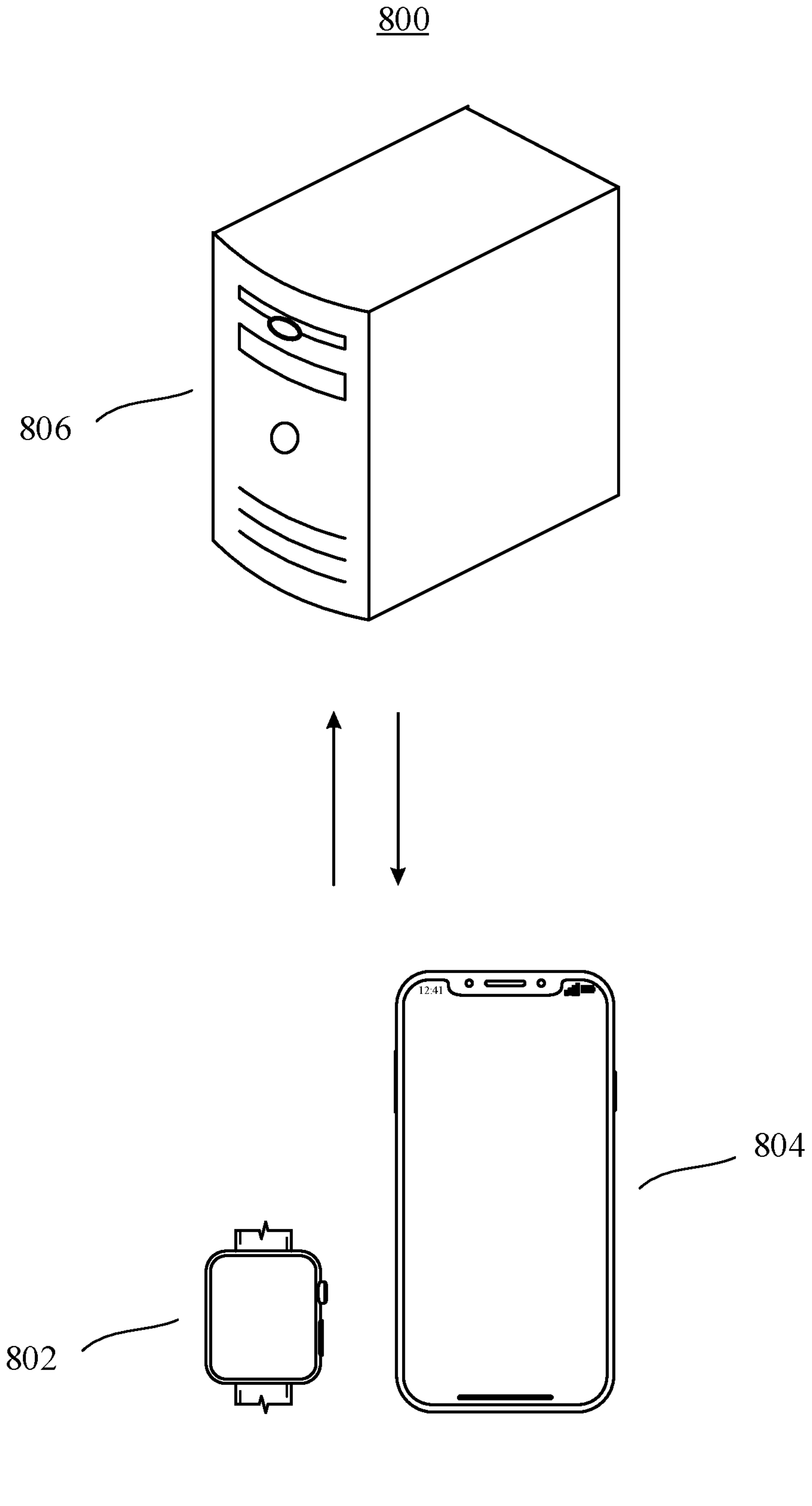
FIGS. 8A-8D illustrate a system for providing message response suggestions, according to various examples.

FIGS. 8A-8D illustrate a system 800 for providing message response suggestions. For example, as shown in FIG. 8A, system 800 may include any device described herein, including but not limited to devices 104, 200, 400, and 600 (FIGS. 1, 2A, 4, and 6A-B). Thus, it will be appreciated that the electronic devices depicted in FIGS. 8A-8D, may be devices of any type, such as a phone, laptop computer, desktop computer, tablet, wearable device (e.g., smart watch), or any combination or subcombination thereof. Furthermore, the processes described herein may be performed by a server with information delivered to and from the device, performed on the device, or a combination thereof.

FIG. 8A illustrates a system 800 for providing message response suggestions. In some examples, system 800 includes electronic device 802, such as a smart watch. Electronic device 802 may, for example, be associated with a user. In some examples, system 800 includes one or more additional electronic devices, such as a phone. In some examples, the additional devices may include a tablet computer, laptop computer, a desktop computer, and the like. Electronic devices 802-804 may be capable of communicating with one or more servers, such as server 806, for example.

In operation, a textual representation of a message is received at an electronic device. In some examples, the message may be displayed within a messaging application on the electronic device, such as an instant messaging application. In some examples, the messaging application may correspond to an e-mail application, a social media application, a third party messaging application, or any other application for sending and receiving messages. In some examples, other representations of a message are received. For example, an ideogram may be received, such as a "Smiley face" emoji or a "thumbs up" emoji. In some examples, a hyperlink is received, such as a link to a website or a link compatible with a third party application. In some examples, a data file is received, such as a video file, a music file, or a file compatible with a third party application (e.g., a contact file compatible with a contacts application).

In some examples, device 802 may communicate with other devices using a cellular connection. For example, device 802 may send and receive messages from other users and communicate with one or more servers via the cellular connection. In some examples, device 802 may communicate with other devices via connection to a secondary device, such as a phone. For example, device 804 may correspond to a smart phone, such that messages may be sent from and received at device 804 using a cellular or a WiFi connection. Device 802 may, for example, be configured to send messages via device 804, and obtain the messages received at device 804.

Figure 8B:
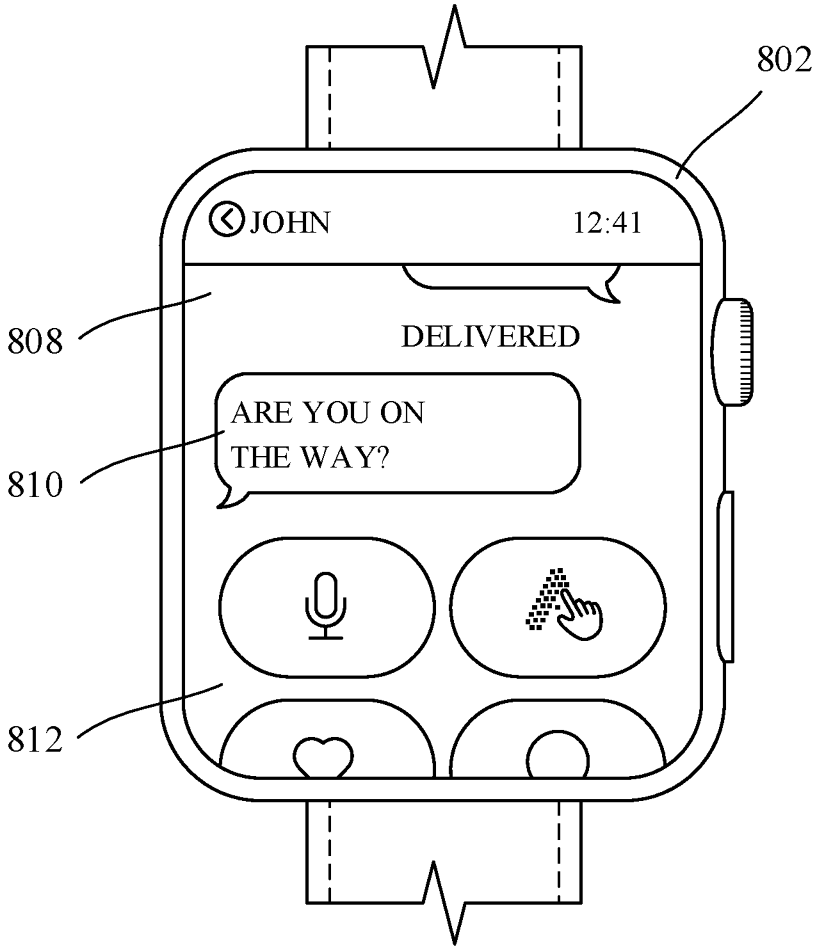

Referring now to FIG. 8B, a device 802 is depicted, including a display screen 808 displaying a messaging application, for example. In some examples, device 802 corresponds to a smart watch device. In some examples, the messaging application may facilitate the display of one or more received messages, such as received message 810. In some examples, the user may respond to received message 810 using various response techniques directed to small-form devices, such as a smart watch. The user may utilize one or more response functions 812 displayed proximate to received message 810, such as a dictation function, a free-form character entry function, or an emoji function, for example.

In some examples, an electronic device obtains, based on the textual representation of the message, one or more response categories and a predetermined number of suggested inputs corresponding to each of the one of more response categories. Referring back to FIG. 8A, for example, user device 802 may communicate with server 806 to obtain, from server 806, response categories and a predetermined number of suggested inputs corresponding to the response categories. In some examples, response categories may correspond to types of responses that are appropriate for responding to a message, such as received message 810 depicted in FIG. 8B. In some examples, the response categories may include an affirmative response category, associated with responses such as "Yes," "Yeah," "Sure," "OK," "Sounds good," and the like. In some examples, the response categories may include a negative response category, associated with responses such as "No," "Nope," "No way," "Nah," and the like. In some examples, the response categories may include a tentative response category, associated with responses such as "Hold on," "I don't know," "Maybe," and the like. In some examples, the response categories may include a gratuitous response category, associated with responses such as "Thank you," "Thanks," "Thx," and the like. In some examples, the response categories may include gratuitous-reply response category, associated with responses such as "You're welcome," "No problem," "Any time," and the like. In some examples, the response categories may include a optimistic response category, associated with responses such as "Good," "Great," "Excellent," and the like. In some examples, the response categories may include a pessimistic response category, associated with responses such as "Bad," "Terrible," "Awful," and the like.

In some examples, the information including response categories and a predetermined number of suggested inputs corresponding to the response categories may be received from server 806 periodically. For example, the information may be received on a daily, weekly, monthly, or other periodic basis. The information may, for example, be received concurrently with other information, such as device software upgrades. The information may, for example, be received during periods when the device is idle and connected to a power source, such as while the device is charging overnight. In some examples, the user may interact with one or more settings on the device in order to control if and when the information is received at the device.

In some examples, the obtained response categories may be based on information from a global user model. In some examples, the one or more response categories may be based on information associated with a plurality of users, including information corresponding to selected response categories, suggested inputs for each selected response category, and suggested inputs selected by the plurality of users. For example, in response to the received message "How are you?", the global user model may indicate that a set of users generally respond to "How are you?" with an optimistic response type 60% of the time, a pessimistic response type 20% of the time, a tentative response type 10% of the time, and a different response type 10% of the time. As another example, in response to the received message "Are you on the way?", the global user model may indicate that a set of users generally respond to "Are you on the way?" with an affirmative response type 60% of the time, a negative response type 35% of the time, and a tentative response type 4% of the time, and a different response type 1% of the time. In some examples, the global user model is based on multiple sets of users, such as sets of users based on region, custom, language, device type, demographic information, or other identifying information. In some examples, the global user model is anonymized such that user privacy is maintained and individual users cannot be identified on the basis of the global user model.

In some examples, the predetermined number of suggested inputs corresponding to the response categories may correspond to a number of response suggestions, per response category, that should be displayed to the user. In some examples, the predetermined number of suggested inputs may be dependent on a device type. In some examples, different devices may include different settings regarding displaying response suggestions for a received message. In some examples, a messaging application on a smart watch device may be configured to display a larger number of response suggestions than other devices, such as twenty response suggestions for a received message. In some examples, a messaging application on a phone or a laptop computer may be configured to display a smaller number of response suggestions than other devices, such as three suggestions per received message.

In some examples, the predetermined number of suggested inputs corresponding to the response categories may be proportional to usage information retained in one or more user models, such as a global user model. For example, a user model may indicate that a message is typically responded to with an affirmative response type 60% of the time, a negative response type 35% of the time, and a tentative response type 4% of the time, and a different response type 1% of the time. In this example, the predetermined number of suggested inputs for each response category may be proportional to the usage information. For example, if an electronic device is configured to display 20 response suggestions, then the predetermined number of suggested inputs corresponding to the affirmative response category may correspond to 60% of the response suggestions, or 12 suggested inputs. The predetermined number of suggested inputs corresponding to the negative response category, for example, may correspond to 35% of the response suggestions, or 7 suggested inputs, and so on.

In some examples, the device may receive a first set of categories and suggested inputs, the first set including first response categories and a first predetermined number of suggested inputs corresponding to each of the first response categories, wherein the first set corresponds to a first user set of a plurality of user sets. For example, the response categories and predetermined numbers of suggested inputs may be adjusted such that the response categories and predetermined numbers of suggested inputs vary among different users. For example, first base model may be deployed to a first set of users, including a first set of response categories and a corresponding first set of predetermined suggested inputs. A second base model may be deployed to a different set of users, including a different set of response categories and a corresponding different set of predetermined suggested inputs, for example. For example, the first base model may be based on a first user set from a first region and based on specific demographics and response trends, whereas the second base model may be based on second user set from a different region having different demographics and response trends than the first user set.

In some examples, the device may receive a second textual representation of a second message, and may further obtain a second set based on the second textual representation of the second message. For example, the second set may include different response categories and potentially different predetermined numbers of suggested inputs corresponding to each of the response categories than the first set. The second set may correspond to a second user set of the plurality of user sets, for example. In some examples, deploying different base models to different user sets, or to the same user at different times, may cause variation between the types of response suggestions obtained by the user devices. For example, the first base model may generally favor affirmative responses over negative responses as compared to the second base model. As an example, in response to the message "Are you on the way?", the first base model may cause 75% of the suggested inputs to be affirmative and 25% of the suggested inputs to be negative. In this example, the second base model may cause 60% of the suggested inputs to be affirmative and 40% of the suggested inputs to be negative. As another example, the first base model may generally be weighted towards a larger number of response categories per response as compared to the second base model. As a result, in this example, the first base model may generally be weighted towards a lesser predetermined number of suggested inputs per response category, as compared to the second base model. For example, in response to the message "How are you doing?", the first base model may cause three categories to be included in the response suggestions, such as positive responses with 50% of the suggested inputs in the positive category, negative responses with 25% of the suggested inputs in the negative category, and tentative responses with 25% of the suggested inputs in the tentative category. In this example, the second may model may cause only two categories to be included in the response suggestions in response to the message "How are you doing?", such as positive responses with 50% of the suggested inputs in the positive category, and negative responses with 50% of the suggested inputs in the negative category.

In some examples, response categories and the predetermined numbers of suggested inputs associated with the response categories are modified by one or more users, such as developer, administrators, and the like. For example, after observing general response trends associated with a first user model, a second user model may be created with substantially similar response categories and associated predetermined numbers of suggested inputs based on various message types. In some examples, the response categories and associated predetermined numbers of suggested inputs corresponding to the first user model may be kept constant over time, while the response categories and associated predetermined numbers of suggested inputs corresponding to second user model may be adjusted in order to observe and track results between user sets. For example, providing more response types in the first user model than the second user model may result in different response suggestions being utilized by various users. As a result, for example, changes, patterns, or other differences between the user models may be analyzed in order to optimize and refine response suggestions across user sets.

In some examples, in response to a determination that the textual representation of the message is associated with a response category having a score higher than a predetermined threshold score, the response category is the only response category obtained. For example, a user model may indicate that a specific message (e.g., "Hello') is typically responded to with a salutation response type 95% of the time, a tentative response type 4% of the time, and a different response type 1% of the time. A score associated with the response category may be proportional to one or more factors, such as the typical response rate of the user model. For example, the salutation response category may have a score of 95, the tentative response category may have a score of 4, and the different response category may have a score of 1. In this example, the predetermined threshold score may be set to 90, such that any response category exceeding a score of 90 will be set as the only response category returned for a given message.

In some examples, the electronic device may determine, based on the predetermined number of suggested inputs corresponding to each of the one of more response categories, one or more suggested inputs for each of the one or more response categories. For example, the electronic device may determine suggested inputs based on context information corresponding to message response history. In some examples, the context information, such as context information corresponding to the message response history includes user location information. For example, the context information may indicate that, for the affirmative response category, a user typically responds with a specific response when in transit, such as "Talk later," such that the suggested input "Talk later" is provided as a suggested input in response to a message received while the user is in transit. In some examples, the context information corresponding to the message response history includes a received message type. For example, the context information may indicate that, in response to receiving a media item from another user such as a picture or video, the user typically responds with a "thumbs up" emoji, such that the "thumbs up" emoji is provided as a suggested input in response to a picture or video. In some examples, the context information corresponding to the message response history includes a device type. For example, the context information may indicate that, when using a gratuitous response on a phone, the user typically enters a custom response, whereas when using a gratuitous response on a smart watch, the user typically responds with "Thanks!", such that "Thanks!" is provided as a suggested input when using a gratuitous response on a smart watch.

In some examples, the context information may include motion state of the user device, e.g., indicating the user is walking, running, driving, exercising, and so on. Other context information may include calendar or locational information, e.g., indicating that a user is at work, home, library, movie theatre, meeting, and the like. These and various other context sources may be used to indicate an abbreviated response may be desired or more likely by a user.

In some examples, the context information corresponding to the message response history includes a message application type. For example, the context information may indicate that, when responding to a message using a professional social networking application, the user typically selects suggested inputs without exclamations (e.g., "Hello."), whereas when responding to a message using other social networking applications, the user typically selects suggested inputs with exclamations (e.g., "Hello!"). In this example, suggested inputs without exclamations may be provided when using professional social networking applications, and suggested inputs with exclamations may be provided when using other social networking applications, for example. In some examples, the context information corresponding to the message response history includes a message sender identifier. For example, the context information may indicate that, when responding to a message from a contact named "Bob," the user typically selects suggested inputs of a casual nature (e.g., "Yeah," "Nope," "Cool," etc.), whereas when responding to a message from a contact named "Dr. Brown," the user typically selects suggested inputs of a more professional nature and ending in periods, for example (e.g., "Yes.", "Be there soon.", etc.). In this example, the suggested inputs of a casual nature are provided when exchanging messages with the contact named "Bob," and suggested inputs of a professional nature are provided when exchanging messages with the contact named "Dr. Brown." In some examples, the context information includes other information such as languages used, user preferences, timestamps corresponding to responses, and the like.

In some examples, the suggested inputs include a variety of different suggestion types. For example, the suggested inputs may include a textual input, such as "Yeah." In some examples, the suggested inputs may include an ideogram, such as an emoji. For example, the positive response category may be associated with a "thumbs up" emoji, a "smiley face" emoji, a "star" emoji, and the like, whereas the negative response category may be associated with a "thumbs down" emoji or an "angry face" emoji. In some examples, the suggested inputs may include a data file, such as a contact information file compatible with a contacts application, an event file such as a ticket for a sporting or concert event, or a picture or video file. In some examples, the suggested inputs may include a link, such as a hyperlink associated with a web address, or a link compatible with a third party application.

Figure 8C:
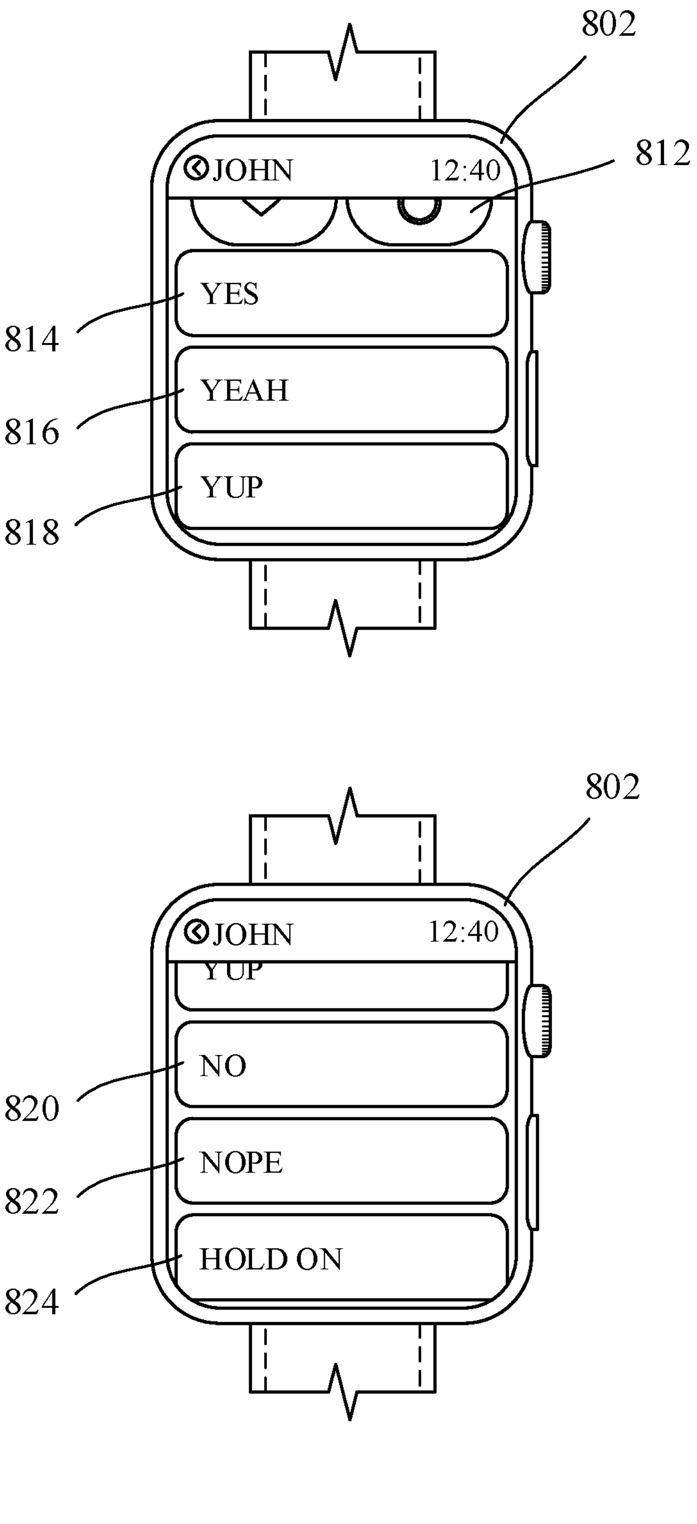
Figure 8D:
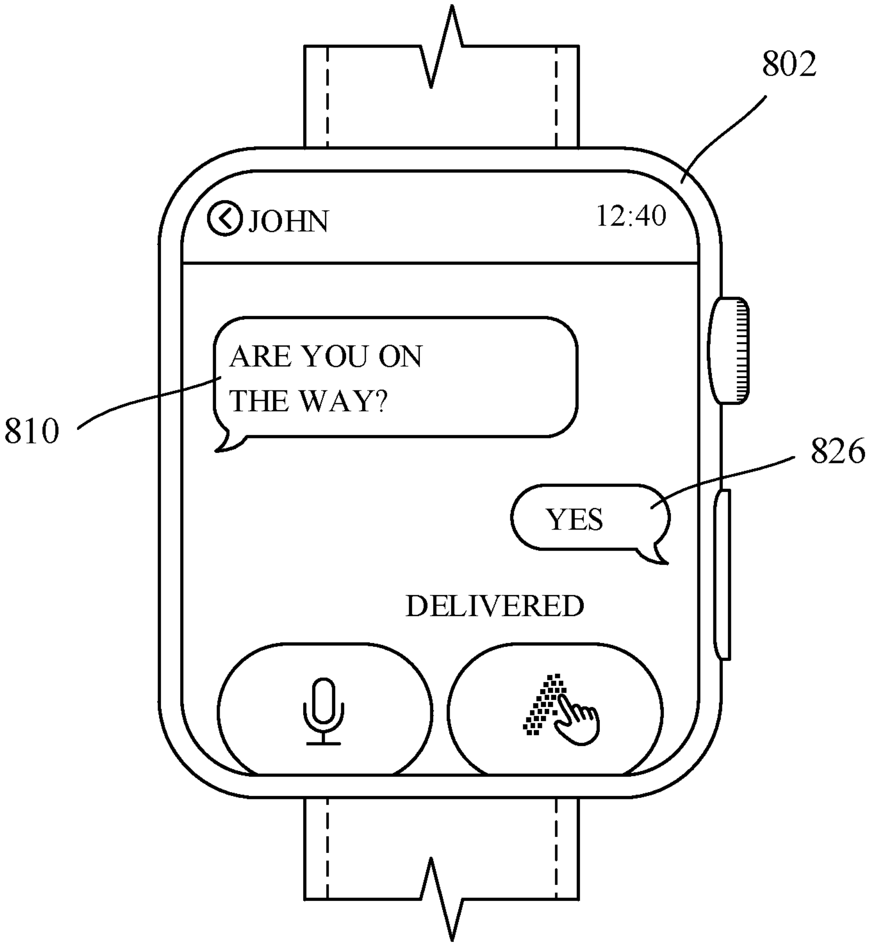

In some examples, now referring now to FIG. 8C, the electronic devices provides the one or more suggested inputs as response suggestions to the message. For example, messaging application on device 802 may display suggested inputs 814-824 as response suggestions to message 810, as shown in FIG. 8B, for example. In some examples, a user of device 802 may scroll through the suggested inputs 814-824 (e.g., using a gesture input), such that a first set of suggested inputs 814-818 appear below response functions 812, and an additional set of suggested inputs 820-824 appear below the first set of inputs and in response to the user scrolling down through the suggested inputs. For example, in response to message 810 (as shown in FIG. 8B), including "Are you on the way," three response categories are obtained, including affirmative responses, negative responses, and tentative responses. In this example, affirmative responses may include suggested inputs 814-818 representing "Yes," "Yeah," "Yup," negative responses may include suggested inputs 820-822 representing "No," "Nope," and tentative responses may include suggested input 824 representing "Hold on." In some examples, additional suggested inputs are displayed to the user upon further scrolling (not depicted).

In some examples, the suggested inputs are provided in a specific order based on context information. In some examples, suggested inputs may be prioritized within each response category. For example, as shown in FIG. 8C, suggested inputs from multiple response categories may be displayed, such that a first set of suggested inputs from a first response category are displayed (e.g., "Yes," "Yeah," "Yup"), and a second set of suggested inputs from a second response category are displayed subsequent to the first set ("No," "Nope"). In this example, the user may frequently respond with "Yes" as an affirmative response and "No" as a negative response. As a result, suggested input "Yes" may be displayed as the first suggested input of the affirmative responses, whereas "No" may be displayed as the first suggested input of the negative responses, for example. In some examples, suggested inputs may be prioritized and provided without prioritization based on response category. For example, the user may frequently respond with "Yeah" as an affirmative response and "Nope" as a negative response. In this example, suggested input "Yeah" may be displayed as the first suggested input and suggested input "Nope" may be displayed as the second suggested input.

In some examples, the response categories and suggested inputs are provided to the user in order to periodically introduce new response suggestions to the user. For example, when using an affirmative response, a user may always select a suggested input corresponding to "Yes." In order to introduce new options to the user, suggested inputs for the affirmative category may be provided in the order of "Yes," "Yep," and "Yeah," for example. In some examples, after a determination is made that the user has been provided suggested inputs and has not used such inputs for a threshold number of times, new suggested inputs are provided to a user. For example, the user may seldom or never use suggested inputs for "Yep" and "Yeah." After such a determination is made, suggested inputs for the affirmative category may be provided in the order of "Yes," "Yup," and "You got it," for example, in order to provide novel response suggestions to the user.

In some examples, in response to providing the one or more suggested inputs as response suggestions to the message, a user input is received as a response to the message, wherein the user input includes at least one of a selection of a suggested input or a custom input. For example, the user may choose to select a provided response suggestion, such as suggested input 814 corresponding to "Yes." In some examples, in response to receiving a user input including a selection of a suggested input, a response according to the selected suggested input is sent. For example, referring now to FIG. 8D, in response to selecting a suggested input corresponding to "Yes," a response 826 according to the suggested input "Yes" is sent to the device associated with message 810. In some examples, the user may opt to enter a custom input. For example, referring back to FIG. 8C, the user may decide not to utilize suggested inputs 814-824, or any other suggested inputs. Referring back to FIG. 8B, for example, in response to message 810 including "Are you on the way?", the user may select one of response functions 812 in order to enter a custom input. For example, the user may select a dictation function in order to provide speech input to be translated to a textual response. The user may, for example, select a free-form character entry function to provide gesture inputs corresponding to individual characters of a textual response. In some examples, the user may select an emoji function to provide one or more emojis as a response to message 810.

In some examples, response information is transmitted to a server, the response information corresponding to the obtained one or more response categories, the provided one or more suggested inputs, and the user input including at least one of a selection of a suggested input or a custom input. For example, referring back to FIG. 8C, the one or more provided input suggestions may correspond to input suggestions 814-824 corresponding to one or more obtained response categories, such as affirmative responses, negative responses, and tentative responses. In this example, the user may have selected suggested input 814 corresponding to "Yes." In some examples, after the user selects the suggested input as a response message, the information including the one or more response categories, the provided one or more suggested inputs, and the user input including the suggested input selection is sent to a server. In some examples, the response information is transmitted periodically, such as daily, weekly, and the like. In some examples, other context information is transmitted to the server, including additional message context such as device type, location information, timestamp information, messaging application information, and the like.

In some examples, the response information is supplemented with randomized data, wherein the response information is transmitted to the server after the response information is supplemented with the randomized data. For example, in order to preserve user privacy, random information (e.g., noise) may be included in the response information. In some examples, including additional random information in the response information may include modifying specific parameters or values included in the response information, or adding random or specific values or parameters not included in the response information. Upon reception of the response information by the server, for example, the aggregate randomized information received from a plurality of user devices may be processed in order to determine the received response information for each user. For example, the response information received from all users may be combined in a way such that the total random information from all users averages to zero. In some examples, the response information may be encrypted after the response information is supplemented with randomized data, and prior to being sent to the server.

Figure 9A:
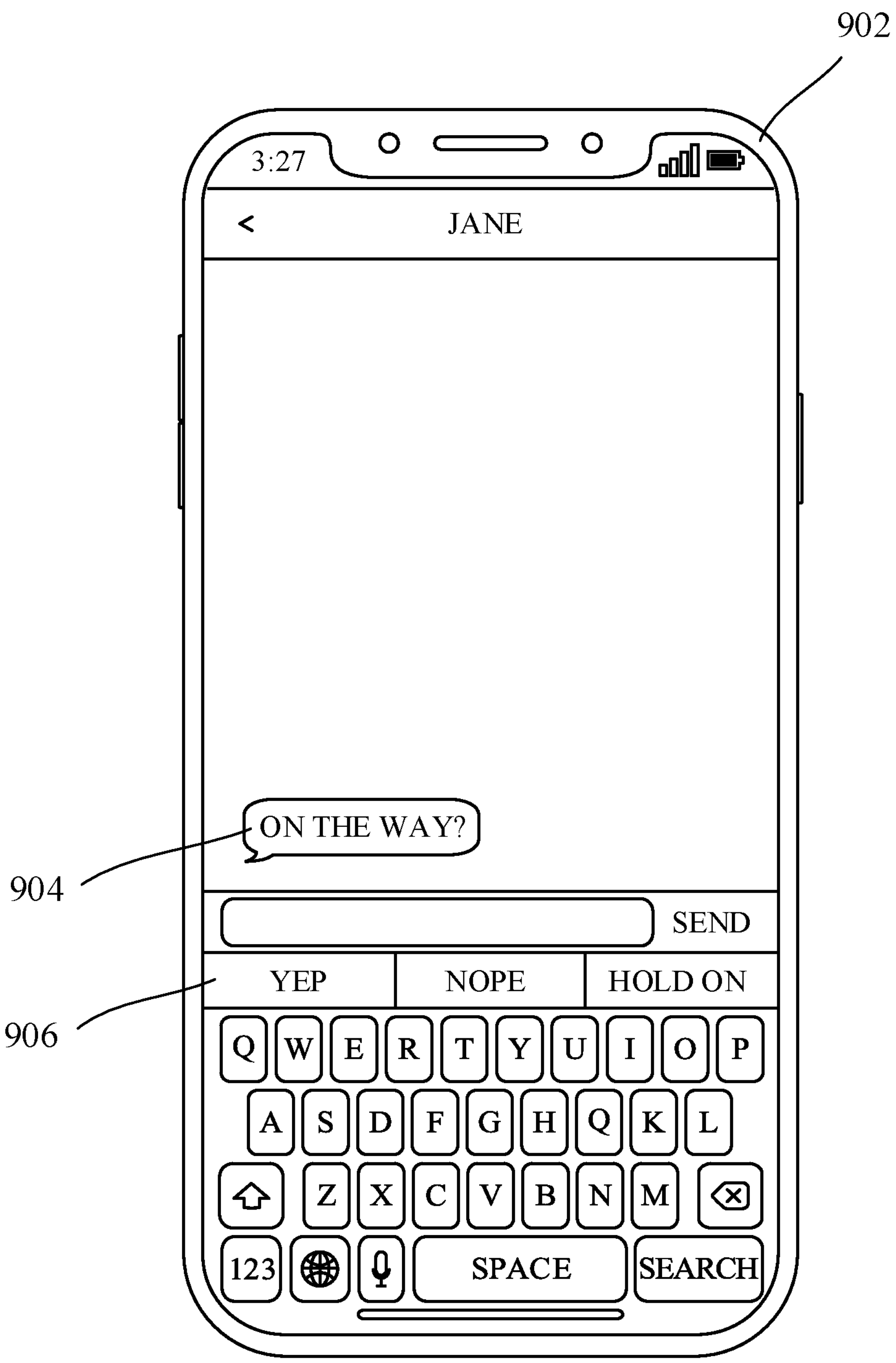
FIGS. 9A-9B illustrate a system for providing message response suggestions, according to various examples.
Figure 9B:
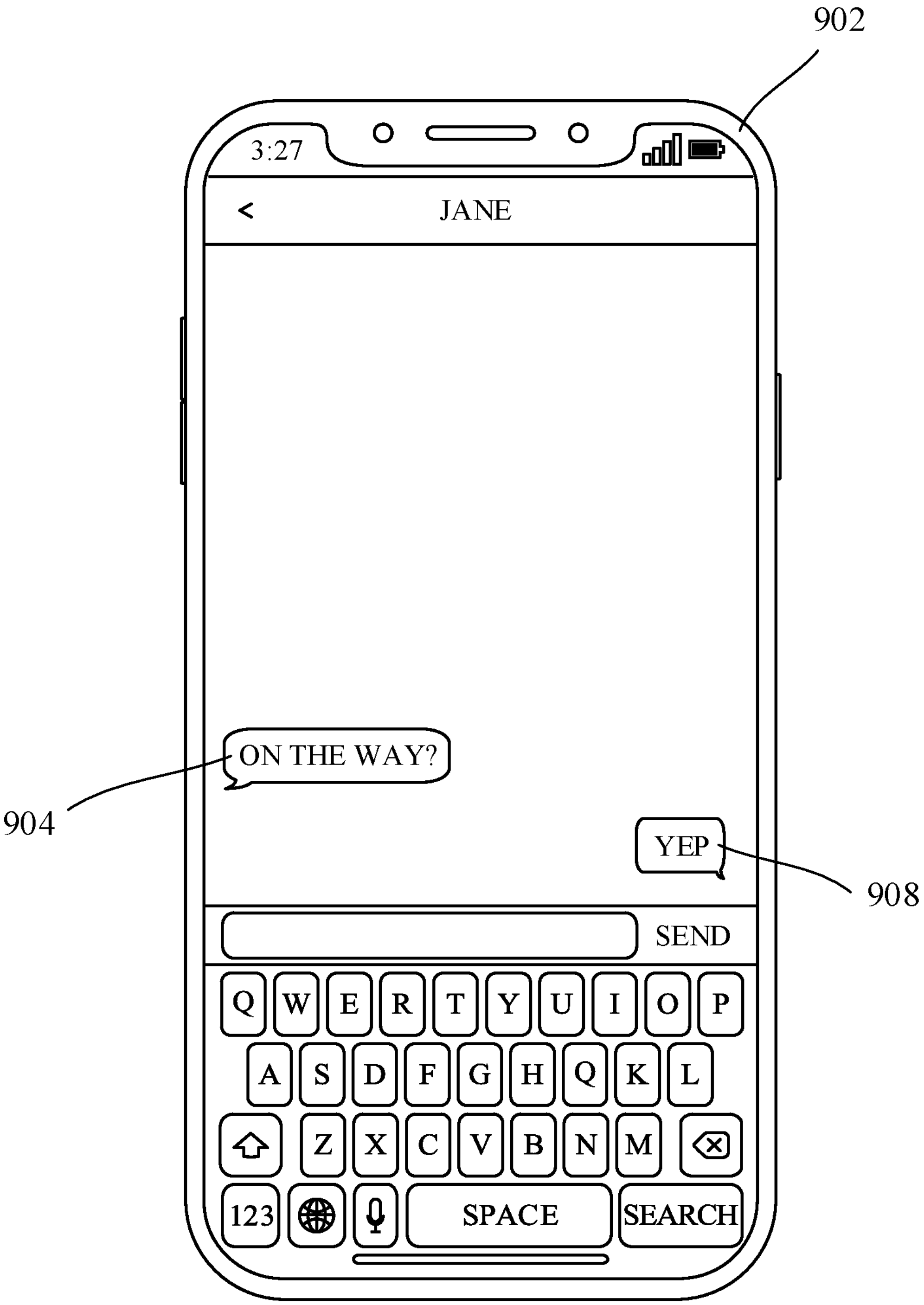

FIGS. 9A-9B illustrate a system 900 for providing message response suggestions. For example, as shown in FIG. 9A, system 900 may include any device described herein, including but not limited to devices 104, 200, 400, and 600 (FIGS. 1, 2A, 4, and 6A-B). Thus, it will be appreciated that the electronic devices depicted in FIGS. 9A-9B may be devices of any type, such as a phone, laptop computer, desktop computer, tablet, wearable device (e.g., smart watch), or any combination or subcombination thereof. Furthermore, the processes described herein may be performed by a server with information delivered to and from the device, performed on the device, or a combination thereof.

In some examples, context information is received from a secondary device, the context information associated with usage of suggested inputs at the secondary device, wherein based on the received context information, one or more suggested inputs are determined for each of the one or more response categories. For example, referring now to FIG. 9A, a message 904 may be received at device 902, such that the message 904 is displayed in messaging application. In response to receiving message 904, one or more suggested inputs are determined for one or more response categories, and based on a predetermined number of suggested inputs corresponding to each of the one of more response categories, as discussed with respect to FIGS. 8A-8D, for example. In some examples, suggested inputs 906 are provided to a user, such as "Yep," "Nope," and "Hold On." In some examples, referring now to FIG. 9B, the user may select suggested input 906 corresponding to "Yep," for example. In response to the user selecting "Yep" as a response message, response message 908 including "Yep" is displayed within the messaging application. In some examples, usage information corresponding to suggested inputs at device 902 is updated based on the user selection of the selected input suggestion "Yep."

In some examples, context information associated with the usage of suggested inputs is sent to one or more secondary devices. For example, usage information corresponding to usage of suggested inputs at device 902 may be sent to a secondary device, such as a smart watch, a tablet computer, a laptop computer, and the like. In some examples, in response to receiving a message at the secondary device, one or more suggested inputs are determined for one or more response categories, and based on the predetermined number of suggested inputs corresponding to each of the one of more response categories, and further based on the context information received from device 902, for example, as discussed with respect to FIGS. 8A-8D. As an example, a user of a secondary device, such as a smart watch, may generally not utilize suggested inputs when responding to messages at the smart watch device. The user may, for example, generally utilize input suggestions when responding to messages at device 902, for example. As a result, commonly used suggested inputs, such as suggested input 906 corresponding to "Yep," may be provided as a suggested input for an affirmative response at the smart watch device, for example.

Figure 10:
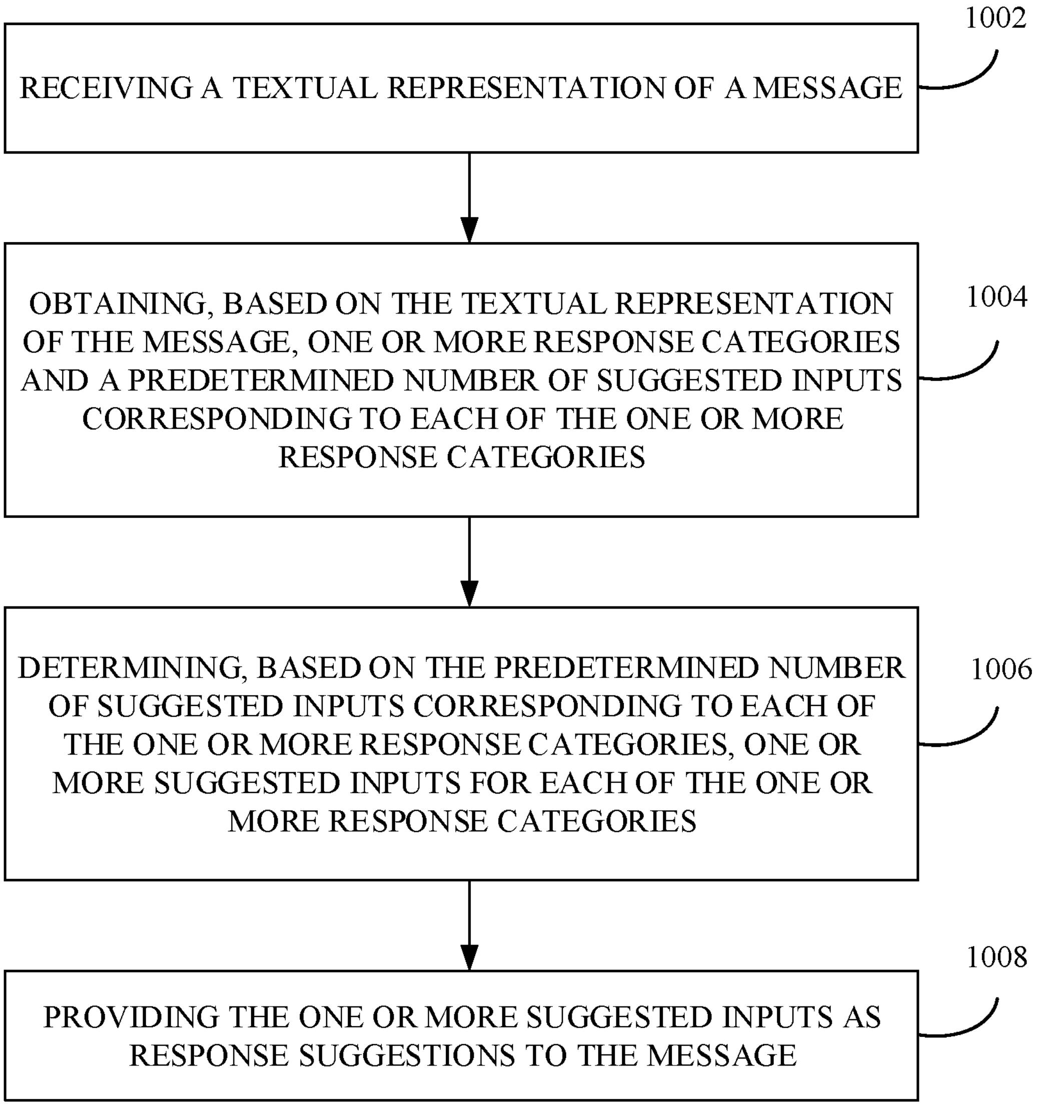
FIG. 10 illustrates process 1000 for providing message response suggestions, according to various examples.

FIG. 10 illustrates process 1000 for providing message response suggestions, according to various examples. Process 1000 is performed, for example, using one or more electronic devices implementing a digital assistant. In some examples, process 1000 is performed using a client-server system (e.g., system 100), and the blocks of process 1000 are divided up in any manner between the server (e.g., DA server 106) and a client device. In other examples, the blocks of process 1000 are divided up between the server and multiple client devices (e.g., a mobile phone and a smart watch). Thus, while portions of process 1000 are described herein as being performed by particular devices of a client-server system, it will be appreciated that process 1000 is not so limited. In other examples, process 1000 is performed using only a client device (e.g., user device 104) or only multiple client devices. In process 1000, some blocks are, optionally, combined, the order of some blocks is, optionally, changed, and some blocks are, optionally, omitted. In some examples, additional steps may be performed in combination with the process 1000.

At block 1002, a textual representation of a message is received. At block 1004, one or more response categories and a predetermined number of suggested inputs corresponding to each of the one of more response categories are obtained based on the textual representation of the message. In some examples, obtaining, based on the textual representation of the message, one or more response categories and a predetermined number suggested inputs corresponding to each of the one of more response categories includes receiving, from a server, the one or more response categories, wherein each response category of the one or more response categories is associated with a score. In some examples, in response to a determination that the textual representation of the message is associated with a response category having a score higher than a predetermined threshold score, the response category is obtained as the only category of the one or more response categories. By obtaining response categories and predetermined numbers of inputs corresponding to the categories, the system provides a unique framework for response suggestions by utilizing several key variables relevant to such suggestions. For example, the system allows for balancing the number of provided response categories, while also considering the number of suggested inputs to provide within each response category. For instance, in the case where only one response category is generally applicable based on a high score, such as responses for salutations in response to a greeting, then only suggested inputs corresponding to the respective category may be provided. When multiple response categories are appropriate, the system delivers a balance of suggested inputs across various appropriate categories for the user to choose from. These features improve systems for providing response suggestions by using various parameters that result in the delivery of highly relevant responses, ultimately leading to an improved user experience.

In some examples, the one or more response categories are based at least in part on information associated with a plurality of users. In some examples, the information associated with a plurality of users includes information corresponding to selected response categories, suggested inputs for each selected response category, and suggested inputs selected by the plurality of users. In some examples, obtaining, based on the textual representation of the message, one or more response categories and a predetermined number of suggested inputs corresponding to each of the one of more response categories includes receiving a first set, the first set including first response categories and a first predetermined number of suggested inputs corresponding to each of the first response categories, wherein the first set corresponds to a first user set of a plurality of user sets. In some examples, a second textual representation of a second message is received, wherein based on the second textual representation of the second message, a second set is obtained, the second set including second response categories, and a second predetermined number of suggested inputs corresponding to each of the second response categories, wherein the second set corresponds to a second user set of the plurality of user sets. In some examples, the second response categories are different than the first response categories and the second predetermined number of suggested inputs are different than the first predetermined number of suggested inputs. By considering multiple sets of users when determining response categories, the system leverages historical data as to how users typically respond to a variety of different message types. For example, given that various customs and demographics affect how different sets of users respond to messages, response categories provided to users may be tailored or adjusted based on such factors. Utilizing different user sets may also permit enhanced analysis and development of response suggestion frameworks, by allowing system administrators or other users to explore how varying one or more parameters among the user sets results in different usage patterns among different users, for example. Such features improve systems for response suggestions by improving the relevance of suggested inputs provided to the user, while enhancing the ability to further develop and maintain such systems.

At block 1006, one or more suggested inputs for each of the one or more response categories are determined based on the predetermined number of suggested inputs corresponding to each of the one of more response categories. In some examples, determining, based on the predetermined number of suggested inputs corresponding to each of the one of more response categories, one or more suggested inputs for each of the one or more response categories includes determining context information corresponding to a message response history, and determining, based on the context information, a first number of suggested inputs for each of the one or more response categories, wherein the first number of suggested inputs for each of the one or more response categories corresponds to the obtained predetermined number of suggested inputs corresponding to each of the one of more response categories. In some examples, the context information corresponding to the message response history includes at least one of user location information, received message type, device type, message application type, and message sender. In some examples, context information is received from a secondary device, the context information associated with usage of suggested inputs at the secondary device, wherein the one or more suggested inputs for each of the one or more response categories are determined based on the received context information. By determining the number of suggested inputs based on context information, the system provides highly personalized response suggestions within each individual response category. In this way, the system intelligently provides the type of response expected based on the message received, while customizing the individual suggested inputs for each type of response. Use of the context information in this manner allows the system to consider many different factors that may influence why a user may choose a given suggested input. Based on the foregoing, the system represents an improvement in providing response suggestions by implementing both global response category predictions and personalization of response selections.

At block 1008, the one or more suggested inputs are provided as response suggestions to the message. In some examples, the one or more suggested inputs include one or more of a textual input, an ideogram, a data file, and an application link. In some examples, in response to providing the one or more suggested inputs as response suggestions to the message, a user input is received as a response to the message, wherein the user input includes at least one of a selection of a suggested input or a custom input. In some examples, response information is transmitted to a server, the response information corresponding to the obtained one or more response categories, the provided one or more suggested inputs, and the user input including at least one of a selection of a suggested input or a custom input. In some examples, the response information is supplemented with randomized data, wherein the response information is transmitted to the server after the response information is supplemented with randomized data. By providing response information to a server in this manner, the system ensures that user privacy is protected and maintained. For example, by supplementing the response information with randomized data, the system provides unique protections against third party interception of such data. These features provide a layer of security in addition to encryption, for example, by ensuring that a user's intercepted data cannot be interpreted even if such data is unencrypted. These features ensure that the response information provided to the server can only be interpreted at the server when analyzed under specific constraints. As a result, the system utilizes relevant context information while maintaining user privacy safeguards.

The operations described above with reference to FIG. 10 are optionally implemented by components depicted in FIGS. 1-4, 6A-B, and 7A-C. For example, the operations of process 1000 may be implemented by one or more of operating system 718, applications module 724, I/O processing module 728, STT processing module 730, natural language processing module 732, vocabulary index 744, task flow processing module 736, service processing module 738, media service(s) 120-1, or processor(s) 220, 410, 704. It would be clear to a person having ordinary skill in the art how other processes are implemented based on the components depicted in FIGS. 1-4, 6A-B, and 7A-C.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve providing message response suggestions. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to identify commonly selected input suggestions for responding to a message. Accordingly, use of such personal information data enables providing personalized response suggestions to a user. Further, other uses for personal information data that benefit the user are also contemplated by the present disclosure. For instance, user data may be utilized globally in order to determine response categories for a set of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, a user may “opt in” or “opt out” of providing context information for use in providing message response suggestions. The user may opt to provide certain context information, such as location for example, but opt out of providing other context information, such as message sender identification, device type information, and the like. In addition to providing “opt in” and “opt out” options, the present disclosure contemplates providing notifications relating to the access or use of personal information. For instance, a user may be notified upon receiving response suggestions in an initial instance, where the notification indicates that personal information will be accessed. The user may be reminded again just before personal information data is accessed by a messaging application, for example.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user’s privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, context information for providing message response suggestions may be identified based on non-personal information data or a bare minimum amount of personal information, such as a device model, other non-personal information available to the system, or publicly available information.

What is claimed is:

1. A non-transitory computer-readable storage medium storing one or more programs, the one or more programs comprising instructions, which when executed by one or more processors of an electronic device, cause the electronic device to:

receive a textual representation of a message;

obtain, based on the textual representation of the message, one or more response categories and a predetermined number of suggested inputs corresponding to each of the one of more response categories;

in response to a determination that the textual representation of the message is associated with a response category having a score higher than a predetermined threshold score, obtain the response category as the only category of the one or more response categories;

determine, based on the predetermined number of suggested inputs corresponding to each of the one of more response categories, one or more suggested inputs for each of the one or more response categories; and provide the one or more suggested inputs as response suggestions to the message.

2. The computer-readable storage medium of claim 1, wherein obtaining, based on the textual representation of the message, one or more response categories and a predetermined number suggested inputs corresponding to each of the one of more response categories comprises:

receiving, from a server, the one or more response categories, wherein each response category of the one or more response categories is associated with a score.

3. The computer-readable storage medium of claim 1, wherein the one or more suggested inputs include one or more of a textual input, an ideogram, a data file, and an application link.

4. The computer-readable storage medium of claim 1, wherein the one or more response categories are based at least in part on information associated with a plurality of users.

5. The computer-readable storage medium of claim 4, wherein the information associated with a plurality of users includes information corresponding to selected response categories, suggested inputs for each selected response category, and suggested inputs selected by the plurality of users.

6. The computer-readable storage medium of claim 1, wherein obtaining, based on the textual representation of the message, one or more response categories and a predetermined number of suggested inputs corresponding to each of the one of more response categories further comprises:

receiving a first set, the first set including first response categories and a first predetermined number of suggested inputs corresponding to each of the first response categories, wherein the first set corresponds to a first user set of a plurality of user sets.

7. The computer-readable storage medium of claim 6, wherein the instructions further cause the electronic device to:

receive a second textual representation of a second message; and obtain, based on the second textual representation of the second message, a second set, the second set comprising:

second response categories, and a second predetermined number of suggested inputs corresponding to each of the second response categories, wherein the second set corresponds to a second user set of the plurality of user sets.

8. The computer-readable storage medium of claim 7, wherein the second response categories are different than the first response categories and the second predetermined number of suggested inputs are different than the first predetermined number of suggested inputs.

9. The computer-readable storage medium of claim 1, wherein determining, based on the predetermined number of suggested inputs corresponding to each of the one of more response categories, one or more suggested inputs for each of the one or more response categories further comprises:

determining context information corresponding to a message response history; and determining, based on the context information, a first number of suggested inputs for each of the one or more response categories, wherein the first number of suggested inputs for each of the one or more response categories corresponds to the obtained predetermined number of suggested inputs corresponding to each of the one of more response categories.

10. The computer-readable storage medium of claim 9, wherein the context information corresponding to the message response history comprises at least one of user location information, received message type, device type, message application type, and message sender.

11. The computer-readable storage medium of claim 1, wherein the instructions further cause the electronic device to:

in response to providing the one or more suggested inputs as response suggestions to the message, receive a user input as a response to the message, wherein the user input includes at least one of a selection of a suggested input or a custom input.

12. The computer-readable storage medium of claim 11, wherein the instructions further cause the electronic device to:

transmit, to a server, response information corresponding to the obtained one or more response categories, the provided one or more suggested inputs, and the user input including at least one of a selection of a suggested input or a custom input.

13. The computer-readable storage medium of claim 12, wherein the instructions further cause the electronic device to:

supplement the response information with randomized data; and transmit the response information to the server after supplementing the response information.

14. The computer-readable storage medium of claim 1, wherein the instructions further cause the electronic device to:

receive, from a secondary device, context information associated with usage of suggested inputs at the secondary device; and determine, based on the received context information, the one or more suggested inputs for each of the one or more response categories.

15. A computer-implemented method, comprising:

at an electronic device with one or more processors and memory:

receiving a textual representation of a message;

obtaining, based on the textual representation of the message, one or more response categories and a predetermined number of suggested inputs corresponding to each of the one of more response categories;

in response to a determination that the textual representation of the message is associated with a response category having a score higher than a predetermined threshold score, obtain the response category as the only category of the one or more response categories;

determining, based on the predetermined number of suggested inputs corresponding to each of the one of more response categories, one or more suggested inputs for each of the one or more response categories; and providing the one or more suggested inputs as response suggestions to the message.

16. An electronic device, comprising:

one or more processors;

a memory; and one or more programs, wherein the one or more programs are stored in the memory and configured to be executed by the one or more processors, the one or more programs including instructions for:

receiving a textual representation of a message;

obtaining, based on the textual representation of the message, one or more response categories and a predetermined number of suggested inputs corresponding to each of the one of more response categories;

in response to a determination that the textual representation of the message is associated with a response category having a score higher than a predetermined threshold score, obtain the response category as the only category of the one or more response categories;

determining, based on the predetermined number of suggested inputs corresponding to each of the one of more response categories, one or more suggested inputs for each of the one or more response categories; and providing the one or more suggested inputs as response suggestions to the message.

17. The method of claim 15, wherein obtaining, based on the textual representation of the message, one or more response categories and a predetermined number suggested inputs corresponding to each of the one of more response categories comprises:

receiving, from a server, the one or more response categories, wherein each response category of the one or more response categories is associated with a score.

18. The method of claim 15, wherein the one or more suggested inputs include one or more of a textual input, an ideogram, a data file, and an application link.

19. The method of claim 15, wherein the one or more response categories are based at least in part on information associated with a plurality of users.

20. The method of claim 19, wherein the information associated with a plurality of users includes information corresponding to selected response categories, suggested inputs for each selected response category, and suggested inputs selected by the plurality of users.

21. The method of claim 15, wherein obtaining, based on the textual representation of the message, one or more response categories and a predetermined number of suggested inputs corresponding to each of the one of more response categories further comprises:

receiving a first set, the first set including first response categories and a first predetermined number of suggested inputs corresponding to each of the first response categories, wherein the first set corresponds to a first user set of a plurality of user sets.

22. The method of claim 21, comprising:

receiving a second textual representation of a second message; and obtaining, based on the second textual representation of the second message, a second set, the second set comprising:

second response categories, and a second predetermined number of suggested inputs corresponding to each of the second response categories, wherein the second set corresponds to a second user set of the plurality of user sets.

23. The method of claim 22, wherein the second response categories are different than the first response categories and the second predetermined number of suggested inputs are different than the first predetermined number of suggested inputs.

24. The method of claim 15, wherein determining, based on the predetermined number of suggested inputs corresponding to each of the one of more response categories, one or more suggested inputs for each of the one or more response categories further comprises:

determining context information corresponding to a message response history; and determining, based on the context information, a first number of suggested inputs for each of the one or more response categories, wherein the first number of suggested inputs for each of the one or more response categories corresponds to the obtained predetermined number of suggested inputs corresponding to each of the one of more response categories.

25. The method of claim 24, wherein the context information corresponding to the message response history comprises at least one of user location information, received message type, device type, message application type, and message sender.

26. The method of claim 15, comprising:

in response to providing the one or more suggested inputs as response suggestions to the message, receiving a user input as a response to the message, wherein the user input includes at least one of a selection of a suggested input or a custom input.

27. The method of claim 26, comprising:

transmitting, to a server, response information corresponding to the obtained one or more response categories, the provided one or more suggested inputs, and the user input including at least one of a selection of a suggested input or a custom input.

28. The method of claim 27, comprising:

supplement the response information with randomized data; and transmit the response information to the server after supplementing the response information.

29. The method of claim 15, comprising:

receive, from a secondary device, context information associated with usage of suggested inputs at the secondary device; and determine, based on the received context information, the one or more suggested inputs for each of the one or more response categories.

30. The electronic device of claim 16, wherein obtaining, based on the textual representation of the message, one or more response categories and a predetermined number suggested inputs corresponding to each of the one of more response categories comprises:

receiving, from a server, the one or more response categories, wherein each response category of the one or more response categories is associated with a score.

31. The electronic device of claim 16, wherein the one or more suggested inputs include one or more of a textual input, an ideogram, a data file, and an application link.

32. The electronic device of claim 16, wherein the one or more response categories are based at least in part on information associated with a plurality of users.

33. The electronic device of claim 32, wherein the information associated with a plurality of users includes information corresponding to selected response categories, suggested inputs for each selected response category, and suggested inputs selected by the plurality of users.

34. The electronic device of claim 16, wherein obtaining, based on the textual representation of the message, one or more response categories and a predetermined number of suggested inputs corresponding to each of the one of more response categories further comprises:

receiving a first set, the first set including first response categories and a first predetermined number of suggested inputs corresponding to each of the first response categories, wherein the first set corresponds to a first user set of a plurality of user sets.

35. The electronic device of claim 34, the one or more programs comprising instructions for:

receiving a second textual representation of a second message; and obtaining, based on the second textual representation of the second message, a second set, the second set comprising:

second response categories, and a second predetermined number of suggested inputs corresponding to each of the second response categories, wherein the second set corresponds to a second user set of the plurality of user sets.

36. The electronic device of claim 35, wherein the second response categories are different than the first response categories and the second predetermined number of suggested inputs are different than the first predetermined number of suggested inputs.

37. The electronic device of claim 16, wherein determining, based on the predetermined number of suggested inputs corresponding to each of the one of more response categories, one or more suggested inputs for each of the one or more response categories further comprises:

determining context information corresponding to a message response history; and determining, based on the context information, a first number of suggested inputs for each of the one or more response categories, wherein the first number of suggested inputs for each of the one or more response categories corresponds to the obtained predetermined number of suggested inputs corresponding to each of the one of more response categories.

38. The electronic device of claim 37, wherein the context information corresponding to the message response history comprises at least one of user location information, received message type, device type, message application type, and message sender.

39. The electronic device of claim 16, the one or more programs comprising instructions for:

in response to providing the one or more suggested inputs as response suggestions to the message, receiving a user input as a response to the message, wherein the user input includes at least one of a selection of a suggested input or a custom input.

40. The electronic device of claim 39, the one or more programs comprising instructions for:

transmitting, to a server, response information corresponding to the obtained one or more response categories, the provided one or more suggested inputs, and the user input including at least one of a selection of a suggested input or a custom input.

41. The electronic device of claim 40, the one or more programs comprising instructions for:

supplementing the response information with randomized data; and transmitting the response information to the server after supplementing the response information.

42. The electronic device of claim 16, the one or more programs comprising instructions for:

receiving, from a secondary device, context information associated with usage of suggested inputs at the secondary device; and determining, based on the received context information, the one or more suggested inputs for each of the one or more response categories.

* * * * *

UNITED STATES PATENT AND TRADEMARK OFFICE

CERTIFICATE OF CORRECTION

PATENT NO. : 11,140,099 B2
APPLICATION NO. : 16/546851
DATED : October 5, 2021
INVENTOR(S) : Vojtech Jina et al.

It is certified that error appears in the above-identified patent and that said Letters Patent is hereby corrected as shown below:

On the Title Page

In Item (57) the Abstract:
Line 6, delete “one of more response” and insert --one or more response--.

Line 8, delete “one of more response” and insert --one or more response--.

In the Claims

Column 54, Line 19, Claim 1, delete “one of more response” and insert --one or more response--.

Column 54, Line 35, Claim 2, delete “one of more response” and insert --one or more response--.

Column 54, Line 57, Claim 6, delete “one of more response” and insert --one or more response--.

Column 55, Line 29, Claim 9, delete “one of more response” and insert --one or more response--.

Column 56, Line 8, Claim 15, delete “one of more response” and insert --one or more response--.

Column 56, Line 34, Claim 16, delete “one of more response” and insert --one or more response--.

Column 57, Line 30, Claim 24, delete “one of more response” and insert --one or more response--.

Signed and Sealed this
Twentieth Day of August, 2024

Katherine Kelly Vidal

Katherine Kelly Vidal
*Director of the United States Patent and Trademark Office*